(12) United States Patent
Rizzi et al.

(10) Patent No.: US 10,926,904 B2
(45) Date of Patent: Feb. 23, 2021

(54) APPARATUS AND PROCESS FOR PACKAGING A PRODUCT

(71) Applicant: Cryovac, Inc., Charlotte, NC (US)

(72) Inventors: Jvanohe Rizzi, Legnano (IT); Stepfano Capitani, Milan (IT)

(73) Assignee: Cryovac, LLC, Charlotte, NC (US)

( * ) Notice: Subject to any disclaimer, the term of this patent is extended or adjusted under 35 U.S.C. 154(b) by 659 days.

(21) Appl. No.: 15/517,549

(22) PCT Filed: Oct. 8, 2015

(86) PCT No.: PCT/EP2015/073319
§ 371 (c)(1),
(2) Date: Apr. 7, 2017

(87) PCT Pub. No.: WO2016/055598
PCT Pub. Date: Apr. 14, 2016

(65) Prior Publication Data
US 2017/0305585 A1 Oct. 26, 2017

(30) Foreign Application Priority Data

Oct. 10, 2014 (EP) .................................... 14188565

(51) Int. Cl.
*B65B 31/02* (2006.01)
*B29C 65/00* (2006.01)
(Continued)

(52) U.S. Cl.
CPC ............ *B65B 31/02* (2013.01); *B29C 65/224* (2013.01); *B29C 65/228* (2013.01); *B29C 65/30* (2013.01);
(Continued)

(58) Field of Classification Search
CPC ...... B65B 7/164; B65B 7/2878; B65B 25/001; B65B 31/028; B65B 2051/105;
(Continued)

(56) References Cited

U.S. PATENT DOCUMENTS 2,762,720 A 9/1956 Rudolph
2,961,031 A 11/1960 Fener
(Continued)

FOREIGN PATENT DOCUMENTS

DE 1811460 A1 5/1960
EP 0402841 A2 12/1990
(Continued)

*Primary Examiner* — Anna K Kinsaul
*Assistant Examiner* — Veronica Martin
(74) *Attorney, Agent, or Firm* — Jon M. Isaacson

(57) ABSTRACT

A process for packaging a product arranged on a support comprising unrolling a film, moving the film to a packaging assembly defining at its inside a packaging chamber, progressively moving a number of supports inside the packaging chamber of the packaging assembly, closing the packaging chamber with the film sheets held above the respective support, optionally causing one or both of: a gas withdrawal from the hermetically closed packaging chamber and gas injection of a gas mixture of controlled composition, heat sealing the film to said support, wherein the heat sealing uses one or more heaters having heating surfaces which are heated for discrete and short time periods only. An apparatus for performing the above process is also disclosed.

26 Claims, 26 Drawing Sheets

(51) Int. Cl.
| | |
|---|---|
| *B65B 51/10* | (2006.01) |
| *B65B 7/16* | (2006.01) |
| *B65B 7/28* | (2006.01) |
| *B29C 65/78* | (2006.01) |
| *B29C 65/22* | (2006.01) |
| *B29C 69/00* | (2006.01) |
| *B29C 65/74* | (2006.01) |
| *B65B 51/14* | (2006.01) |
| *B29C 65/30* | (2006.01) |
| *B65B 61/06* | (2006.01) |
| *B29C 65/38* | (2006.01) |
| *B29L 31/00* | (2006.01) |

(52) U.S. Cl.
CPC ...... *B29C 65/7451* (2013.01); *B29C 65/7461* (2013.01); *B29C 65/7847* (2013.01); *B29C 65/7888* (2013.01); *B29C 66/00141* (2013.01); *B29C 66/00145* (2013.01); *B29C 66/112* (2013.01); *B29C 66/1122* (2013.01); *B29C 66/13* (2013.01); *B29C 66/131* (2013.01); *B29C 66/232* (2013.01); *B29C 66/24244* (2013.01); *B29C 66/3472* (2013.01); *B29C 66/3494* (2013.01); *B29C 66/4312* (2013.01); *B29C 66/53461* (2013.01); *B29C 66/73715* (2013.01); *B29C 66/8122* (2013.01); *B29C 66/8141* (2013.01); *B29C 66/8161* (2013.01); *B29C 66/8181* (2013.01); *B29C 66/8188* (2013.01); *B29C 66/81811* (2013.01); *B29C 66/8242* (2013.01); *B29C 66/8322* (2013.01); *B29C 66/83221* (2013.01); *B29C 66/849* (2013.01); *B29C 66/91231* (2013.01); *B29C 66/91421* (2013.01); *B29C 66/91423* (2013.01); *B29C 66/91651* (2013.01); *B29C 66/944* (2013.01); *B29C 66/961* (2013.01); *B29C 69/005* (2013.01); *B65B 7/164* (2013.01); *B65B 7/2878* (2013.01); *B65B 51/10* (2013.01); *B65B 51/14* (2013.01); *B65B 61/06* (2013.01); *B29C 65/38* (2013.01); *B29C 66/225* (2013.01); *B29C 66/24221* (2013.01); *B29C 66/24225* (2013.01); *B29C 66/24245* (2013.01); *B29C 66/71* (2013.01); *B29C 66/723* (2013.01); *B29C 66/727* (2013.01); *B29C 66/72328* (2013.01); *B29C 66/72341* (2013.01); *B29C 66/73713* (2013.01); *B29C 66/8432* (2013.01); *B29C 66/919* (2013.01); *B29C 66/91213* (2013.01); *B29C 66/91216* (2013.01); *B29C 66/91311* (2013.01); *B29C 66/91313* (2013.01); *B29C 66/91315* (2013.01); *B29C 66/91317* (2013.01); *B29C 66/91653* (2013.01); *B29C 66/949* (2013.01); *B29L 2031/712* (2013.01); *B65B 2051/105* (2013.01)

(58) Field of Classification Search
CPC . B65B 51/14; B29C 66/00141; B29C 66/112; B29C 66/1122; B29C 66/131; B29C 66/232; B29C 66/24244; B29C 66/3472; B29C 66/3494; B29C 66/4312; B29C 66/53461; B29C 66/73715; B29C 66/8122; B29C 66/00145; B29C 66/13; B29C 66/8141; B29C 66/8181; B29C 66/8188; B29C 66/849; B29C 66/91421; B29C 66/8161; B29C 66/81811; B29C 66/8242; B29C 66/8322; B29C 66/83221; B29C 66/91231; B29C 66/91423; B29C 66/91651; B29C 66/944961; B29C 66/225; B29C 66/24221; B29C 66/24225; B29C 66/24245; B29C 66/71; B29C 66/723; B29C 66/72328; B29C 66/72341; B29C 66/727; B29C 66/73713; B29C 66/8432
USPC ... 53/432, 433, 510, 511, 478, 329.2, 329.3, 53/329.5; 219/388–389, 391–399
See application file for complete search history.

(56) References Cited

U.S. PATENT DOCUMENTS

| | | | |
|---|---|---|---|
| 3,283,469 A | 11/1966 | McBrady et al. | |
| 3,392,504 A | 7/1968 | Vates | |
| 3,468,412 A | 9/1969 | Forman | |
| 3,491,504 A | 1/1970 | Young et al. | |
| 3,574,642 A | 4/1971 | Weinke | |
| 3,586,821 A | 6/1971 | Buob | |
| 3,681,092 A | 8/1972 | Titchenal et al. | |
| 3,713,849 A | 1/1973 | Grindrod et al. | |
| 4,055,672 A | 10/1977 | Hirsch et al. | |
| 4,075,818 A * | 2/1978 | Wright | B29C 65/227 156/498 |
| RE30,009 E | 5/1979 | Perdue et al. | |
| 5,056,292 A | 10/1991 | Natterer | |
| 5,249,410 A | 10/1993 | Bakker et al. | |
| 5,279,872 A | 1/1994 | Ralph | |
| 5,346,735 A | 9/1994 | Logan et al. | |
| 5,514,392 A | 5/1996 | Garwood | |
| 5,993,593 A * | 11/1999 | Swartz | B29C 65/226 156/308.4 |
| 5,993,942 A | 11/1999 | Bakker et al. | |
| 6,106,935 A | 8/2000 | Lambert et al. | |
| 6,408,598 B1 * | 6/2002 | Stockley, III | B65B 31/025 53/427 |
| 6,476,137 B1 | 11/2002 | Longo | |
| 2002/0068137 A1 | 6/2002 | Paleari et al. | |
| 2002/0192437 A1 | 12/2002 | Takagi et al. | |
| 2003/0175392 A1 | 9/2003 | Garwood | |
| 2004/0016208 A1 | 1/2004 | Mumpower et al. | |
| 2004/0068968 A1 | 4/2004 | Biba et al. | |
| 2004/0251161 A1 | 12/2004 | Mueller et al. | |
| 2005/0257501 A1 | 11/2005 | Natterer | |
| 2006/0088678 A1 | 4/2006 | Berrier et al. | |
| 2006/0233987 A1 | 10/2006 | Mumpower | |
| 2007/0022717 A1 | 2/2007 | Seggern | |
| 2007/0114271 A1 | 5/2007 | Van Handel | |
| 2007/0298273 A1 | 12/2007 | Thies et al. | |
| 2008/0081095 A1 | 4/2008 | Cole et al. | |
| 2010/0255162 A1 | 10/2010 | Becraft et al. | |
| 2012/0204516 A1 * | 8/2012 | Palumbo | B65B 11/52 53/403 |
| 2013/0108881 A1 | 5/2013 | Clark et al. | |
| 2015/0027089 A1 * | 1/2015 | Owens | B29C 66/8324 53/510 |
| 2015/0041475 A1 * | 2/2015 | Swamy | B32B 7/12 220/359.2 |
| 2015/0367973 A1 * | 12/2015 | Owens | B65B 31/048 53/408 |

FOREIGN PATENT DOCUMENTS

| | | |
|---|---|---|
| EP | 0469296 A1 | 2/1992 |
| EP | 0690012 A1 | 1/1996 |
| EP | 0816069 A2 | 1/1998 |
| EP | 1170224 A2 | 1/2002 |
| EP | 1007331 B1 | 1/2003 |
| EP | 1252008 B1 | 11/2004 |
| EP | 1529797 A1 | 5/2005 |
| EP | 1848635 B1 | 10/2007 |
| EP | 2380727 A1 | 10/2011 |
| EP | 2505339 A1 | 10/2012 |
| EP | 2505340 A1 | 10/2012 |
| FR | 1258357 A | 4/1961 |
| FR | 1286018 A | 3/1962 |
| GB | 953490 A | 3/1964 |

(56) References Cited

FOREIGN PATENT DOCUMENTS

| | | | |
|---|---|---|---|
| GB | 958602 | A | 5/1964 |
| GB | 2023491 | A | 1/1980 |
| GB | 2291620 | A | 1/1996 |
| JP | H01153420 | A | 6/1989 |
| WO | 8500339 | A1 | 1/1985 |
| WO | 9613434 | A1 | 5/1996 |
| WO | 0032393 | A1 | 6/2000 |
| WO | 2005039997 | A1 | 5/2005 |
| WO | 2005089321 | A2 | 9/2005 |
| WO | 2005092611 | A2 | 10/2005 |
| WO | 2006138152 | A1 | 12/2006 |
| WO | 2007093495 | A1 | 8/2007 |
| WO | 2007143343 | A1 | 12/2007 |
| WO | 2008043646 | A1 | 4/2008 |
| WO | 2008057768 | A2 | 5/2008 |
| WO | 2011012652 | A1 | 2/2011 |
| WO | 2011054493 | A1 | 5/2011 |
| WO | 2012115998 | A1 | 8/2012 |
| WO | 2013030114 | A1 | 3/2013 |
| WO | 2013034568 | A1 | 3/2013 |
| WO | 2013153104 | A1 | 10/2013 |
| WO | WO-2013153104 | A1 * | 10/2013 ....... B29C 66/84123 |

* cited by examiner

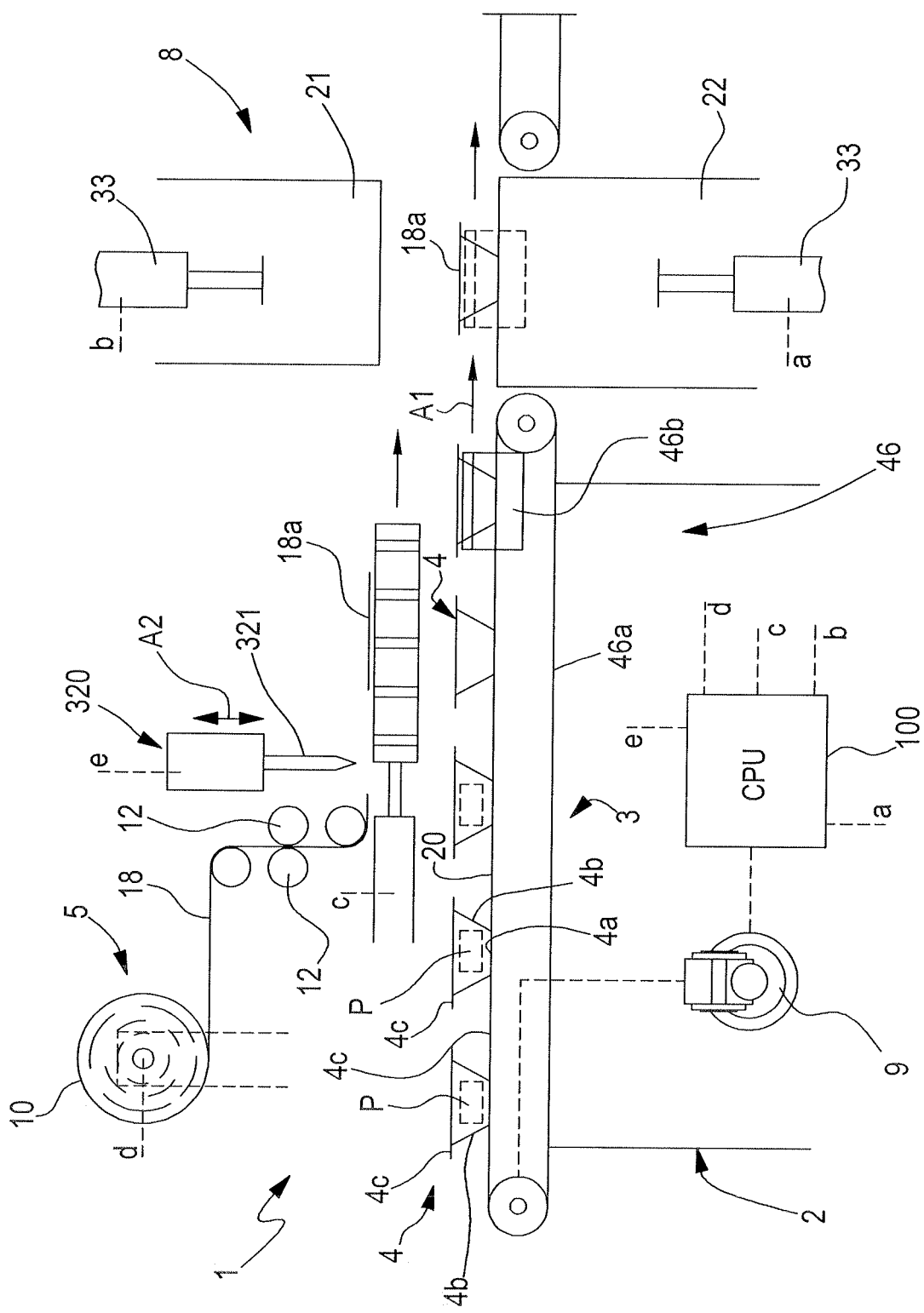

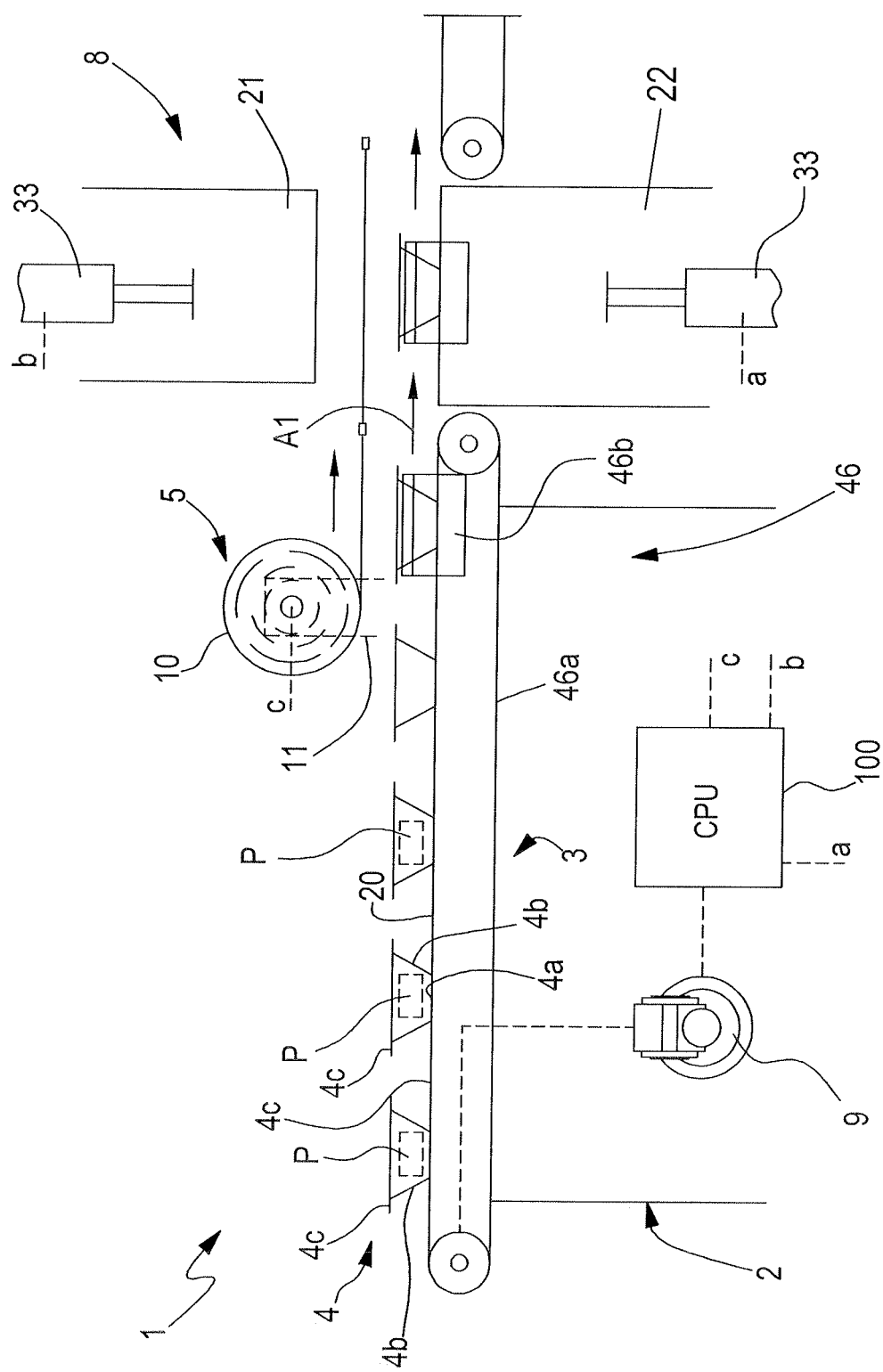

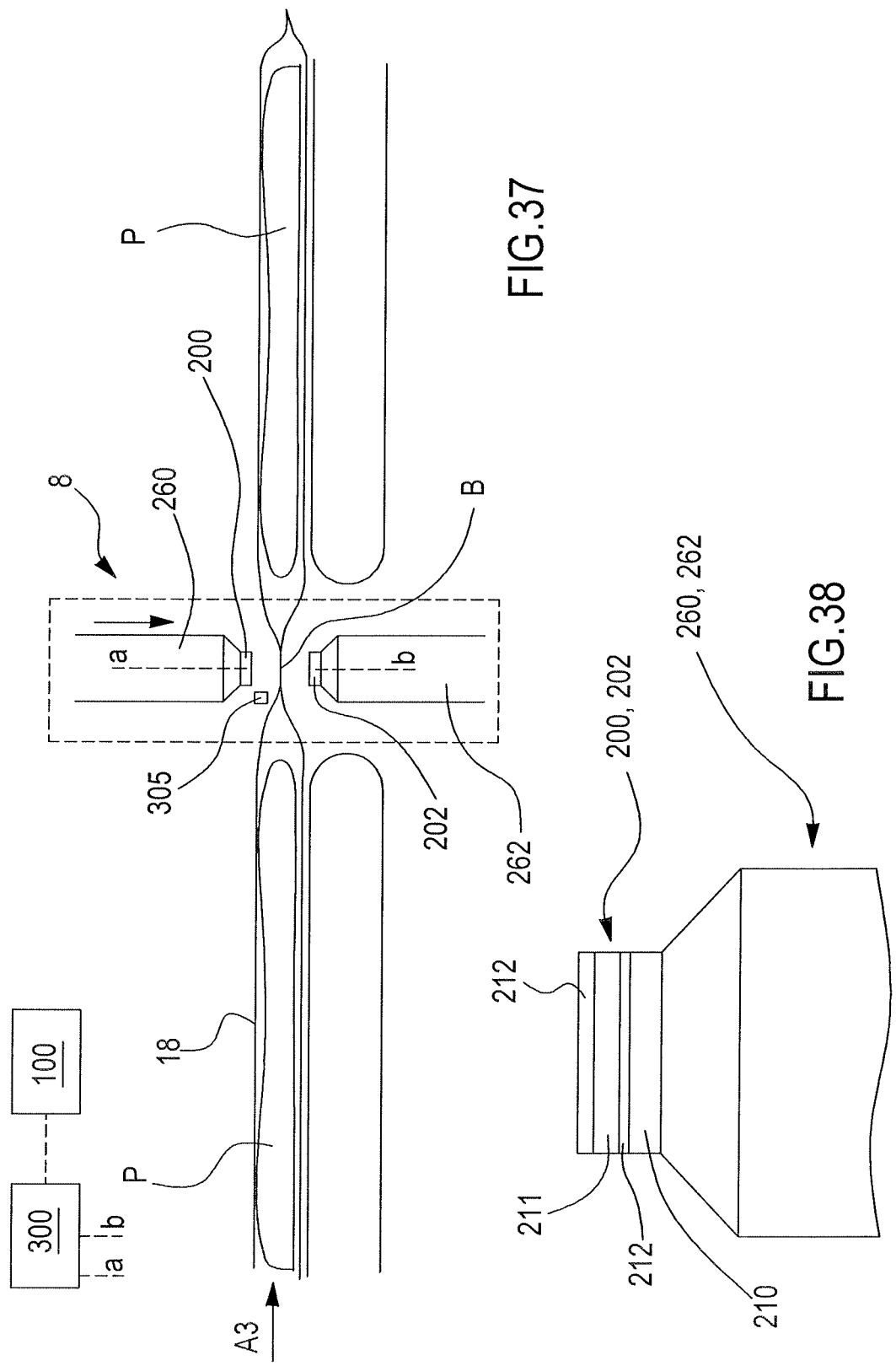

APPARATUS AND PROCESS FOR PACKAGING A PRODUCT

TECHNICAL FIELD

The present invention relates to an apparatus and to a process for packaging of a product. In accordance with certain aspects, the invention relates to an apparatus and process for packaging a product under a controlled atmosphere or under vacuum. In accordance with other aspects the invention relates to an apparatus and process for skin packaging of a product. In particular, the apparatus and process according to the invention adopt an innovative heater for the heat sealing of plastic films.

BACKGROUND ART

Plastic containers are commonly used for the packaging of food and for a wide variety of other items wherein a plastic film forming a skin or a lid is bonded to the container, e.g. by the application of heat, or wherein a plastic film is wrapped around the item(s) to be packages and then closed by heat sealing.

One method of bonding the lid to the tray involves use of a laminated plastic lid having a layer of metal foil: a power supply provides an electrical current to a nearby induction coil which induces an electrical current into the metal foil to develop heat which melts portions of the lid and container and fuses the lid to the container lip. For example, EP0469296 discloses an induction sealing assembly using a single turn coil to seal a plastic lid a plastic container. The assembly includes a nest having a recess for holding a container to be sealed, and a movable sealing head for holding a lid or foil membrane and for positioning the lid relative to an opening in the container. Means are provided to secure a portion of the sealing head against a portion of the nest to form an air-tight chamber between a lower portion of the sealing head and an upper portion of the nest. The induction sealing assembly uses a vacuum source and a source of inert gas to flush air from the container prior to sealing. An induction coil mounted in the sealing head induces a heating electrical current in the lid to seal the lid to the container.

In order to package products, in particular food products, vacuum packages have been developed in the past. Among the known vacuum packaging processes, vacuum skin packaging is commonly employed for packaging food products such as fresh and frozen meat and fish, cheese, processed meat, ready meals and the like. Vacuum skin packaging is described for instance in FR 1 258 357, FR 1 286 018, AU 3 491 504, US RE 30 009, U.S. Pat. Nos. 3,574,642, 3,681,092, 3,713,849, 4,055,672, and 5,346,735.

Vacuum skin packaging is basically a thermoforming process. In particular, the product is typically placed on a rigid or semi-rigid support (such as a tray, a bowl or a cup). The support with the product placed thereon is put in a vacuum chamber, where a film of thermoplastic material, held by vacuum in a position above the product placed on the support, is heated to soften it. The space between the support and the film is then evacuated and finally vacuum above the film is released to cause the film to drape down all around the product and seal to the surface of the support not covered by the product, thus forming a tight skin around the product and on the support.

US 2007/0022717 discloses a machine for gastight packaging an object using a film material. The machine has a lower tool for supporting two trays and an upper tool having cutting devices housed inside the upper tool and facing the lower tool. A film is interposed between the upper tool and the lower tool. The upper and lower tools are first closed the one against the other and then the film is cut to the size of the peripheral rims of the trays by the cutting devices operative inside the upper tool. Sealing tools heat seal the cut regions of the film to the peripheral rim of the tray. A vacuum is situated in the surrounding region of the tray to cause deep-drawing of the film. This reference also mentions that the same device can be used for sealing trays with films that are not deep drawn to form a skin over the product.

US 2005/0257501 discloses a machine for packaging a product arranged in a tray. The machine has a lower tool for supporting the tray and an upper tool with a cutting device. During operation, the film is clamped along an edge surrounding the tray and is deformed by the upper tool in a direction extending away the product. The space surrounding the product is then evacuated, the film and the edge of the tray are sealed and the film is then cut by the cutting device.

WO2011/012652 shows an apparatus for packaging a product in a tray. The machine comprises a first film transfer plate configured for holding a film sheet, heating the film sheet, bringing the film sheet to a position above a tray with the product arranged thereon and air tightly fixing the film sheet to the tray. A second film transfer plate is also present. As for the first film transfer plate also the second film transfer plate is configured for holding a film sheet, heating the film sheet, bringing the film sheet to a position above a tray with the product arranged thereon and air tightly fixing the film sheet to the tray. During a first operating step of the machine, the first film transfer plate holds a first film sheet and heats the first film sheet, while the second film transfer plate releases a second film sheet thereby allowing the second sheet to be drawn into a first tray; and during a second operating step of the machine, the second film transfer plate holds a third film sheet and heats the third film sheet, while the first film transfer plate releases the first film sheet thereby allowing the first film sheet to be drawn into a second tray. The machine further comprises a rotating cylinder suitable for rotating about its axis X, the first film transfer plate and the second film transfer plate being connected to the rotating cylinder so that, when the rotating cylinder rotates about its axis X, the positions of the first film transfer plate and the second film transfer plate are exchanged. A vacuum arrangement allows removing air from within the tray underneath the film sheet (positioned either by the first or by the second film transfer plate) through the at least one hole present in the tray. The film transfer plates are configured to release the film sheet thereby allowing the film sheet to be drawn into the tray while the vacuum arrangement is removing air from within the tray.

WO8500339 discloses a packaging apparatus where a tray is hosted in a lower tool seat and where the upper tool comprises a heating head, which is in a single heated body. The heating head has a peripheral protruding portion acting on a peripheral band of a film portion of a film to heat seal said peripheral portion to a corresponding horizontal rim of the tray. A central portion of the heating head is covered by insulating material in the form of a plate. The sealing can be performed by way of an impulse sealing technique or by other sealing techniques.

GB958602 shows a packaging apparatus having an impulse heating system to warm a peripheral heater acting on a film peripheral band to heat seal this latter.

Although, at least some the above described solutions have been adopted with satisfaction, it remains a need to further improve control of the heating of the plastic film during heat sealing.

Thus, it is an object of the invention to render available a process and an apparatus for heat sealing portions of a plastic film, e.g. to a support hosting a product or to other plastic films or film portions, wherein at least during a heat sealing phase the control of heat fed to the heating surfaces active on the film is improved.

It is a further object to conceive a process and apparatus capable of reducing energy consumption while efficiently providing the heat required for heat sealing.

Additionally is an object of the invention an apparatus and process where heat sealing may efficiently take place even with thermo sensitive films, such as heat shrinkable films.

It is an auxiliary object of the invention conceiving a process and an apparatus which can operate both for skin packaging and for modified atmosphere packaging.

SUMMARY OF THE INVENTION

One or more of the objects specified above are substantially achieved by a process and by an apparatus according to any one of the appended claims Aspect of the invention are here below disclosed.

A $1^{st}$ aspect concerns a packaging apparatus comprising:

a packaging assembly configured for receiving at least one support and for tightly fixing a film to the support, the packaging assembly including:
  a lower tool defining a prefixed number of seats configured for receiving said at least one support with a product to be packaged,
  an upper tool facing and cooperating with the lower tool,
  said upper tool and lower tool being relatively movable at least between a first operating condition, where the upper tool and lower tool are spaced apart the one from the other and allow positioning of at least one film portion of said film above one or more of said at least one supports, and a second operating condition, where the upper tool and lower tool are approached to one another and allow heat sealing of said film portion to the at least one support located at said one or more seats,
    an inner heater carried by the upper tool and having an heating surface configured to heat at least a part of said film portion,
    a peripheral heater carried by the upper tool and positioned radially outside with respect to the inner heater, the peripheral heater having an heating surface configured to heat seal to the at least one support at least a peripheral region of said film portion;
  a supply unit configured to control energy supplied to said peripheral heater and to said inner heater; and
  a control device acting on the supply unit and configured for commanding the supply unit and control a supply of energy to the peripheral heater independently from a supply of energy to the inner heater.

In a $2^{nd}$ aspect according to the $1^{st}$ aspect said control device is further configured to command the supply unit to execute a heating cycle including the following steps:

increasing a temperature of the heating surface of the peripheral heater to a first temperature, keeping the heating surface of the peripheral heater at least at the first temperature for a first discrete time interval, reducing the temperature of the heating surface of the peripheral heater below said first temperature, increasing a temperature of the heating surface of the inner heater to a second temperature, keeping the heating surface of the inner heater at least at the second temperature for a second discrete time interval, reducing the temperature of the heating surface of the inner heater below said second temperature.

In a $3^{rd}$ aspect according to the preceding aspect the first temperature is different from the second temperature.

In a $4^{th}$ aspect according to any one of the preceding two aspects said control device is further configured to command the supply unit to consecutively repeat execution of said heating cycle a plurality of times, during each of said consecutive heating cycles at least one of said film portions being heat sealed to at least one respective support. In practice, the heating cycle starts when the heat bonding operation initiates (i.e. after the peripheral heating surface touches the film and the peripheral region of film portion is in contact with a corresponding surface of the support—for instance in case of a tray when the peripheral region or border of the film portion contacts the top surface of the tray top rim) and ends as soon as (or even slightly before) the heating surface of the peripheral heater is lifted from the film.

In a $5^{th}$ aspect according to any one of the preceding three aspects wherein said control device is configured for controlling the supply unit such that—during each heating cycle—the supply unit supplies energy to the peripheral heater only during a discrete time period followed by a time period when no energy is supplied to the peripheral heater for causing the increase and keeping of the heating surface of the peripheral heater at least at the first temperature for the first discrete time interval, and for causing a subsequent reduction of the temperature of the heating surface of the peripheral heater below said first temperature.

In a $6^{th}$ aspect according to any one of the preceding four aspects wherein said control device is configured for controlling the supply unit such that—during each heating cycle—the supply unit supplies energy to the inner heater only during a discrete time period followed by a time period when no energy is supplied to the inner heater for causing the increase and keeping of the heating surface of the inner heater at least at the second temperature for the second discrete time interval, and for causing a subsequent reduction of the temperature of the heating surface of the inner heater below said second temperature.

In a $7^{th}$ aspect according to any one of the preceding five aspects wherein the heating cycle is configured such that the second temperature is inferior with respect to the first temperature.

In a $8^{th}$ aspect according to any one of the preceding six aspects wherein said first temperature is comprised between 150° C. and 300° C.

In a $9^{th}$ aspect according to any one of the preceding seven aspects wherein said first temperature is comprised between 180-240° C.

In a $10^{th}$ aspect according to any one of the preceding eight aspects wherein said first temperature is comprised between 200-220° C.

In an $11^{th}$ aspect according to any one of the preceding nine aspects wherein said second temperature is comprised between 150° C. and 300° C.

In a $12^{th}$ aspect according to any one of the preceding ten aspects wherein said second temperature is comprised between 180-240° C.

In a $13^{th}$ aspect according to any one of the preceding eleven aspects wherein said second temperature is comprised between 200-220° C.

In a 14$^{th}$ aspect according to any one of the preceding twelve aspects the first discrete time period has a duration comprised between 0.2 and 5 seconds, in particular between 0.5 and 1.5 seconds.

In a 15$^{th}$ aspect according to any one of the preceding thirteen aspects the second discrete time period has a duration comprised between 0.2 and 5 seconds, in particular between 0.5 and 1.5 seconds.

In a 16$^{th}$ aspect according to any one of the preceding fourteen aspects wherein the control device is configured to command the supply unit to sharply increase the temperature of the heating surface of the peripheral heater from a respective baseline temperature to the first temperature. By sharply increasing it is meant increasing said temperature of the heating surface of the peripheral heater with a temperature increase rate over time higher than 1° C./msec, optionally higher than 5° C./msec.

In a 17$^{th}$ aspect according to any one of the preceding fifteen aspects wherein the control device is configured to command the supply unit to sharply increase the temperature of the heating surface of the inner heater from a respective baseline temperature to the second temperature. By sharply increasing it is meant increasing said temperature of the heating surface of the inner heater with a temperature increase rate over time higher than 1° C./msec, optionally higher than 5° C./msec.

In a 18$^{th}$ aspect according to any one of the preceding sixteen aspects wherein each heating cycle is configured such that the increasing of the temperature of the heating surface of the inner heater to a second temperature starts after the increasing of the temperature of the peripheral heater to the first temperature, the start of said second discrete time interval being delayed with respect to the start of said first time interval.

In a 19$^{th}$ aspect according to any one of the preceding seventeen aspects wherein the duration of said first discrete time interval is longer than the duration of said second discrete time interval.

In a 20$^{th}$ aspect according to any one of the preceding aspects wherein:
the heating surface of said peripheral heater has an annular shape and surrounds the heating surface of the inner heater, and
when the upper and lower tools are in said second operating position, the peripheral heater is configured to heat a peripheral band (in other words the peripheral region is in the shape of a peripheral band) of said film portion while the inner heater is configured to heat at least a part of an inner zone of the same film portion located radially inside the peripheral band.

In a 21$^{st}$ aspect according to any one of the preceding aspects wherein both the heating surface of the peripheral heater and the heating surface of the inner heater are flat.

In a 22$^{nd}$ aspect according to any one of the preceding aspects wherein at least when the upper and lower tools are in said second operating position, the heating surface of the inner heater is coplanar to the heating surface of the peripheral heater or indented with respect to the heating surface of the peripheral heater such that when the heating surface of the peripheral heater contacts a top surface of the film portion, the heating surface of the inner heater is spaced apart by a prefixed distance from the top surface of the same film portion. In particular the indent may be a slight indent of the order of few mm (1 to 10 mm).

In a 23$^{rd}$ aspect according to any one of the preceding aspects wherein:
the heating surface of the inner heater is located at a radial distance from the heating surface of the peripheral heater and extends in an area surrounded by the heating surface of the peripheral heater.

In a 24$^{th}$ aspect according to any one of the preceding aspects wherein said heating surface of the inner heater is a heating surface of annular shape,
or a continuous heating surface delimited by a single closed contour line, optionally a discoidal or polygonal continuous heating surface, said continuous heating surface occupying substantially all or a majority of said area surrounded by the heating surface of the peripheral heater,
or a heating surface including a plurality of parallel spaced apart bands connected at ends thereof by connecting portions.

In a 25$^{th}$ aspect according to any one of the preceding aspects the peripheral heater comprises a first electrically conductive element extending along the heating surface of the peripheral heater. For instance the peripheral heater may be entirely formed by the first electrically conductive element.

In a 26$^{th}$ aspect according to the preceding aspect wherein said first electrically conductive element is an electrically conductive annular element.

In a 27$^{th}$ aspect according to the preceding aspect wherein the first electrically conductive element is an electrically conductive annular flat element.

In a 28$^{th}$ aspect according to any one of the preceding aspects the inner heater comprises a second electrically conductive element extending along the heating surface of the inner heater. For instance the inner heater may be entirely formed by the second electrically conductive element.

In a 29$^{th}$ aspect according to the preceding aspect said second conductive element is an electrically conductive annular element, optionally an electrically conductive annular flat element.

In a 30$^{th}$ aspect according to the 28$^{th}$ aspect said second conductive element is an electrically conductive continuous plate.

In a 31$^{st}$ aspect according to the 28$^{th}$ aspect said second conductive element is an electrically conductive meander element, optionally an electrically conductive flat meander element. By meander element it is intended a bar shaped (optionally flat bar shaped) conductor forming a winding comprising parallel adjacent members transversally connected at ends thereof.

In a 32$^{nd}$ aspect according to any one of the preceding aspects the first electrically conductive element comprises:
a supporting substrate carried by the upper tool,
a metallic conductive band fixed to the supporting substrate, and
an optional protective layer covering the metallic conductive band and defining the heating surface of the peripheral heater.

In a 33$^{rd}$ aspect according to any one of the preceding aspects from the 1$^{st}$ to the 31$^{st}$ the first electrically conductive element comprises:
a supporting substrate carried by the upper tool,
an insulating layer in contact with the supporting substrate,
a conductive layer in the form of a metal-glass mixture in contact with the insulating layer, and
a protective layer covering the conductive layer and defining the heating surface.

In a 34$^{th}$ aspect according to any one of the preceding aspects from the 1$^{st}$ to the 31$^{st}$ the first electrically conductive element comprises an electrically conductive carbon structure; the electrically conductive carbon structure includes (or is exclusively formed of) one or more carbon allotropes in the group of:
- a graphite structure,
- a single or multi-layer graphene structure,
- a fullerene structure, where the carbon atoms are bonded together in spherical, tubular, fiber-like or ellipsoidal formations: in particular the fullerene structure may take the form of carbon nanotubes or carbon nanofibers.

It is to be noted that the first electrically conductive element may be formed by an electrically conductive carbon structure completely formed in one or more of the carbon allotropes disclosed above.

For example, the first electrically conductive element may be exclusively formed in graphite, or the first electrically conductive element may be exclusively formed in one single graphene layer, or first the electrically conductive element may be exclusively formed in a plurality of mutually overlapping graphene layers, or the first electrically conductive element may be exclusively formed in a fullerene structure of carbon nanotubes, or the first electrically conductive element may be formed in a fullerene structure of carbon nano-fibers.

According to a further variant the carbon structure may comprise a structure formed by carbon filaments which are adjacently in contact to each other to form a conductive body or by carbon filaments embedded in a plastic resin matrix: in this latter case the carbon filaments may be adjacently placed and electrically connected to each other at prescribed sections such as at ends thereof.

In a $35^{th}$ aspect according to the preceding aspect wherein the first electrically conductive element comprises a structural substrate carrying said carbon structure and at least one protective layer covering the carbon structure on a side opposite that of the structural substrate. In an embodiment said carbon structure is sandwiched between two opposite protective layers, the protective layer opposite the structural substrate defining the heating surface of said peripheral heater; for example the carbon structure of the first electrically conductive element comprising a plurality of mutually overlapping graphene layers forming a carbon structure of flat (optionally elongated) conformation.

In a $36^{th}$ aspect according to any one of the preceding two aspects wherein the carbon structure of the first electrically conductive element of the peripheral heater has a cross section with thickness of at least 5 µm and a width of at least 2 mm, more optionally a cross section with thickness of at least 10 µm and a width of at least 5 mm. For example, the carbon structure of the first electrically conductive element of the peripheral heater may have the cross section thickness between 5 and 300 µm, optionally between 10 and 200. The cross section width may be at least 2 mm, more optionally at least 5 mm.

In a $37^{th}$ aspect according to any one of the preceding three aspects wherein the carbon structure of the first electrically conductive element of the peripheral heater has an average electric resistivity higher than 5 $\Omega \cdot mm^2/m$, optionally comprised between 15 and 25 $\Omega \cdot mm^2/m$.

In a $38^{th}$ aspect according to any one of the preceding aspects the second electrically conductive element comprises:
- a supporting substrate carried by the upper tool,
- a metallic conductive structure selected in group of: a band, a plate and a meander, said metallic conductive structure being fixed to the supporting substrate, and
- an optional protective layer covering the metallic conductive structure and defining the heating surface of the peripheral heater.

In a $39^{th}$ aspect according to any one of the preceding aspects from the $1^{st}$ to the $37^{th}$ the second electrically conductive element comprises:
- a supporting substrate carried by the upper tool,
- an insulating layer in contact with the supporting substrate,
- a conductive structure in the form of a metal glass mixture layer taking the shape of a band, a plate or a meander, said conductive structure being in contact with the insulating layer, and
- a protective layer covering the conductive layer and defining the heating surface.

In a $40^{th}$ aspect according to any one of the preceding aspects from the $1^{st}$ to the $37^{th}$ the second electrically conductive element (for instance in the form of a flat annular or plate or meander shaped element) comprises an electrically conductive carbon structure; the electrically conductive carbon structure includes (or is exclusively formed of) one or more carbon allotropes in the group of:
- a graphite structure,
- a single or multi-layer graphene structure,
- a fullerene structure, where the carbon atoms are bonded together in spherical, tubular, fiber-like or ellipsoidal formations: in particular the fullerene structure may take the form of carbon nanotubes or carbon nanofibers.

It is to be noted that the second electrically conductive element may be formed by an electrically conductive carbon structure completely formed in one or more of the carbon allotropes disclosed above.

For example, the second electrically conductive element may be exclusively formed in graphite, or the second electrically conductive element may be exclusively formed in one single graphene layer, or the second electrically conductive element may be exclusively formed in a plurality of mutually overlapping graphene layers, or the second electrically conductive element may be exclusively formed in a fullerene structure of carbon nanotubes, or the second electrically conductive element may be formed in a fullerene structure of carbon nano-fibers.

According to a further variant the carbon structure may comprise a structure formed by carbon filaments which are adjacently in contact to each other to form a conductive body or by carbon filaments embedded in a plastic resin matrix: in this latter case the carbon filaments may be adjacently placed and electrically connected to each other at prescribed sections such as at ends thereof.

In a $41^{st}$ aspect according to any one of the preceding aspects from the $1^{st}$ to the $37^{th}$ the second electrically conductive element comprises an electrically conductive continuous flat element, such as a band or a plate; for example, the electrically conductive carbon structure of the second electrically conductive element may comprise one or more graphene layers.

In a $42^{nd}$ aspect according to any one of the preceding aspects from the $1^{st}$ to the $37^{th}$ the second electrically conductive element comprises an electrically conductive meander element, optionally an electrically conductive flat meander element; for example, the electrically conductive carbon structure of the second electrically conductive element may comprise one or more graphene layers.

In a $43^{rd}$ aspect according to any one of the preceding three aspects the second electrically conductive element comprises a structural substrate carrying the respective carbon structure and at least one protective layer covering the carbon structure on a side opposite that of the structural substrate, optionally wherein said carbon structure is sandwiched between two opposite protective layers, the protective layer opposite the structural substrate defining the heating surface of said inner heater; for example, the electrically conductive carbon structure of the second electrically conductive element may comprise one or more graphene layers.

In a 44$^{th}$ aspect according to any one of the preceding four aspects the carbon structure of the second electrically conductive element of the inner heater has a cross section with thickness of at least 5 μm and a width of at least 5 mm, more optionally a cross section with thickness of at least 10 μm and a width of at least 10 mm.

In a 45$^{th}$ aspect according to any one of the preceding five aspects the carbon structure of the second electrically conductive element of the inner heater has an average electric resistivity higher than 2 Ω·mm$^2$/m, optionally higher than 2 Ω·mm2/m In a 46$^{th}$ aspect according to any one of the preceding aspects the apparatus includes a cooling circuit associated to the upper tool and configured to cool said inner heater and said peripheral heater, said cooling circuit being controlled by the control device which is further configured to cause circulation of a cooling fluid in said cooling circuit and for regulating a cooling fluid temperature. The control device may set the cooling fluid to a temperature well below the first and second temperature, for instance more than 100° C. below said temperatures.

In a 47$^{th}$ aspect according to any one of the preceding aspects the supply unit is an electric supply unit and comprises:
  at least one impulse transformer,
  at least one electric circuitry connecting the impulse transformer to the first electrically conductive element and to the second electrically conductive element.

In a 48$^{th}$ aspect according to any one of the preceding aspects the supply unit is an electric supply unit and comprises:
  at least a first impulse transformer and a first electric circuitry connecting the first impulse transformer to the first electrically conductive element, and
  at least a second impulse transformer and a second electric circuitry connecting the second impulse transformer to the second electric impedance,
  wherein said control device is configured to act on the electric supply unit to independently supply electric current at a predetermined voltage to said first and, respectively, second electrically conductive elements.

In a 49$^{th}$ aspect according to any one of the preceding aspects the apparatus comprises:
  a first temperature sensor configured for detecting a temperature of the heating surface of the peripheral heater and emitting a corresponding first temperature signal correlated to the detected temperature. Note that the first temperature sensor may be a contact temperature sensor or a contactless temperature sensor (e.g. an IR sensor). Also note that presence of the first temperature sensor may not be necessary and temperature of the heating surface may be calculated based on the measured electric resistance of the first electrically conductive element.

For instance a first electric sensor may be used, electrically connected or connectable to the carbon structure of the peripheral heater and configured for detecting an electric parameter of said carbon structure and emitting a corresponding electric parameter signal, the electric parameter comprising one of
  an electric impedance of a prefixed segment of said carbon structure,
  an electric current flowing through said prefixed segment of carbon structure when a prefixed electric voltage is applied at ends of said prefixed segment,
  an electric voltage detected at ends of the prefixed segment when a prefixed electric current is imposed to flow through said prefixed segment.

In a 50$^{th}$ aspect according to any one of the preceding aspects the apparatus comprises:
  a second temperature sensor for detecting a temperature of the heating surface of the inner heater and emitting a corresponding second temperature signal correlated to the detected temperature. Note that the second temperature sensor may be a contact temperature sensor or a contactless temperature sensor (e.g. an IR sensor). Also note that presence of the second temperature sensor may not be necessary and temperature of the heating surface may be calculated based on the measured electric resistance of the second electrically conductive element.

For instance a second electric sensor may be used, electrically connected or connectable to the carbon structure of the inner heater and configured for detecting an electric parameter of said carbon structure and emitting a corresponding electric parameter signal, the electric parameter comprising one of
  an electric impedance of a prefixed segment of said carbon structure,
  an electric current flowing through said prefixed segment of carbon structure when a prefixed electric voltage is applied at ends of said prefixed segment,
  an electric voltage detected at ends of the prefixed segment when a prefixed electric current is imposed to flow through said prefixed segment.

In 51$^{st}$ aspect according to any one of the preceding two aspects wherein the control device is connected to said first temperature sensor and is configured for:
  receiving said first temperature signal and controlling the supply unit to supply of energy to the peripheral heater based on said first temperature signal and on a desired value for said first temperature.

Alternatively the control device is connected to said first electric sensor, and is configured for:
  receiving said electric parameter signal and controlling the supply unit to supply electric energy to the electrically conductive element of the peripheral heater, optionally by regulating voltage applied to the electrically conductive element and/or duration of application of said voltage, based on said electric parameter signal and on a desired value for a temperature of the heating surface of the heater.

Note the control device may also be configured for receiving said electric parameter signal and calculate a value of real temperature of the carbon structure of the peripheral heater based on:
  a value of said electric parameter and
  a calibration curve or calibration table stored in the control device and relating values of the electric parameter with corresponding values of the temperature of the carbon structure.

Additionally the control device may be configured to control the supply unit to supply electric energy to the electrically conductive element of the peripheral, optionally by regulating voltage applied to the electrically conductive element and/or duration of application of said voltage, based on said calculated value of the real temperature, on the desired value for the temperature of the heating surface of the heater.

In a $52^{nd}$ aspect according to any one of the preceding two aspects wherein the control device is connected to the second temperature sensor and is configured for receiving said second temperature signal and controlling the supply unit to supply of energy to the inner heater based on said second temperature signal and on a desired value for said second temperature.

Alternatively, the control device is connected to said second electric sensor, and is configured for:
receiving said electric parameter signal and controlling the supply unit to supply electric energy to the electrically conductive element of the inner heater, optionally by regulating voltage applied to the electrically conductive element and/or duration of application of said voltage, based on said electric parameter signal and on a desired value for a temperature of the heating surface of the heater.

Note the control device may also be configured for receiving said electric parameter signal and calculate a value of real temperature of the carbon structure of the inner heater based on:
a value of said electric parameter and
a calibration curve or calibration table stored in the control device and relating values of the electric parameter with corresponding values of the temperature of the carbon structure.

Additionally, the control device may be configured to control the supply unit to supply electric energy to the electrically conductive element of the inner heater, optionally by regulating voltage applied to the electrically conductive element and/or duration of application of said voltage, based on said calculated value of the real temperature, on the desired value for the temperature of the heating surface of the heater.

In a $53^{rd}$ aspect according to any one of the preceding aspects wherein:
the upper tool comprises a heating head having a respective active surface,
the peripheral heater and the inner heater are both carried by said heating head,
the heating head is configured to take a film sealing position, preferably in correspondence of said second operating condition of the upper and lower tools, wherein at said film sealing position at least the heating surface of the peripheral heater is configured to press against a corresponding top surface of said film portion and allow heat sealing of the film portion to the underlying at least one support, and optionally wherein at said heat sealing position the heating surface of said inner heater is configured to contact or be placed at a prefixed distance from the top surface of said film portion, the control device being configured for controlling the packaging assembly such that—during each said heating cycle
the heating head keeps said film sealing position at least during said first discrete time interval, preferably until after expiration of said first discrete time interval.

In a $54^{th}$ aspect according to any one of the preceding aspects wherein:
the upper tool comprises a heating head having a respective active surface,
the peripheral heater and the inner heater are both carried by said heating head,
the heating surface of the inner heater and the heating surface of the peripheral heater have both annular shape and form part of said active surface, with the heating surface of the peripheral heater located at a radial distance from and surrounding the heating surface of the inner heater,
in a position radially internal to the heating surface of the inner heater, the heating head presents a central recess of fixed volume which—when the upper and lower tools are in said second operating condition—extends vertically away from the lower tool to define a space where at least a part of a product located on a support positioned in one of said seats is receivable;

In a $55^{th}$ aspect according to any one of the preceding aspects from the $1^{st}$ to the $53^{rd}$ wherein:
the upper tool comprises a heating head with a respective active surface,
the peripheral heater and the inner heater are both carried by said heating head,
the heating surface of the peripheral heater and the heating surface of the inner heater lays in a common plane with and forming part of said active surface, and
the heating surface of the peripheral heater is located at a radial distance from and surrounds the heating surface of the inner heater.

In a $56^{th}$ aspect according to any one of the preceding aspects from the $1^{st}$ to the $53^{rd}$ wherein:
the upper tool comprises a heating head with a respective active surface,
the peripheral heater and the inner heater are both carried by said heating head,
the heating surface of the peripheral heater and the heating surface of the inner heater form part of said active surface,
the heating head includes a central body carrying the inner heater and a peripheral body carrying the peripheral heater and surrounding the central body, the peripheral body and the central body being configured to be relatively movable to form a central recess the volume of which is determined by the relative position of the peripheral body with respect to the central body, said central recess being positioned such that—when the upper and lower tools are in said second operating condition—it extends vertically away from the lower tool to define a space where at least a part of a product located on a support is receivable.

In a $57^{th}$ aspect according to any one of the preceding four aspects from the wherein:
the heating head includes means configured to be operative in correspondence of said active surface for holding one or more of said film portions in contact with the active surface;
or
the apparatus includes retention means configured to act on longitudinal opposite borders of said film to hold one or more of said film portions in a position aligned with the heating head and with said one or more seats.

In a $58^{th}$ aspect according to any one of the preceding aspects wherein each of said seats is configured to receive a respective support having a base wall, a sidewall upwardly emerging from the base wall and a top rim radially protruding out of said sidewall.

In a $59^{th}$ aspect according to any one of the preceding aspects said apparatus further comprises:
a support frame,
a film supplying assembly configured for supplying a continuous film;

a film cutting unit active on the continuous film and configured for at least transversally cutting the continuous film; and a film driving assembly.

In a 60$^{th}$ aspect according to the preceding aspect wherein the film cutting unit is located outside the packaging assembly and wherein the film driving assembly is configured for driving cut film sheets from the cutting unit to inside the packaging assembly and above one or more respective supports positioned at the respective seats;

Alternatively, the cutting unit is located inside the packaging assembly and the film driving assembly is configured to drive the continuous film from the film supply assembly to inside the packaging assembly and above one or more respective supports located in respective seats, In a 61$^{st}$ aspect according to any one of the preceding four aspects wherein the control device is connected to the packaging assembly and configured for commanding the packaging assembly to pass from the first to the second operating condition and vice-versa, said upper tool and lower tool cooperating to define a packaging chamber which—in correspondence of said second operating condition—is closed, optionally hermetically closed.

In a 62$^{nd}$ aspect according to the preceding aspect the apparatus comprises:

a vacuum arrangement connected to the packaging chamber and configured for removing gas from said packaging chamber, the vacuum arrangement optionally comprising at least one vacuum pump and at least one evacuation pipe connecting the inside of said packaging chamber to the vacuum pump, said control unit being further configured to control the vacuum arrangement to withdraw gas from said packaging chamber at least when the packaging assembly is in said second operating condition with said packaging chamber hermetically closed.

In a 63$^{rd}$ aspect according to any one of the preceding two aspects the apparatus comprises:

a controlled atmosphere arrangement connected to the packaging chamber and configured for injecting a gas stream into said packaging chamber, the controlled atmosphere arrangement optionally comprising at least one injection device and at least one injection pipe connecting the inside of said packaging chamber to the injection device, said control unit being further configured to control said controlled atmosphere arrangement to inject said stream of gas at least when the packaging assembly is in said second operating condition with said packaging chamber hermetically closed; wherein the controlled atmosphere arrangement is configured to inject gas into the packaging chamber including a quantity of one or more of $N_2$, $O_2$ and $CO_2$ which is different from the quantity of these same gases as present in the atmosphere at 20° C. and sea level (1 atmosphere pressure).

In a 64$^{th}$ aspect according to the preceding aspect the apparatus includes both the vacuum arrangement and the controlled atmosphere arrangement and the control unit is configured to control said controlled atmosphere arrangement to start injecting said stream of gas either after a prefixed delay from activation of said vacuum arrangement or after a prefixed level of vacuum has been reached inside said packaging chamber, optionally wherein said control unit is configured to control said controlled atmosphere arrangement to start injecting said stream of gas while said gas withdrawal from said packaging chamber is still ongoing.

In a 65$^{th}$ aspect according to any one of the preceding sixty-three aspects the control device is configured for:

receiving a desired value for said/a first temperature (this value may be stored in a memory connected to the control device or may be received via a user interface connected to the control device), controlling the supply unit to supply of energy to the peripheral heater based on said desired value for said first temperature.

In a 66$^{th}$ aspect according to any one of the preceding sixty-four aspects control device is configured for:

receiving a desired value for said/a second temperature (this value may be stored in a memory connected to the control device or may be received via a user interface connected to the control device), controlling the supply unit to supply of energy to the inner heater based on said desired value for said second temperature.

In a 67$^{th}$ aspect according to any one of the preceding sixty-five aspects the control device is configured for:

receiving an information identifying the type of film intended to be used (this information may be stored in a memory connected to the control device or may be received via a user interface connected to the control device) and determining a desired value for said first temperature based on said information; for instance the user may be prompted to select among a number of films usable on the apparatus and based on the selection the desired value for the first temperature is set, controlling the supply unit to supply of energy to the peripheral heater based on said desired value for said first temperature.

In a 68$^{th}$ aspect according to any one of the preceding sixty-six aspects the control device is configured for:

receiving an information identifying the type of film intended to be used (this information may be stored in a memory connected to the control device or may be received via a user interface connected to the control device) and determining a desired value for said second temperature based on said information; for instance the user may be prompted to select among a number of films usable on the apparatus and based on the selection the desired value for the first temperature is set, controlling the supply unit to supply of energy to the inner heater based on said desired value for said second temperature.

A 69$^{th}$ aspects concerns the use an apparatus according to any one of the preceding claims for packaging a product (P) using a support on which the product is positioned and a film of the heat-shrinkable type which is heat sealed to the support.

A 70$^{th}$ aspects concerns the use an apparatus according to any one of the preceding claims for packaging a product (P) using tray with a tray base, a tray sidewall and a tray top rim wherein the product is positioned inside the tray and wherein a film of the heat-shrinkable type is heat sealed to the top surface of the tray rim.

In a 71$^{st}$ aspect according to any one of the preceding two aspects the inner heater is brought to the second temperature after: the peripheral heater contacts the film, with the film being in contact with the support or tray, and after the peripheral heater heating surface is brought to the first temperature.

A 72$^{nd}$ aspect concerns a process of packaging a product arranged on a support, using an apparatus according to any one of the preceding claims, the process comprising the following steps:

positioning one or more supports in correspondence of said one or more seats, positioning at least one film portion (which may be in the form of a longitudinal portion of a continuous sheet or in the form of a pre-cut discrete film sheet) above respective one or supports located in said one or more seats, keeping the first and second tools in said first operating condition a time sufficient for the supports and for the corresponding film portion to properly position, moving the upper and lower tools in said second operating condition with the said film portion positioned above the respective support or supports, heat sealing the film portion to the support, the step of heat sealing including the following sub-steps: causing the heating surface of the peripheral heater to contact the film portion top surface of the support or supports located in said seat or seats, increasing a temperature of the heating surface of the peripheral heater to a first temperature, keeping the heating surface of the peripheral heater at least at the first temperature for a first discrete time interval, reducing the temperature of the heating surface of the peripheral heater below said first temperature, causing the heating surface of the inner heater to contact or be placed at a prefixed distance from the top surface of said film portion, increasing a temperature of the heating surface of the inner heater to a second temperature, keeping the heating surface of the inner heater at least at the second temperature for a second discrete time interval, reducing the temperature of the heating surface of the inner heater below said second temperature, positioning the upper and lower tools in said first operating condition, moving the number of supports with the tightly fixed film away from the packaging assembly.

In a $73^{rd}$ aspect according to the preceding aspect the second temperature is different from the first temperature.

In a $74^{th}$ aspect according to the preceding aspect the second temperature is below the first temperature.

In a $75^{th}$ aspect according to any one of the preceding three aspects the film is a heat-shrinkable film.

In a $76^{th}$ aspect according to any one of the preceding four aspects the support is a tray having a base wall and a side wall with a top rim emerging radially out of the sidewall.

In a $77^{th}$ aspect according to the preceding aspect the step of causing the heating surface of the peripheral heater to contact the film portion top surface of the support or supports located in said seat or seats comprises bringing the heating surface of the peripheral heater in contact with the peripheral region of the film portion and this latter in contact with the top surface of the top rim of the tray.

In a $78^{th}$ aspect according to any one of the preceding six aspects wherein the heating surface of the peripheral heater is kept into contact with the film portion until after the heating surface of the peripheral heater is cooled down to a temperature below the first temperature, for instance down to a baseline temperature which is at least 50° C. below the first temperature.

In a $79^{th}$ aspect according to any one of the preceding seven aspects wherein the process includes the following further steps which take place with the film maintained at a distance from the support sufficient to allow gas circulation inside the support, with the upper and lower tools defining in said second operating condition an hermetically closed packaging chamber, causing one or both of: a gas withdrawal from the hermetically closed packaging chamber and gas injection into the packaging chamber of a gas mixture of controlled composition.

In $80^{th}$ aspect according to any one of the preceding eight aspects the steps of:

causing the heating surface of the peripheral heater to contact the film portion top surface of the support or supports located in said seat or seats, increasing a temperature of the heating surface of the peripheral heater to a first temperature, keeping the heating surface of the peripheral heater at least at the first temperature for a first discrete time interval, reducing the temperature of the heating surface of the peripheral heater below said first temperature, are timely sequential steps.

In $81^{st}$ aspect according to any one of the preceding nine aspects the step of heat sealing includes heating with the peripheral heater a peripheral band of said film portion (or film sheet) and heating with the inner heater an inner zone of the same film portion (or film sheet) located radially inside the peripheral band.

In $82^{nd}$ aspect according to any one of the preceding ten aspects the first discrete time period has a duration comprised between 0.2 and 5 seconds.

In $83^{rd}$ aspect according to any one of the preceding eleven aspects the first discrete time period has a duration comprised between 0.5 and 1.5 seconds.

In $84^{th}$ aspect according to any one of the preceding twelve aspects the second discrete time period has a duration comprised between 0.2 and 5 seconds, optionally the second discrete time period has a duration comprised between 0.5 and 1.5 seconds.

In $85^{th}$ aspect according to any one of the preceding fourteen aspects during the heat sealing step the increasing of the temperature of the heating surface of the inner heater to a second temperature starts after the increasing of the temperature of the peripheral heater to the first temperature, the start of said second discrete time interval being delayed with respect to the start of said first time interval.

In particular the start of the second discrete time interval may be delayed until the moment when the heat-sealing surface touches the film portion and this latter touches the support. In accordance with another option, the second discrete time interval may be delayed until after reducing the temperature of the heating surface of the peripheral heater below said first temperature (in other words cooling of the peripheral heater may start before heating of the inner heater is initiated).

In an $86^{th}$ aspect according to the preceding aspect wherein the duration of said first discrete time interval is longer than the duration of said second discrete time interval.

In an $87^{th}$ aspect according to any one of the preceding sixteen aspects, the process includes the steps of withdrawing gas from the hermetically closed packaging chamber, until a pressure comprised between 100 and 300 mbar, optionally between 150 and 250 mbar, is reached inside said packaging chamber and then—while the film portion or film sheet is kept at a distance from the support mouth—injecting a modified atmosphere gas into the packaging chamber ( ), optionally wherein injecting of said stream of gas for creating a modified atmosphere is while gas withdrawal is still ongoing so as to shorten the time for creating the modified atmosphere.

In an $88^{th}$ aspect according to any one of the preceding seventeen aspects, the increasing of the temperature of the heating surface of the inner heater to a second temperature starts after the increasing of the temperature of the peripheral heater to the first temperature: optionally the heating of the inner heater to the second temperature, starts at least 0.1 preferably 0.25 seconds after the heating of the peripheral heater to the first temperature. In other words, the start of the second discrete time interval may be slightly delayed with respect to the start of said first time interval in order to avoid (when using heat-shrinkable film) to cause slippage of the peripheral film portion to be sealed to the rim. In particular the start of the second time interval may be delayed until the moment when the heat-sealing surface touches the film portion and this latter touches the support. In accordance with another option, the second discrete time interval may be delayed until after the end of the first time interval, i.e. until when reducing the temperature of the heating surface of the peripheral heater below said first temperature takes place (in other words cooling of the peripheral heater may start before heating of the inner heater is initiated).

In an $89^{th}$ aspect according to an one of the preceding eighteen aspects the process also includes cooling of said inner heater and said peripheral heater by circulation of a cooling fluid (water or oil or other fluid) in a cooling circuit adjacent the heating surfaces to obtain a sharp temperature reduction of the heating surfaces of the peripheral and inner heaters after said first and second discrete time intervals.

In an $90^{th}$ aspect according to an one of the preceding nineteen aspects the said increasing to the first temperature is a sharp increase of temperature of the heating surface of the peripheral heater from a respective baseline temperature to the first temperature. By sharp increase it is meant increasing said temperature of the heating surface of the peripheral heater with a temperature increase rate over time higher than 1° C./msec, optionally higher than 5° C./msec.

In an $91^{st}$ aspect according to an one of the preceding twenty aspects the said increasing to the second temperature is a sharp increase of the temperature of the heating surface of the inner heater from a respective baseline temperature to the second temperature. By sharp increase it is meant increasing said temperature of the heating surface of the inner heater with a temperature increase rate over time higher than 1° C./msec, optionally higher than 5° C./msec.

In an $92^{nd}$ aspect according to an one of the preceding twenty-one aspects the said reducing of the first temperature is a sharp decrease of temperature of the heating surface of the peripheral heater from the first temperature to a respective baseline temperature. By sharp decrease it is meant decreasing said temperature of the heating surface of the peripheral heater with a temperature decrease rate over time higher than 1° C./msec, optionally higher than 5° C./msec.

In an $93^{rd}$ aspect according to an one of the preceding twenty-two aspects the said reducing of the second temperature is a sharp decrease of the temperature of the heating surface of the inner heater from the second temperature to a respective baseline temperature. By sharp decrease it is meant decreasing said temperature of the heating surface of the inner heater with a temperature decrease rate over time higher than 1° C./msec, optionally higher than 5° C./msec.

A $94^{th}$ aspect concerns a heater assembly for a packaging assembly having:
a heater with a heating surface configured to heat seal one or more parts of a plastic film, the heater comprising at least one electric conductive element, and
a supply unit connected to the electric conductive element of the heater and configured to supply electric energy to said heater by causing an electric current flow through said electric conductive element,
wherein the electrically conductive element comprises an electrically conductive carbon structure.

More in detail, the electrically conductive carbon structure includes (or is exclusively formed of) one or more carbon allotropes in the group of:
a graphite structure,
a single or multi-layer graphene structure,
a fullerene structure, where the carbon atoms are bonded together in spherical, tubular, fiber-like or ellipsoidal formations: in particular the fullerene structure may take the form of carbon nanotubes or carbon nanofibers.

It is to be noted that the electrically conductive element may be formed by an electrically conductive carbon structure completely formed in one or more of the carbon allotropes disclosed above.

For example, the electrically conductive element may be exclusively formed in graphite, or the electrically conductive element may be exclusively formed in one single graphene layer, or the electrically conductive element may be exclusively formed in a plurality of mutually overlapping graphene layers, or the electrically conductive element may be exclusively formed in a fullerene structure of carbon nanotubes, or the electrically conductive element may be formed in a fullerene structure of carbon nano-fibers.

According to a further variant the carbon structure may comprise a structure formed by carbon filaments which are adjacently in contact to each other to form a conductive body or by carbon filaments embedded in a plastic resin matrix: in this latter case the carbon filaments may be adjacently placed and electrically connected to each other at prescribed sections such as at ends thereof.

In a $95^{th}$ aspect according to the preceding aspect the electrically conductive element comprises a structural substrate carrying the carbon structure and at least one protective layer covering the carbon structure on a side opposite that of the structural substrate, optionally wherein said carbon structure is sandwiched between two opposite protective layers, further wherein the protective layer opposite the structural substrate defining the heating surface of said heater.

In a $96^{th}$ aspect according to any one of the preceding two aspects the carbon structure comprises or is exclusively formed of a plurality of mutually overlapping graphene layers defining a carbon structure of flat elongated conformation.

In a $97^{th}$ aspect according to any one of the preceding three aspects the carbon structure comprises a cross section with thickness of at least 5 μm and a width of at least 2 mm, optionally a cross section with thickness of at least 10 μm and a width of at least 5 mm.

In a $98^{th}$ aspect according to any one of the preceding four aspects the carbon structure presents an average electric resistivity higher than 5 $\Omega \cdot mm^2/m$, optionally comprised between 15 and 25 $\Omega \cdot mm^2/m$.

A $99^{th}$ aspect concerns a packaging apparatus including:
a packaging assembly configured for receiving a product (P) to be packaged and at least one film for packaging the product (P),
and a heating assembly associated to the packaging assembly, wherein the heating assembly is according to any one of the preceding five aspects.

A $100^{th}$ aspect concerns a packaging apparatus of the preceding aspect wherein:
said packaging assembly is configured for receiving at least one support and for tightly fixing the film to the support, the packaging assembly including:

a lower tool defining a prefixed number of seats configured for receiving said at least one support with a product (P) to be packaged, an upper tool facing and cooperating with the lower tool, said upper tool and lower tool being relatively movable at least between a first operating condition, where the upper tool and lower tool are spaced apart the one from the other and allow positioning of at least one film portion of said film above one or more of said at least one supports, and a second operating condition, where the upper tool and lower tool are approached to one another and allow heat sealing of said film portion to the at least one support located at said one or more seats, said heater comprises a peripheral heater carried by the upper tool, and wherein the electrically conductive element comprises a first electrically conductive element forming part of the peripheral heater, the peripheral heater being configured to heat seal at least a peripheral region of said film portion to the at least one support.

A $101^{th}$ aspect concerns an apparatus of the preceding aspect or a heating assembly according to any one of the preceding seven aspects further comprising a control device acting on the supply unit and configured for commanding the supply unit and control a supply of electric energy to the heater, said control device being further configured to command the supply unit to execute a heating cycle including the following steps:

applying an electric voltage to the electrically conductive element to cause the increase in temperature of the heating surface of the heater to a first temperature, maintaining said electric voltage for keeping the heating surface of the heater at least at the first temperature for a first discrete time interval, reducing or nullifying the voltage applied to the electrically conductive element for reducing the temperature of the heating surface of the heater below said first temperature.

A $102^{th}$ aspect concerns an apparatus or a heating assembly of the preceding aspect wherein the first discrete time period has a duration comprised between 0.2 and 5 seconds, in particular between 0.5 and 1.5 seconds, and wherein the electric voltage is maintained applied to the electrically conductive element for a time period substantially equal to the first discrete time period.

In a $103^{th}$ aspect according to any one of the preceding three aspects, the heater of the apparatus is carried by a heating head of said packaging assembly, the heating heat being movable from a rest position, where it is spaced apart from the film to be heat sealed, to a film sealing position, where the heating surface of the heater contacts a surface to be sealed of the film, further wherein the control device is configured for controlling the packaging assembly such that—during each said heating cycle—the heating head keeps said film sealing position at least during said first discrete time interval, preferably until after expiration of said first discrete time interval.

A $104^{th}$ aspect concerns an apparatus of any one of the preceding four aspects or a heating assembly of any one of the preceding nine aspects wherein the electric supply unit comprises:

at least one impulse transformer configured to generate voltage pulses of a duration—intended as total duration of the pulses sequence—comprised between 0.1 seconds and 5 seconds, optionally between 0.2 and 1.5 seconds.

at least one electric circuitry connecting the impulse transformer to the electrically conductive element, wherein said control device is configured to act on the supply unit to supply electric current at a predetermined voltage and for a predetermined time period to said electrically conductive element.

A $105^{th}$ aspect concerns an apparatus of any one of the preceding five aspects or a heating assembly of any one of the preceding ten aspects comprising a first temperature sensor configured for detecting a temperature of the heating surface of the heater and emitting a corresponding first temperature signal correlated to the detected temperature, wherein the control device is connected to said first temperature sensor, and is configured for:

receiving said first temperature signal and controlling the supply unit to supply of electric energy to the electrically conductive element, optionally by regulating voltage applied to the electrically conductive element and/or duration of application of said voltage, based on said first temperature signal and on a desired value for said first temperature.

A $106^{th}$ aspect concerns an apparatus of any one of the preceding six aspects, wherein the heater further comprises an inner heater also carried by the upper tool and having an heating surface configured to heat at least a part of said film portion, wherein the peripheral heater surrounds the inner heater, and wherein the electrically conductive element comprises a second electrically conductive element forming part of the inner heater, the control device being further configured for controlling the supply unit to supply electric energy to the first electrically conductive element independently from a supply of energy to the second electrically conductive element, further wherein said heating cycle includes the following additional steps:

applying an electric voltage to the second electrically conductive element to cause the increase of the temperature of the heating surface of the inner heater to a second temperature different from the first temperature, maintaining said electric voltage applied to the second electrically conductive element for keeping the heating surface of the inner heater at least at the second temperature for a second discrete time interval, reducing or nullifying the voltage applied to the second electrically conductive for reducing the temperature of the heating surface of the inner heater below said second temperature.

In accordance with this aspect the apparatus may further include the following features:

a first temperature sensor configured for detecting a temperature of the heating surface of the peripheral heater and emitting a corresponding first temperature signal correlated to the detected temperature. Note that the first temperature sensor may be a contact temperature sensor or a contactless temperature sensor (e.g. an IR sensor);

as presence of the first temperature sensor may not be necessary, temperature of the heating surface may be calculated based on the measured electric resistance of the first electrically conductive element.

For instance a first electric sensor may be used: the first electric sensor is electrically connected or connectable to the carbon structure of the peripheral heater and configured for detecting an electric parameter of said carbon structure and emitting a corresponding electric parameter signal, wherein the electric parameter comprises one of an electric impedance of a prefixed segment of said carbon structure, an electric current flowing through said prefixed segment of carbon structure when a prefixed electric voltage is applied at ends of said prefixed segment, an electric voltage detected at ends of the prefixed segment when a prefixed electric current is imposed to flow through said prefixed segment.

a second temperature sensor for detecting a temperature of the heating surface of the inner heater and emitting a corresponding second temperature signal correlated to the detected temperature. Note that the second temperature sensor may be a contact temperature sensor or a contactless temperature sensor (e.g. an IR sensor);

as presence of the second temperature sensor may not be necessary, temperature of the heating surface may be calculated based on the measured electric resistance of the second electrically conductive element.

For instance a second electric sensor may be used; the second electric sensor is electrically connected or connectable to the carbon structure of the inner heater and is configured for detecting an electric parameter of said carbon structure and emitting a corresponding electric parameter signal: the electric parameter comprises one of an electric impedance of a prefixed segment of said carbon structure, an electric current flowing through said prefixed segment of carbon structure when a prefixed electric voltage is applied at ends of said prefixed segment, an electric voltage detected at ends of the prefixed segment when a prefixed electric current is imposed to flow through said prefixed segment.

The control device may be connected to said first temperature sensor and be configured for:

receiving said first temperature signal and controlling the supply unit to supply energy to the peripheral heater based on said first temperature signal and on a desired value for said first temperature.

Alternatively the control device may be connected to said first electric sensor, and be configured for:

receiving said electric parameter signal and controlling the supply unit to supply electric energy to the electrically conductive element of the peripheral heater, optionally by regulating voltage applied to the electrically conductive element and/or duration of application of said voltage, based on said electric parameter signal and on a desired value for a temperature of the heating surface of the heater.

Note the control device may also be configured for receiving said electric parameter signal and calculate a value of real temperature of the carbon structure of the peripheral heater based on:

a value of said electric parameter and a calibration curve or calibration table stored in the control device and relating values of the electric parameter with corresponding values of the temperature of the carbon structure.

Additionally the control device may be configured to control the supply unit to supply electric energy to the electrically conductive element of the peripheral heater, optionally by regulating voltage applied to the electrically conductive element and/or duration of application of said voltage, based on said calculated value of the real temperature, on the desired value for the temperature of the heating surface of the heater.

The control device may also connected to the second temperature sensor and be configured for receiving said second temperature signal and controlling the supply unit to supply of energy to the inner heater based on said second temperature signal and on a desired value for said second temperature.

Alternatively, the control device may be connected to said second electric sensor, and is configured for:

receiving said electric parameter signal and controlling the supply unit to supply electric energy to the electrically conductive element of the inner heater, optionally by regulating voltage applied to the electrically conductive element and/or duration of application of said voltage, based on said electric parameter signal and on a desired value for a temperature of the heating surface of the heater.

Note the control device may also be configured for receiving said electric parameter signal and calculate a value of real temperature of the carbon structure of the inner heater based on:

a value of said electric parameter and a calibration curve or calibration table stored in the control device and relating values of the electric parameter with corresponding values of the temperature of the carbon structure.

Additionally, the control device may be configured to control the supply unit to supply electric energy to the electrically conductive element of the inner heater, optionally by regulating voltage applied to the electrically conductive element and/or duration of application of said voltage, based on said calculated value of the real temperature, on the desired value for the temperature of the heating surface of the heater.

A $107^{th}$ aspect concerns an apparatus of any one of the preceding seven aspects, wherein:

said control device is configured to command the supply unit to consecutively repeat execution of said heating cycle a plurality of times, during each of said consecutive heating cycles at least one of said film portions being heat sealed to at least one respective support, said control device—during each heating cycle—is configured for controlling the supply unit to supply energy to the first electrically conductive element of the peripheral heater only during a discrete time period followed by a time period when no energy is supplied for causing the increase and keeping of the heating surface of the peripheral heater at least at the first temperature for the first discrete time interval, and for causing a subsequent reduction of the temperature of the heating surface of the peripheral heater below said first temperature, optionally—said control device—during each heating cycle—is configured for controlling the supply unit to supply energy to the second electrically conductive element of the inner heater only during a discrete time period followed by a time period when no energy is supplied for causing the increase and keeping of the heating surface of the inner heater at least at the second temperature for the second discrete time interval, and for causing a subsequent reduction of the temperature of the heating surface of the inner heater below said second temperature.

A $108^{th}$ aspect concerns an apparatus of any one of the preceding eight aspects wherein the heating cycle is configured such that the second temperature is inferior with respect to the first temperature, and wherein said first temperature is comprised between 150° C. and 260° C., optionally between 180-240° C., more optionally between 200-220° C.;

said second temperature (if there is a second or inner heater) is comprised between 150° C. and 260° C., optionally between 180-240° C., more optionally between 200-220° C.

further wherein the first discrete time period has a duration comprised between 0.2 and 5 seconds, in particular between 0.5 and 1.5 seconds, and optionally wherein the second discrete time period has a duration comprised between 0.2 and 5 seconds, in particular between 0.5 and 1.5 seconds;

A 109$^{th}$ aspect concerns an apparatus of any one of the preceding nine aspects further wherein the control device is configured to command the supply unit to sharply increase the temperature of the heating surface of the peripheral heater from a respective baseline temperature to the first temperature with a temperature increase rate over time higher than 1° C./msec, optionally higher than 5° C./msec;

optionally further wherein the control device is configured to command the supply unit to sharply increase the temperature of the heating surface of the inner heater from a respective baseline temperature to the second temperature with a temperature increase rate over time higher than 1° C./msec, optionally higher than 5° C./msec.

A 110$^{th}$ aspect concerns an apparatus of any one of the preceding four aspects wherein each heating cycle is configured such that the increasing of the temperature of the heating surface of the inner heater to a second temperature starts after the increasing of the temperature of the peripheral heater to the first temperature, the start of said second discrete time interval being delayed with respect to the start of said first time interval, optionally wherein the start of the second discrete time interval takes place immediately after the end of the first time interval, more optionally wherein the duration of said first discrete time interval is longer than the duration of said second discrete time interval.

A 111$^{th}$ aspect concerns an apparatus of any one of the preceding five aspects wherein:

the heating surface of said peripheral heater has an annular shape and surrounds the heating surface of the inner heater, and when the upper and lower tools are in said second operating position, the peripheral heater is configured to heat a peripheral band of said film portion while the inner heater is configured to heat at least a part of an inner zone of the same film portion located radially inside the peripheral band.

A 112$^{th}$ aspect concerns an apparatus of any one of the preceding six aspects wherein:

both the heating surface of the peripheral heater and the heating surface of the inner heater are flat and at least when the upper and lower tools are in said second operating position, the heating surface of the peripheral heater is:

either coplanar to the heating surface of the inner heater or indented with respect to the peripheral surface of the inner heater, such that when the heating surface of the peripheral heater contacts a top surface of the film portion, the heating surface of the inner heater is spaced apart by a prefixed distance from the top surface of the same film portion.

A 113$^{th}$ aspect concerns an apparatus of any one of the preceding seven aspects wherein the heating surface of the inner heater is located at a radial distance from the heating surface of the peripheral heater and extends in an area surrounded by the heating surface of the peripheral heater, said heating surface of the inner heater comprising one selected in the group of:

a heating surface of annular shape, a continuous heating surface delimited by a single closed contour line, optionally a discoidal or polygonal continuous heating surface, said continuous heating surface occupying substantially all or a majority of said area surrounded by the heating surface of the peripheral heater, a heating surface including a plurality of parallel spaced apart bands connected at ends thereof by transverse bands.

A 114$^{th}$ aspect concerns an apparatus of any one of the preceding eight aspects wherein the first electrically conductive element of the peripheral heater extends along the heating surface of the peripheral heater, said first electrically conductive element being an electrically conductive annular element, optionally an electrically conductive annular flat element, having an electrically conductive carbon structure comprising (or exclusively formed of) one or more carbon allotropes in the group of:

a graphite structure, a single or multi-layer graphene structure, a fullerene structure, where the carbon atoms are bonded together in spherical, tubular, fiber-like or ellipsoidal formations: in particular the fullerene structure may take the form of carbon nanotubes or carbon nanofibers.

It is to be noted that the first electrically conductive element may be formed by an electrically conductive carbon structure completely formed in one or more of the carbon allotropes disclosed above.

For example, the first electrically conductive element may be exclusively formed in graphite, or the first electrically conductive element may be exclusively formed in one single graphene layer, or first the electrically conductive element may be exclusively formed in a plurality of mutually overlapping graphene layers, or the first electrically conductive element may be exclusively formed in a fullerene structure of carbon nanotubes, or the first electrically conductive element may be formed in a fullerene structure of carbon nano-fibers.

According to a further variant the carbon structure may comprise a structure formed by carbon filaments which are adjacently in contact to each other to form a conductive body or by carbon filaments embedded in a plastic resin matrix: in this latter case the carbon filaments may be adjacently placed and electrically connected to each other at prescribed sections such as at ends thereof.

As to the second electrically conductive element of the inner heater, it extends along the heating surface of the inner heater, said second conductive element being one selected in the group of:

an electrically conductive annular element, optionally an electrically conductive annular flat element, having an electrically conductive carbon structure;

an electrically conductive continuous plate, having an electrically conductive carbon structure;

an electrically conductive meander element, optionally an electrically conductive flat meander element, having an electrically conductive carbon structure.

The second electrically conductive element (for instance in the form of a flat annular or plate or meander shaped element) comprises an electrically conductive carbon structure; the electrically conductive carbon structure includes (or is exclusively formed of) one or more carbon allotropes in the group of:

a graphite structure, a single or multi-layer graphene structure, a fullerene structure, where the carbon atoms are bonded together in spherical, tubular, fiber-like or ellipsoidal formations: in particular the fullerene structure may take the form of carbon nanotubes or carbon nanofibers.

It is to be noted that the second electrically conductive element may be formed by an electrically conductive carbon structure completely formed in one or more of the carbon allotropes disclosed above.

For example, the second electrically conductive element may be exclusively formed in graphite, or the second electrically conductive element may be exclusively formed in one single graphene layer, or the second electrically conductive element may be exclusively formed in a plurality of mutually overlapping graphene layers, or the second electrically conductive element may be exclusively formed in a fullerene structure of carbon nanotubes, or the second electrically conductive element may be formed in a fullerene structure of carbon nano-fibers.

According to a further variant the carbon structure may comprise a structure formed by carbon filaments which are adjacently in contact to each other to form a conductive body or by carbon filaments embedded in a plastic resin matrix: in this latter case the carbon filaments may be adjacently placed and electrically connected to each other at prescribed sections such as at ends thereof.

A $115^{th}$ aspect concerns an apparatus of any one of the preceding nine aspects the first electrically conductive element comprises a structural substrate carrying a respective carbon structure and at least one protective layer covering the carbon structure on a side opposite that of the structural substrate, optionally wherein said carbon structure is sandwiched between two opposite protective layers, the protective layer opposite the structural substrate defining the heating surface of said peripheral heater; optionally with the carbon structure of the first electrically conductive element comprising a plurality of mutually overlapping graphene layers forming a carbon structure of flat conformation.

In a $116^{th}$ aspect according to the preceding aspect the carbon structure of the first electrically conductive element of the peripheral heater has a cross section with thickness of at least 5 μm and a width of at least 3 mm, more optionally a cross section with thickness of at least 10 μm and a width of at least 5 mm, and an average electric resistivity higher than 5 $\Omega \cdot mm^2/m$, optionally comprised between 15 and 25 $\Omega \cdot mm^2/m$.

A $117^{th}$ aspect concerns an apparatus of any one of the preceding eleven aspects wherein the second electrically conductive element comprises a structural substrate carrying a respective carbon structure and at least one protective layer covering the carbon structure on a side opposite that of the structural substrate, optionally wherein said carbon structure is sandwiched between two opposite protective layers, the protective layer opposite the structural substrate defining the heating surface of said inner heater; optionally with the carbon structure of the second electrically conductive element comprising a plurality of mutually overlapping graphene layers forming a carbon structure of flat conformation.

In a $118^{th}$ aspect according to the preceding aspect the carbon structure of the second electrically conductive element of the inner heater has a cross section with thickness of at least 5 μm and a width of at least 5 mm, more optionally a cross section with thickness of at least 10 μm and a width of at least 10 mm, and an average electric resistivity higher than 2 $\Omega \cdot mm^2/m$, optionally higher than 5 $\Omega \cdot mm^2/m$.

A $120^{th}$ aspect concerns an apparatus of any one of the preceding thirteen aspects comprising a cooling circuit associated to the upper tool and configured to cool said inner heater and said peripheral heater, said cooling circuit being controlled by the control device which is further configured to cause circulation of a cooling fluid in said cooling circuit and for regulating a cooling fluid temperature.

A $121^{st}$ aspect concerns an apparatus of any one of the preceding fourteen aspects wherein the electric supply unit comprises:
  at least one electric impulse transformer,
  at least one electric circuitry connecting the electric impulse transformer to the first electrically conductive element and to the second electrically conductive element;
  or
  at least a first electric impulse transformer and a first electric circuitry connecting the first electric impulse transformer to the first electrically conductive element, and
  at least a second electric impulse transformer and a second electric circuitry connecting the second electric impulse transformer to the second electric impedance,
wherein said control device is configured to act on the electric supply unit to independently supply electric current at a predetermined voltage to said first and, respectively, second electrically conductive elements.

A $122^{nd}$ aspect concerns an apparatus of any one of the preceding fifteen aspects, further including:
  a first temperature sensor configured for detecting a temperature of the heating surface of the peripheral heater and emitting a corresponding first temperature signal correlated to the detected temperature,
  a second temperature sensor for detecting a temperature of the heating surface of the inner heater and emitting a corresponding second temperature signal correlated to the detected temperature,
wherein the control unit is connected to said first temperature sensor, and to said second temperature sensor, and is configured for:
  receiving said first temperature signal and controlling the supply unit to supply of energy to the first electrically conductive element, optionally by regulating voltage applied to the first electrically conductive element and/or duration of application of said voltage, based on said first temperature signal and on a desired value for said first temperature,
  receiving said second temperature signal and controlling the supply unit to supply of energy to the second electrically conductive element, optionally by regulating voltage applied to the second electrically conductive element and/or duration of application of said voltage, based on said second temperature signal and on a desired value for said second temperature.

A $123^{rd}$ aspect concerns an apparatus of any one of the preceding sixteen aspects wherein:
  the upper tool comprises a heating head having a respective active surface,
  the peripheral heater and the inner heater are both carried by said heating head,
  the heating head is configured to take a film sealing position, preferably in correspondence of said second operating condition of the upper and lower tools, wherein at said film sealing position at least the heating surface of the peripheral heater is configured to press against a corresponding top surface of said film portion and allow heat sealing of the film portion to the underlying at least one support, and optionally wherein at said heat sealing position the heating surface of said inner heater is configured to contact or be placed at a prefixed distance from the top surface of said film portion, the control device being configured for controlling the packaging assembly such that—during each said heating cycle the heating head keeps said film sealing position at least during said first discrete time interval, preferably until after expiration of said first discrete time interval.

A 124$^{th}$ aspect concerns an apparatus of any one of the preceding seventeen aspects wherein:

the upper tool comprises a heating head having a respective active surface, the peripheral heater and the inner heater are both carried by said heating head, the heating surface of the inner heater and the heating surface of the peripheral heater have both annular shape and form part of said active surface, with the heating surface of the peripheral heater located at a radial distance from and surrounding the heating surface of the inner heater, in a position radially internal to the heating surface of the inner heater, the heating head presents a central recess of fixed volume which—when the upper and lower tools are in said second operating condition—extends vertically away from the lower tool to define a space where at least a part of a product located on a support positioned in one of said seats is receivable;

or wherein:

the upper tool comprises a heating head with a respective active surface, the peripheral heater and the inner heater are both carried by said heating head, the heating surface of the peripheral heater and the heating surface of the inner heater lays in a common plane with and forming part of said active surface, and the heating surface of the peripheral heater is located at a radial distance from and surrounds the heating surface of the inner heater;

or wherein the upper tool comprises a heating head with a respective active surface, the peripheral heater and the inner heater are both carried by said heating head, the heating surface of the peripheral heater and the heating surface of the inner heater form part of said active surface, the heating head includes a central body carrying the inner heater and a peripheral body carrying the peripheral heater and surrounding the central body, the peripheral body and the central body being configured to be relatively movable to form a central recess the volume of which is determined by the relative position of the peripheral body with respect to the central body, said central recess being positioned such that—when the upper and lower tools are in said second operating condition—it extends vertically away from the lower tool to define a space where at least a part of a product located on a support is receivable.

A 125$^{th}$ aspect concerns an apparatus of any one of the preceding eighteen aspects, wherein:

the heating head includes means configured to be operative in correspondence of said active surface for holding one or more of said film portions in contact with the active surface;

or the apparatus includes retention means configured to act on longitudinal opposite borders of said film to hold one or more of said film portions in a position aligned with the heating head and with said one or more seats.

A 126$^{th}$ aspect concerns an apparatus of any one of the preceding nineteen aspects wherein each of said seats is configured to receive a respective support having a base wall, a sidewall upwardly emerging from the base wall and a top rim radially protruding out of said sidewall, said apparatus further comprising:

a support frame, a film supplying assembly configured for supplying a continuous film;

a film cutting unit active on the continuous film and configured for at least transversally cutting the continuous film, wherein the film cutting assembly is located outside the packaging assembly or inside the packaging assembly, a film driving assembly, which—in case the cutting unit is located outside the packaging assembly—is configured for driving cut film sheets from the cutting unit to inside the packaging assembly and above one or more respective supports positioned at the respective seats or which—in case the cutting unit is located inside the packaging assembly is configured to drive the continuous film from the film supply assembly to inside the packaging assembly and above one or more respective supports located in respective seats, wherein the control device is connected to the packaging assembly and configured for commanding the packaging assembly to pass from the first to the second operating condition and vice-versa, said upper tool ( ) and lower tool ( ) cooperating to define a packaging chamber which—in correspondence of said second operating condition—is closed, optionally hermetically closed.

A 127$^{th}$ aspect concerns an apparatus of any one of the preceding twenty aspects comprising at least one of:

a vacuum arrangement connected to the packaging chamber and configured for removing gas from said packaging chamber, the vacuum arrangement optionally comprising at least one vacuum pump and at least one evacuation pipe connecting the inside of said packaging chamber to the vacuum pump, said control unit being further configured to control the vacuum arrangement to withdraw gas from said packaging chamber at least when the packaging assembly is in said second operating condition with said packaging chamber hermetically closed; and a controlled atmosphere arrangement connected to the packaging chamber and configured for injecting a gas stream into said packaging chamber, the controlled atmosphere arrangement optionally comprising at least one injection device and at least one injection pipe connecting the inside of said packaging chamber to the injection device, said control unit being further configured to control said controlled atmosphere arrangement to inject said stream of gas at least when the packaging assembly is in said second operating condition with said packaging chamber hermetically closed; wherein the controlled atmosphere arrangement is configured to inject gas into the packaging chamber including a quantity of one or more of $N_2$, $O_2$ and $CO_2$ which is different from the quantity of these same gases as present in the atmosphere at 20° C. and sea level (1 atmosphere pressure), optionally wherein the apparatus includes both the vacuum arrangement and the controlled atmosphere arrangement and wherein the control unit is configured to control said controlled atmosphere arrangement to start injecting said stream of gas either after a prefixed delay from activation of said vacuum arrangement or after a prefixed level of vacuum has been reached inside said packaging chamber more optionally wherein said control unit is configured to control said controlled atmosphere arrangement to start injecting said stream of gas while said gas withdrawal from said packaging chamber is still ongoing.

A 128$^{th}$ aspect concerns an apparatus of any one of the preceding twenty-one aspects wherein control device is configured for:

receiving a desired value for said first temperature and a desired value for said second temperature, optionally via a user interface connected to the control device, or receiving an information identifying the type of film intended to be used, optionally via a user interface connected to the control device, and determining a desired value for said first temperature and said second temperature based on said information;

controlling the supply unit to supply of energy to the peripheral heater based on said desired value for said first temperature, controlling the supply unit to supply of energy to the inner heater based on said desired value for said second temperature.

A 129$^{th}$ aspect concerns an apparatus of any one of the preceding aspects relating to an apparatus for packaging a product (P) by:

heat sealing a heat-shrinkable film to support onto which said product (P) has been previously placed or by positioning at least one heat-shrinkable film around the product (P) and then heat sealing one or more portions of said heat-shrinkable film to one another.

A 130$^{th}$ aspect concerns a process of packaging a product (P) arranged on a support, said support having a base wall and a side wall, said process using an apparatus according to any one of the preceding aspects directed to an apparatus, the process comprising the following steps:

positioning one or more supports in correspondence of said one or more seats, positioning at least one film portion or at least one film sheet above respective one or more supports located in said one or more seats, keeping the first and second tools in said first operating condition a time sufficient for the supports and for the corresponding film portion or film sheet to properly position, moving the upper and lower tools in said second operating condition with the said film portion or film sheet positioned above the respective support or supports, optionally at a distance sufficient to allow gas circulation inside the support (4), optionally wherein in said second operating condition the upper and lower tools define an hermetically closed packaging chamber with the process including causing one or both of: a gas withdrawal from the hermetically closed packaging chamber and gas injection into the packaging chamber of a gas mixture of controlled composition, heat sealing the film portion or the film sheet to the support the step of heat sealing including the following sub-steps: causing the heating surface of the peripheral heater to contact the film portion or film sheet top surface of the support o supports located in said seat or seats, increasing a temperature of the heating surface of the peripheral heater to a first temperature, keeping the heating surface of the peripheral heater at least at the first temperature for a first discrete time interval, reducing the temperature of the heating surface of the peripheral heater below said first temperature, causing the heating surface of the inner heater to contact or be placed at a prefixed distance from the top surface of said film portion, increasing a temperature of the heating surface of the inner heater to a second temperature different from the first temperature, keeping the heating surface of the inner heater at least at the second temperature for a second discrete time interval, reducing the temperature of the heating surface of the inner heater below said second temperature, positioning the upper and lower tools in said first operating condition, moving the number of supports with the tightly fixed film away from the packaging assembly.

A 131$^{st}$ aspect concerns a process according to the preceding aspect wherein heat sealing includes heating with the peripheral heater a peripheral band of said film portion or film sheet and heating with the inner heater an inner zone of the same film portion or film sheet located radially inside the peripheral band, wherein the film is non-heat shrinkable and the first temperature is equal to the second temperature or wherein the film is heat shrinkable and the second temperature is inferior to the first temperature.

A 132$^{nd}$ aspect concerns a process according to any one the preceding two aspects wherein the first discrete time period has a duration comprised between 0.2 and 5 seconds, in particular between 0.5 and 1.5 seconds, and wherein the second discrete time period has a duration comprised between 0.2 and 5 seconds, in particular between 0.5 and 1.5 seconds.

A 133$^{rd}$ aspect concerns a process according to any one of the preceding three aspects wherein during the heat sealing step the increasing of the temperature of the heating surface of the inner heater to a second temperature starts after the increasing of the temperature of the peripheral heater to the first temperature, the start of said second discrete time interval being delayed with respect to the start of said first time interval, optionally wherein the duration of said first discrete time interval is longer than the duration of said second discrete time interval.

A 134$^{th}$ aspect concerns a process according to any one of the preceding four aspects comprising the steps of withdrawing gas from the hermetically closed packaging chamber, until a pressure comprised between 100 and 300 mbar, optionally between 150 and 250 mbar, is reached inside said packaging chamber and then—while the film portion or film sheet is kept at a distance from the support mouth—injecting a modified atmosphere gas into the packaging chamber, optionally wherein injecting of said stream of gas for creating a modified atmosphere is while gas withdrawal is still ongoing so as to shorten the time for creating the modified atmosphere.

BRIEF DESCRIPTION OF THE DRAWINGS

The present invention will become clearer by reading the following detailed description, given by way of example and not of limitation, to be read with reference to the accompanying drawings, wherein:

FIG. 1 is a schematic side view layout of an apparatus according to aspects of the invention wherein a film is provided from a film roll and pre-cut into film sheets outside with respect to a packaging assembly where the pre-cut film sheets are heat sealed to a support, e.g. in the form of a tray;

FIG. 1A is a schematic side view layout of an apparatus according to aspects of the invention wherein a film is provided from a film roll and fed to a packaging assembly where the film is heat sealed to a support, e.g. in the form of a tray, and cut into discrete film sheets either immediately before heat sealing or after film sealing;

Figure 32:
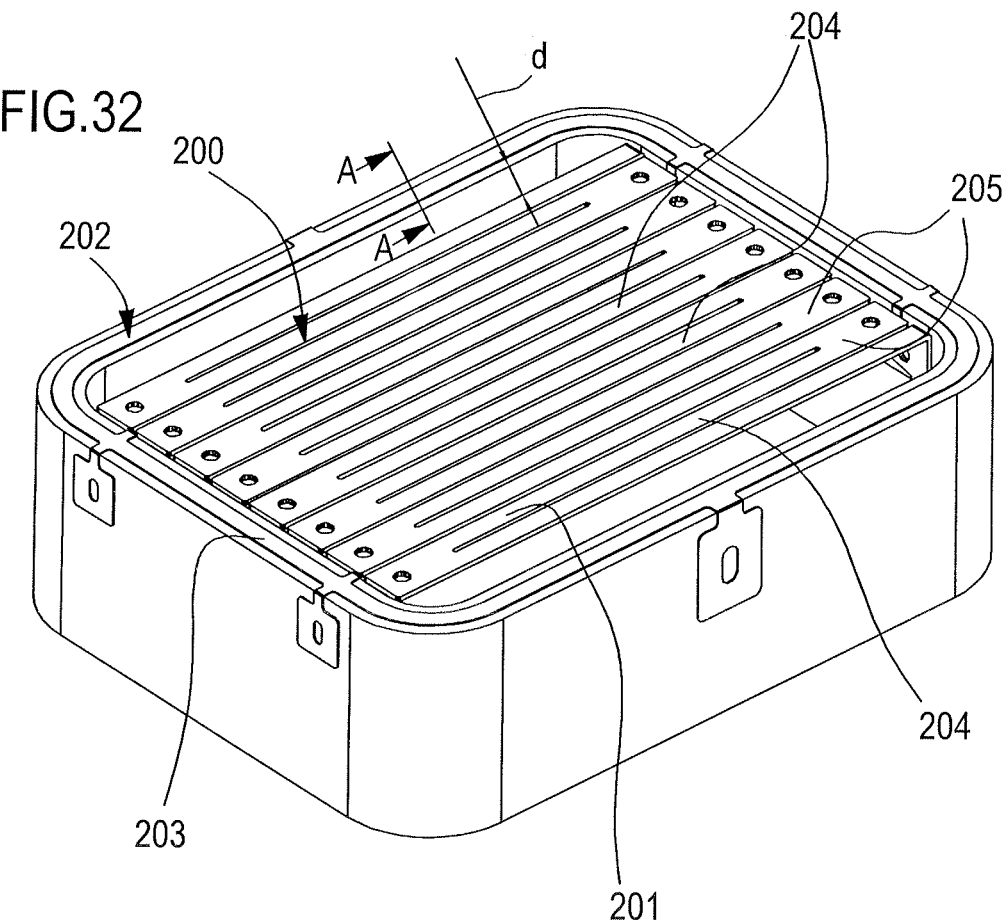
FIG. 32 is a perspective view of a first alternative heating head according to aspects of the invention.
Figure 32A:
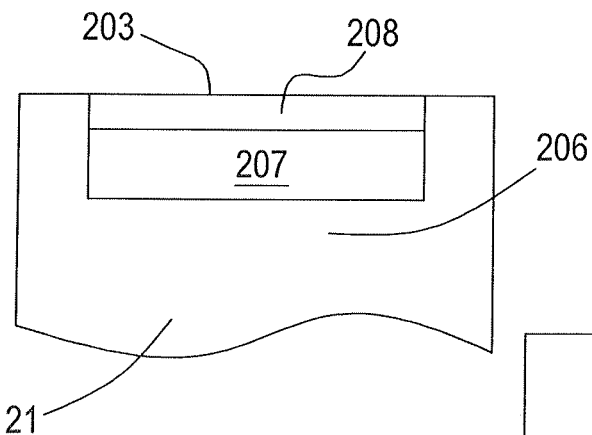
FIG. 32A represents a first option of the structure of a first conductive element, in interrupted cross section taken according to section plane A-A of FIG. 32.
Figure 32B:
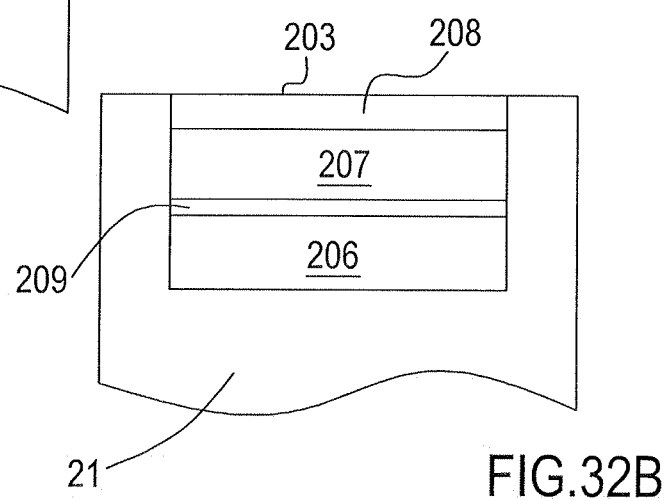
FIG. 32B represents a second option of the structure of a first conductive element, in interrupted cross section taken according to section plane A-A of FIG. 32.
Figure 33:
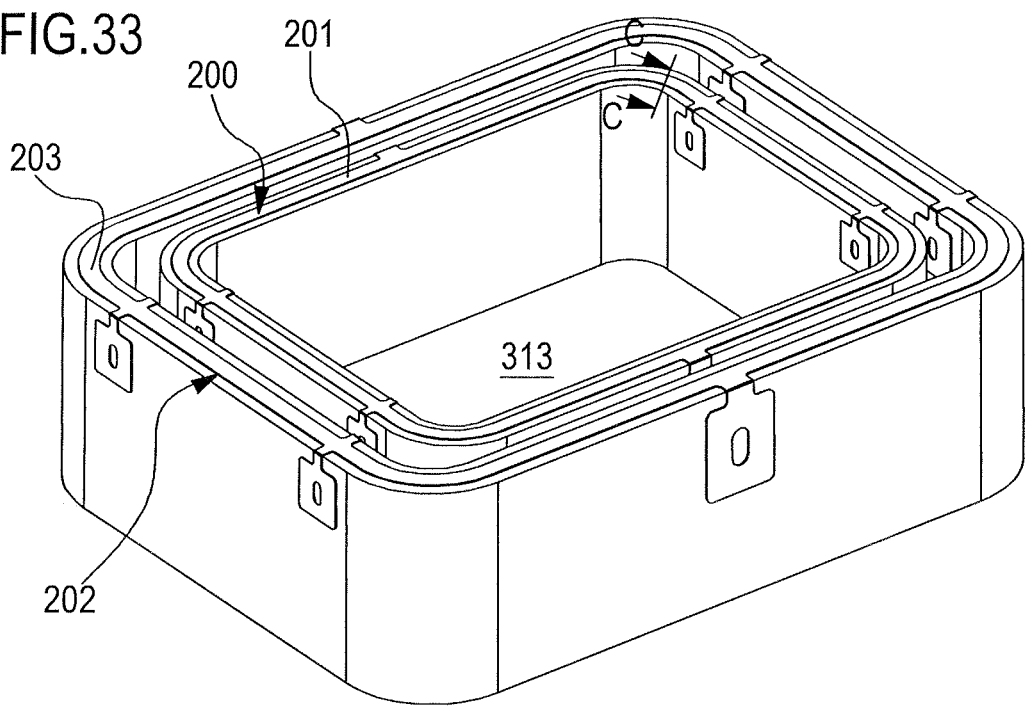
FIG. 33 is a perspective view of a second alternative heating head according to aspects of the invention.
Figure 33A:
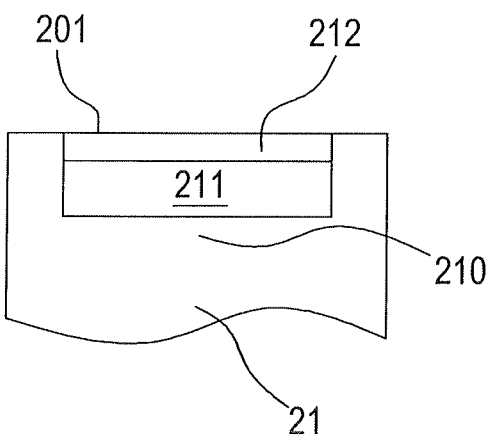
FIG. 33A represents a first option of the structure of a second conductive element, in interrupted cross section according to section plane C-C of FIG. 33.
Figure 33B:
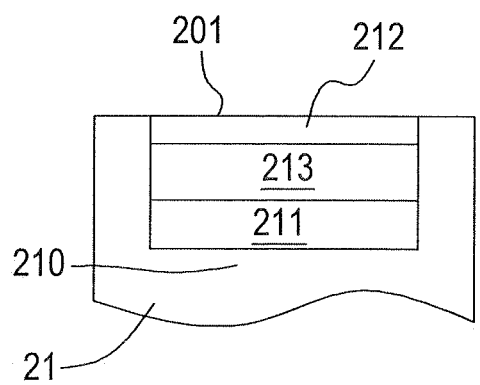
FIG. 33B represents a second option of the structure of a second conductive element, in interrupted cross section according to section plane C-C of FIG. 33.
Figure 34:
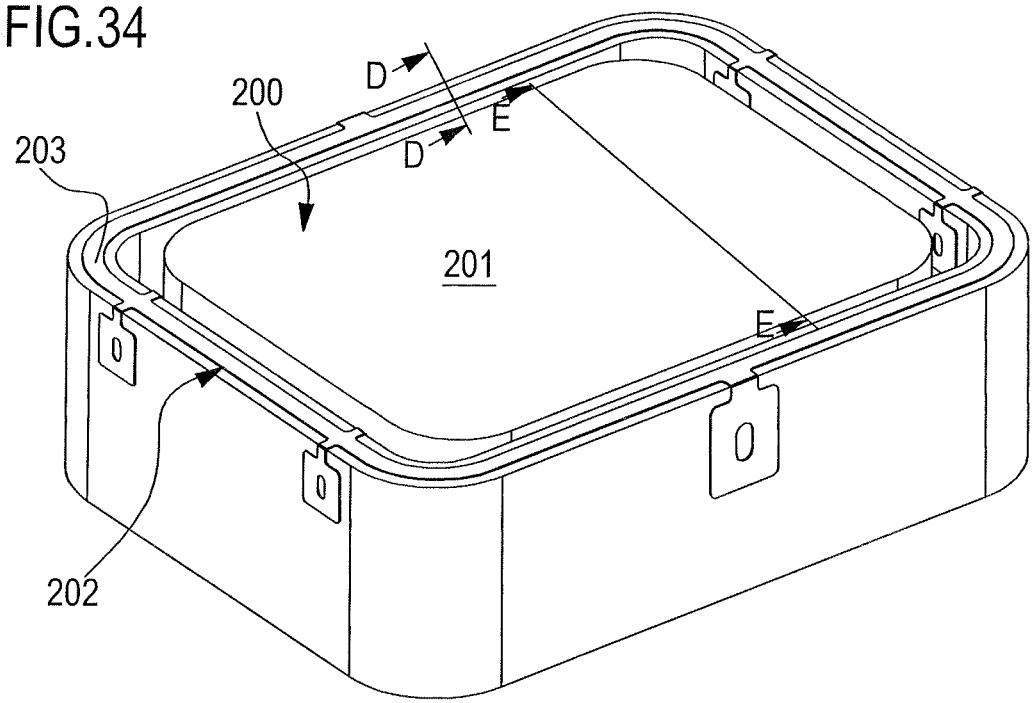
FIG. 34 is a perspective view of a third alternative heating head according to aspects of the invention.

Note FIGS. 32 to 34 (and thus the cross sections of FIGS. 32A, 32B, 33A, 33B, 34A, 34B) are represented upside down compared to the operating condition of the components shown therein.

Figure 35:
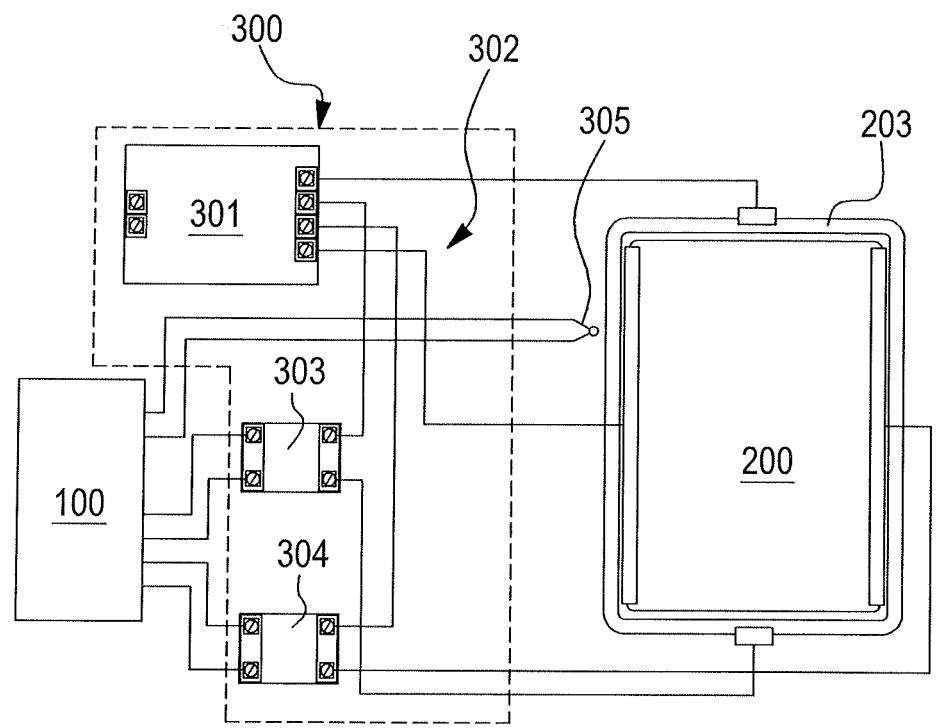
Figure 36:
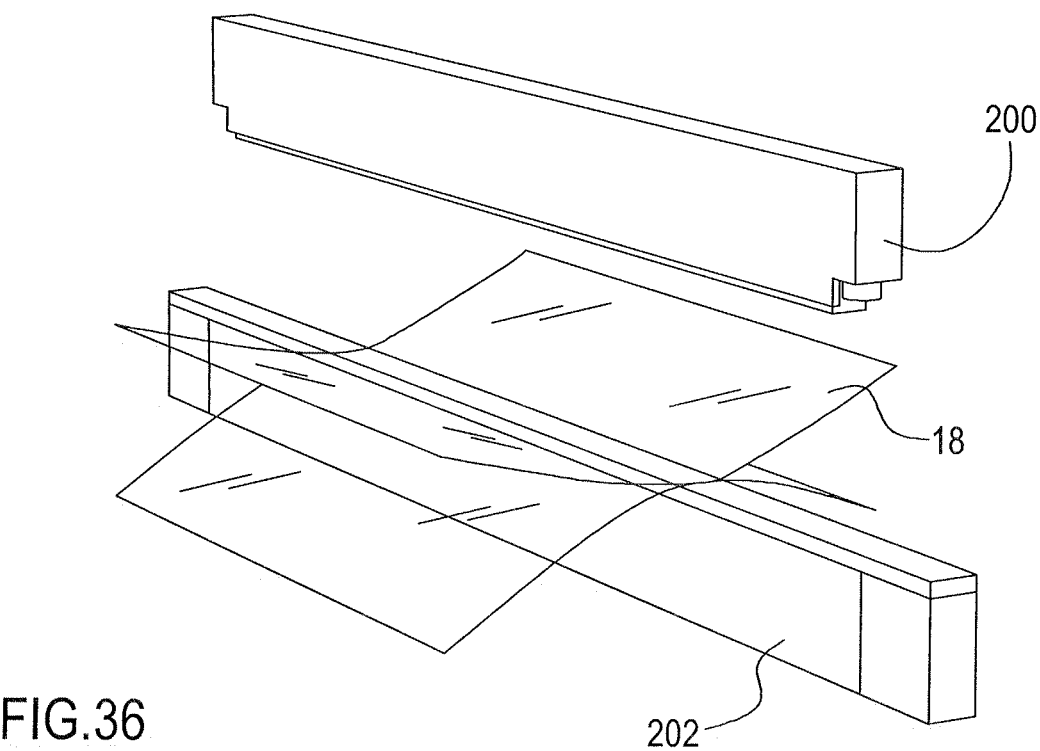

FIG. 35 is a schematic view of a supply unit and control device for control of energy, in particular electric energy, fed to the heater or heaters according to aspects of the invention;

FIG. 36 is a perspective view of a heating bar according to aspects of the invention which may be used in the apparatus of FIGS. 37 and 38;

FIG. 37 is a schematic side view layout of a further apparatus according to aspects of the invention; and FIG. 38 represents a structure of a heater of the apparatus of FIG. 37 according to aspects of the invention.

DEFINITIONS AND CONVENTIONS

It should be noted that in the present detailed description corresponding parts shown in the various figures are indicated with the same reference numeral through the figures. Note that the figures are not in scale and thus the parts and components shown therein are schematic representations.

Although certain aspects of the invention may find application for packaging a product into a packaging solely formed of one or more plastic films, the following description will mainly refer to packaging of a product positioned on a support 4 to which a plastic film is heat sealed. Note the product may be a food product or not.

As used herein support 4 means either a substantially flat element onto which a product is placed, or a container of the type having a base wall 4a, a side wall 4b and a top rim 4c radially emerging from the side wall 4b, the container defining a volume into which the product is positioned.

The tray or supports 4 may have a rectangular shape or any other suitable shape, such as round, square, elliptical etcetera, and may be formed either while the packaging process takes place, e.g. at a thermoforming station of the packaging apparatus, or they may be previously manufactured and then fed to the packaging apparatus.

Also note that the aspects of the invention described and claimed herein are applicable to an apparatus or to a process using pre-made trays and to so called 'thermo-forming processes or machines' that is to apparatus and processes where the support or tray is thermoformed online starting from roll of plastic.

Carbon Structure

As used herein carbon structure refers to a structure having electrically conductive capability.

The electrically conductive carbon structure includes (or is exclusively formed of) one or more carbon allotropes in the group of:

a graphite structure, a single or multi-layer graphene structure, a fullerene structure, where the carbon atoms are bonded together in spherical, tubular, fiber-like or ellipsoidal formations: in particular the fullerene structure may take the form of carbon nanotubes or carbon nanofibers.

It is to be noted that the electrically conductive elements (first and/or second) described herein may be formed by an electrically conductive carbon structure completely formed in one or more of the carbon allotropes disclosed above.

For example, the first and/or second electrically conductive element may be exclusively formed in graphite, or may be exclusively formed in one single graphene layer, or may be exclusively formed in a plurality of mutually overlapping graphene layers, or may be exclusively formed in a fullerene structure of carbon nanotubes, or may be formed in a fullerene structure of carbon nano-fibers, or may be exclusively formed by a combination of one or more of the mentioned carbon allotropes.

According to a further variant the electrically conductive carbon structure may comprise a structure formed by carbon filaments which are adjacently in contact to each other to form a conductive body or by carbon filaments embedded in a plastic resin matrix: in this latter case the carbon filaments may be adjacently placed and electrically connected to each other at prescribed sections such as at ends thereof.

Depending upon its specific structure and on the technology available to the manufacturer, the carbon structure may be applied to a support to form a heater in various manners: for instance a band or a layer or filament of carbon structure may be glued to a support; or a band or layer or filament may be formed from particles deposited on a support (e.g., sprayed or painted), or the carbon structure in any of the above structures could be embedded into a resin matrix during manufacture (e.g, embedded in a reinforced resin matrix).

The Trays

When the support takes the form of a tray it may be made of a single layer or, preferably, of a multi-layer polymeric material.

In case of a single layer material suitable polymers are for instance polystyrene, polypropylene, polyesters, high density polyethylene, poly(lactic acid), PVC and the like, either foamed or solid.

Preferably the tray 4 is provided with gas barrier properties. As used herein such term refers to a film or sheet of material which has an oxygen transmission rate of less than 200 cm3/m2-day-bar, less than 150 cm3/m2-day-bar, less than 100 cm3/m2-day-bar as measured according to ASTM D-3985 at 23° C. and 0% relative humidity.

Suitable materials for gas barrier monolayer thermoplastic trays 4 are for instance polyesters, polyamides and the like.

In case the tray 4 is made of a multi-layer material, suitable polymers are for instance ethylene homo- and co-polymers, propylene homo- and co-polymers, polyamides, polystyrene, polyesters, poly(lactic acid), PVC and the like. Part of the multi-layer material can be solid and part can be foamed.

For example, the tray 4 may comprises at least one layer of a foamed polymeric material chosen from the group consisting of polystyrene, polypropylene, polyesters and the like.

The multi-layer material may be produced either by co-extrusion of all the layers using co-extrusion techniques or by glue- or heat-lamination of, for instance, a rigid foamed or solid substrate with a thin film, usually called "liner".

The thin film may be laminated either on the side of the tray 4 in contact with the product P or on the side facing away from the product P or on both sides. In the latter case the films laminated on the two sides of the tray 4 may be the same or different. A layer of an oxygen barrier material, for instance (ethylene-co-vinyl alcohol) copolymer, is optionally present to increase the shelf-life of the packaged product P.

Gas barrier polymers that may be employed for the gas barrier layer are PVDC, EVOH, polyamides, polyesters and blends thereof. The thickness of the gas barrier layer will be set in order to provide the tray with an oxygen transmission rate suitable for the specific packaged product.

The tray may also comprise a heat sealable layer. Generally, the heat-sealable layer will be selected among the polyolefins, such as ethylene homo- or co-polymers, propylene homo- or co-polymers, ethylene/vinyl acetate copolymers, ionomers, and the homo- and co-polyesters, e.g. PETG, a glycol-modified polyethylene terephthalate.

Additional layers, such as adhesive layers, to better adhere the gas-barrier layer to the adjacent layers, may be present in the gas barrier material for the tray and are preferably present depending in particular on the specific resins used for the gas barrier layer.

In case of a multilayer material used to form the tray 4, part of this structure may be foamed and part may be un-foamed. For instance, the tray 4 may comprise (from the outermost layer to the innermost food-contact layer) one or more structural layers, typically of a material such as foam polystyrene, foam polyester or foam polypropylene, or a cast sheet of e.g. polypropylene, polystyrene, poly(vinyl chloride), polyester or cardboard; a gas barrier layer and a heat-sealable layer.

The tray 4 may be obtained from a sheet of foamed polymeric material having a film comprising at least one oxygen barrier layer and at least one surface sealing layer laminated onto the side facing the packaged product, so that the surface sealing layer of the film is the food contact layer the tray. A second film, either barrier or non-barrier, may be laminated on the outer surface of the tray.

Specific tray 4 formulations are used for food products which require heating in conventional or microwave oven before consumption. The surface of the container in contact with the product, i.e. the surface involved in the formation of the seal with the lidding film, comprises a polyester resin. For instance the container can be made of a cardboard coated with a polyester or it can be integrally made of a polyester resin. Examples of suitable containers for the package of the invention are CPET, APET or APET/CPET containers. Such container can be either foamed or not-foamed.

Trays 4 used for lidding or skin applications containing foamed parts, have a total thickness lower than 8 mm, and for instance may be comprised between 0.5 mm and 7.0 mm and more frequently between 1.0 mm and 6.0 mm.

In case of rigid tray not containing foamed parts, the total thickness of the single-layer or multi-layer thermoplastic material is preferably lower than 2 mm, and for instance may be comprised between 0.1 mm and 1.2 mm and more frequently between 0.2 mm and 1.0 mm.

The Supports

The supports may be made with the same materials and structure disclosed for the trays The Film or Film Material Applicable to Trays or Supports The film or film material 18 is applied to the tray 4 to form a lid onto the tray (e.g. for MAP—modified atmosphere packaging) or a skin associated to the tray or support and matching the contour of the product.

The film for skin applications may be made of a flexible multi-layer material comprising at least a first outer heat-sealable layer, an optional gas barrier layer and a second outer heat-resistant layer. The outer heat-sealable layer may comprise a polymer capable of welding to the inner surface of the supports carrying the products to be packaged, such as for instance ethylene homo- or co-polymers, like LDPE, ethylene/alpha-olefin copolymers, ethylene/acrylic acid copolymers, ethylene/methacrylic acid copolymers, and ethylene/vinyl acetate copolymers, ionomers, co-polyesters, e.g. PETG. The optional gas barrier layer preferably comprises oxygen impermeable resins like PVDC, EVOH, polyamides and blends of EVOH and polyamides. The outer heat-resistant layer may be made of ethylene homo- or copolymers, ethylene/cyclic-olefin copolymers, such as ethylene/norbornene copolymers, propylene homo- or co-polymers, ionomers, (co)polyesters, (co)polyamides. The film may also comprise other layers such as adhesive layers or bulk layers to increase thickness of the film and improve its abuse and deep drawn properties. Particularly used bulk layers are ionomers, ethylene/vinyl acetate copolymers, polyamides and polyesters. In all the film layers, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents and the like additives known to those skilled in the art of packaging films.

One or more layers of the film can be cross-linked to improve the strength of the film and/or its heat resistance. Cross-linking may be achieved by using chemical additives or by subjecting the film layers to an energetic radiation treatment. The films for skin packaging are typically manufactured in order to show low shrink when heated during the packaging cycle. Those films usually shrink less than 15% at 160° C., more frequently lower than 10%, even more frequently lower than 8% in both the longitudinal and transversal direction (ASTM D2732). The films usually have a thickness comprised between 20 microns and 200 microns, more frequently between 40 and 180 microns and even more frequently between 50 microns and 150 microns.

The skin packages are usually "easy-to-open", i.e. they are easily openable by manually pulling apart the two webs, normally starting from a point like a corner of the package where the upper web has purposely not been sealed to the support. To achieve this feature, either the film or the tray can be provided with a suitable composition, allowing easy opening of the package, as known in the art. Typically, the sealant composition and/or the composition of the adjacent layer of the tray and/or the film are adjusted in order to achieve the easy opening feature.

Various mechanisms can occur while opening an easy-to-open package.

In the first one ("peelable easy opening") the package is opened by separating the film and the tray at the seal interface.

In the second mechanism ("adhesive failure") the opening of the package is achieved through an initial breakage through the thickness of one of the sealing layers followed by delamination of this layer from the underlying support or film.

The third system is based on the "cohesive failure" mechanism: the easy opening feature is achieved by internal rupture of a seal layer that, during opening of the package, breaks along a plane parallel to the layer itself.

Specific blends are known in the art to obtain such opening mechanisms, ensure the peeling of the film from the tray surface, such as those described in EP1084186.

On the other hand, in case the film 18 is used for creating a lid on the tray 4, the film material may be obtained by co-extrusion or lamination processes. Lid films may have a symmetrical or asymmetrical structure and can be mono-layer or multilayer.

The multilayer films have at least 2, more frequently at least 5, even more frequently at least 7 layers. The total thickness of the film may vary frequently from 3 to 100 micron, in particular from 5 to 50 micron, even more frequently from 10 to 30 micron.

The films may be optionally cross-linked. Cross-linking may be carried out by irradiation with high energy electrons at a suitable dosage level as known in the art. The lid films described above may be heat shrinkable or heat-set. The heat shrinkable films typically show free shrink value at 120° C. measured according to ASTM D2732 in the range of from 2 to 80%, more frequently from 5 to 60%, even more frequently from 10 to 40% in both the longitudinal and transverse direction. The heat-set films usually have free shrink values lower than 10% at 120° C., preferably lower than 5% in both the longitudinal and transversal direction (ASTM D 2732). Lid films usually comprise at least a heat sealable layer and an outer skin layer, which is generally made up of heat resistant polymers or polyolefin. The sealing layer typically comprises a heat-sealable polyolefin which in turn comprises a single polyolefin or a blend of two or more polyolefins such as polyethylene or polypropylene or a blend thereof. The sealing layer can be further provided with antifog properties by incorporating one or more antifog additives into its composition or by coating or spraying one or more antifog additives onto the surface of the sealing layer by technical means well known in the art. The sealing layer may further comprise one or more plasticisers. The skin layer may comprises polyesters, polyamides or polyolefin. In some structures, a blend of polyamide and polyester can advantageously be used for the skin layer. In some cases, the lid films comprise a barrier layer. Barrier films typically have an OTR (evaluated at 23° C. and 0% R.H. according to ASTM D-3985) below 100 $cm^3/(m^2 \cdot day \cdot atm)$ and more frequently below 80 $cm^3/(m^2 \cdot day \cdot atm)$. The barrier layer is usually made of a thermoplastic resin selected among a saponified or hydrolyzed product of ethylene-vinyl acetate copolymer (EVOH), an amorphous polyamide and a vinyl-vinylidene chloride and their admixtures. Some materials comprise an EVOH barrier layer, sandwiched between two polyamide layers. The skin layer typically comprises polyesters, polyamides or polyolefin.

In some packaging applications, the lid films do not comprise any barrier layer. Such films usually comprise one or more polyolefin are herein defined.

Non-barrier films typically have an OTR (evaluated at 23° C. and 0% R.H. according to ASTM D-3985) from 100 cm$^3$/(m$^2$·day·atm) up to 10000 cm$^3$/(m$^2$·day·atm), more typically up to 6000 cm$^3$/(m$^2$·day·atm).

Peculiar compositions polyester-based are those used for tray lidding of ready-meals packages. For these films, the polyester resins can make up at least 50%, 60%, 70%, 80%, 90% by weight of the film. These films are typically used in combination with polyester-based supports.

For instance the container can be made of a cardboard coated with a polyester or it can be integrally made of a polyester resin. Examples of suitable containers for the package are CPET, APET or APET/CPET containers, either foamed or not-foamed.

Usually, biaxially oriented PET are used as the lid film due to its high thermal stability at standard food heating/cooking temperatures. Often biaxially oriented polyester films are heat-set, i.e. non-heat-shrinkable. To improve the heat-sealability of the PET lidding film to the container a heat-sealable layer of a lower melting material is usually provided on the film. The heat-sealable layer may be coextruded with the PET base layer (as disclosed in EP-A-1,529,797 and WO2007/093495) or it may be solvent- or extrusion-coated over the base film (as disclosed in U.S. Pat. No. 2,762,720 and EP-A-1,252,008).

Particularly in the case of fresh red meat packages, twin lidding film comprising an inner, oxygen-permeable, and an outer, oxygen-impermeable, lidding film are advantageously used. The combination of these two films significantly prevents the meat discoloration also when the packaged meat extends upwardly with respect to the height of the tray walls, which is the most critical situation in barrier packaging of fresh meat.

These films are described for example in EP1848635 and EP0690012, the disclosures of which are herein incorporated by reference.

The lid film can be monolayer. Typical composition of monolayer films comprise polyesters as herein defined and their blends or polyolefins as herein defined and their blends.

In all the film layers herein described, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents, anti-fog agents or compositions, and the like additives known to those skilled in the art of packaging films.

The films suitable for lidding application can advantageously be perforated, in order to allow the packaged food to breath.

Those films may be perforated by using different technologies available in the art, through laser or mechanical means such as rolls provided with several needles.

The number of perforations per unit area of the film and their dimensions affect the gas permeability of the film.

Microperforated films are usually characterized by OTR value (evaluated at 23° C. and 0% R.H. according to ASTM D-3985) from 2500 cm$^3$/(m$^2$·day·atm) up to 1000000 cm$^3$/(m$^2$·day·atm).

Macroperforated films are usually characterized by OTR (evaluated at 23° C. and 0% R.H. according to ASTM D-3985) higher than 1000000 cm$^3$/(m$^2$·day·atm).

Furthermore, the films herein described for lidding applications can be formulated to provide strong or peelable sealing onto the support. A method of measuring the force of a peelable seal, herein referred to as "peel force" is described in ASTM F-88-00. Acceptable peel force values fare in the range from 100 g/25 mm to 850 g/25 mm, from 150 g/25 mm to 800 g/25 mm, from 200 g/25 mm to 700 g/25 mm.

The desired seal strength is achieved specifically designing the tray and the lid formulations.

In general, one or more layers of the lid film can be printed, in order to provide useful information to the consumer, a pleasing image and/or trademark or other advertising information to enhance the retail sale of the packaged product.

The film may be printed by any suitable method, such as rotary screen, gravure or flexographic techniques mas known in the art.

Definitions and Conventions Concerning Materials

PVDC is any vinylidene chloride copolymers wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) and the blends thereof in different proportions. Generally a PVDC barrier layer will contain plasticisers and/or stabilizers as known in the art.

As used herein, the term EVOH includes saponified or hydrolyzed ethylene-vinyl acetate copolymers, and refers to ethylene/vinyl alcohol copolymers having an ethylene comonomer content preferably comprised from about 28 to about 48 mole %, more preferably, from about 32 to about 44 mole % ethylene, and even more preferably, and a saponification degree of at least 85%, preferably at least 90%.

The term "polyamides" as used herein is intended to refer to both homo- and co- or ter-polyamides. This term specifically includes aliphatic polyamides or co-polyamides, e.g., polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partially aromatic polyamides or co-polyamides, such as polyamide 6I, polyamide 6I/6T, polyamide MXD6, polyamide MXD6/MXDI, and blends thereof.

As used herein, the term "copolymer" refers to a polymer derived from two or more types of monomers, and includes terpolymers. Ethylene homopolymers include high density polyethylene (HDPE) and low density polyethylene (LDPE). Ethylene copolymers include ethylene/alpha-olefin copolymers and ethylene/unsaturated ester copolymers. Ethylene/alpha-olefin copolymers generally include copolymers of ethylene and one or more comonomers selected from alpha-olefins having from 3 to 20 carbon atoms, such as 1-butene, 1-pentene, 1-hexene, 1-octene, 4-methyl-1-pentene and the like.

Ethylene/alpha-olefin copolymers generally have a density in the range of from about 0.86 to about 0.94 g/cm3. The term linear low density polyethylene (LLDPE) is generally understood to include that group of ethylene/alpha-olefin copolymers which fall into the density range of about 0.915 to about 0.94 g/cm3 and particularly about 0.915 to about 0.925 g/cm3. Sometimes linear polyethylene in the density range from about 0.926 to about 0.94 g/cm3 is referred to as linear medium density polyethylene (LMDPE). Lower density ethylene/alpha-olefin copolymers may be referred to as very low density polyethylene (VLDPE) and ultra-low density polyethylene (ULDPE). Ethylene/alpha-olefin copolymers may be obtained by either heterogeneous or homogeneous polymerization processes.

Another useful ethylene copolymer is an ethylene/unsaturated ester copolymer, which is the copolymer of ethylene and one or more unsaturated ester monomers. Useful unsaturated esters include vinyl esters of aliphatic carboxylic acids, where the esters have from 4 to 12 carbon atoms, such as vinyl acetate, and alkyl esters of acrylic or methacrylic acid, where the esters have from 4 to 12 carbon atoms.

Ionomers are copolymers of an ethylene and an unsaturated monocarboxylic acid having the carboxylic acid neutralized by a metal ion, such as zinc or, preferably, sodium.

Useful propylene copolymers include propylene/ethylene copolymers, which are copolymers of propylene and ethylene having a majority weight percent content of propylene, and propylene/ethylene/butene terpolymers, which are copolymers of propylene, ethylene and 1-butene.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin co-polymer, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the (C3-Ci9)alkanedioic acids are particularly suitable, in particular succinic acid, sebacic acid, adipic acid, azelaic acid, suberic acid or pimelic acid. Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous copolyesters include co-polyesters of terephthalic acid with an aliphatic diol and a cycloaliphatic diol, especially ethylene glycol and 1,4-cyclohexanedimethanol.

DETAILED DESCRIPTION

First Embodiment of the Apparatus 1

Reference is made to FIGS. 1A and 2-12. In particular FIG. 1A shows an apparatus 1 for packaging of a product P arranged in a tray 4. The apparatus 1 is adapted for modified atmosphere packaging, where a plastic film 18 is applied to the top rim 4c of a tray 4 after a modified gas atmosphere has been created inside the support 4, and/or for vacuum skin packaging of the product P, where a thin film of plastic material is draped down on the product and intimately adheres to a top rim and to the inner surface of the support as well as to the product surface thus leaving a minimum, if any, amount of air within the packaging. The apparatus 1 may also be used in case a film sheet applied to a tray or support and neither vacuum nor modified atmosphere is created.

The apparatus 1 comprises a frame 2, a transport assembly 3 for displacing the tray 4, a film driving assembly 5, and a packaging assembly 8.

The tray 4 shown in the enclosed figures presents a base wall 4a, a side wall 4b emerging from the base wall and delimiting a space where a product P can be housed, and a top rim 4c radially protruding from the side wall 4b: in the example shown the top rim 4c has a horizontal flat portion defining an optimal sealing surface for tightly fixing a plastic film.

The frame 2 defines a base body of the apparatus 1 and serves to carry and support various parts of the apparatus 1 as herein described.

The transport assembly 3 comprises a displacement plane 20 (which may be a physical plane where the trays or support are lying and slide or an ideal plane along which the trays are guided e.g. by means of railways or guides).

The plane 20 is defined on a top area of the frame and a conveyor 46 is arranged in correspondence of the sliding plane 20. In the example shown, the transport assembly 3 is carried by, e.g. fixed to, the frame 2 so that the sliding plane 20 is substantially horizontal and the conveyor 46 moves the trays or supports 4 according to the horizontal direction indicated by the arrow A1 shown in FIG. 1. The transport assembly 3 arranged on the frame 2 is configured for displacing the support or tray 4 along a predefined path from a loading station, where supports or trays 4 which may already be filled with the respective product(s) P are positioned, to the packaging assembly 8 where a film 18 is tightly fixed to each support or tray 4, as it will be explained here below in detail. The conveyor 46 displaces the trays, e.g. a prefixed number of tray per time, inside the packaging assembly 8 in proper position for receiving the film 18. For instance, a control unit 100 (which will be further described herein after) may control the conveyor 46 to displace a prefixed number of trays or supports 4 per time from a region outside the packaging assembly, to a region inside the packaging assembly where the tray or trays are in vertical alignment to respective film portions 18*a* of the film 18. The conveyor may for instance include a first transfer device 46*a* (such as the belt shown in FIG. 1A) configured for bringing the trays in close proximity to the packaging assembly and a second transfer device 46*b* adapted to pick one or more of said trays and bring them into the packaging station. The second transfer device may for instance include arms acting on the sides of the trays or supports such as to pick the supports from the first transfer device, bring them into the packaging station and then return to the first transfer devise to pick a new set of trays or supports 4. Alternatively, the conveyor 46 may include pushers (e.g. in the form of bars extending transverse to said direction A1) acting on the trays and pushing the trays inside the packaging assembly. The pushers may be moved by chains or belts and may be moved into the packaging assembly to properly position a number of trays, and then be retracted from the packaging assembly, once the trays have reached their proper position inside this latter. According to a further alternative, the conveyor 46 may include housings (e.g. in the form of plates provided with cavities for receiving a number of trays) which are moved along said direction A1 and which are moving inside the packaging station together with the supports or trays 4: according to this last alternative the housings are properly shaped in order to be hosted inside the packaging station during the application of the film to the tray 4.

Note that the products P may be positioned on the support or tray 4 either upstream the loading station or in any location between the loading station and the packaging assembly 8. The transport assembly 3 further comprises a motor 9, e.g. a stepping motor unit, for operating the conveyor belt 46 with step-by-step movement.

The film driving assembly 5 may comprise a film roll 10 which supplies the continuous film 18. The film driving assembly 5 may further comprise an arm 11 (represented in dashed lines in FIG. 1A) fixed to the frame 2 and suitable for supporting the roll 10. The film 18 of the film roll 10 may be made as disclosed above depending upon the specific need. Note the continuous film 18 may be fed from the film driving assembly 5 to the proper position inside the packaging assembly 8 with any known means, for instance using driving rollers or driving mechanisms acting upstream and/or downstream the packaging assembly, or using transport devices acting on the longitudinal borders of the film 18, or combinations of the above means or any other suitable device.

The apparatus packaging assembly 8 is configured for tightly fixing the film sheets 18 to said supports 4; the packaging assembly 8 includes a lower tool 22 and an upper tool 21. As better visible from FIG. 2, the lower tool 22 has a number of inner walls 23 defining a prefixed number of seats 23*b*. In an embodiment the lower tool 22 is provided with multiple seats 23*b* each for hosting a corresponding support 4; the upper tool 21 is configured for holding an appropriate film portion 18*a* of the film 18 sufficient for closing the trays positioned in said seat or seats 23*b*.

Each of seats 23*b* is configured for receiving one support 4. For instance in the example of FIGS. 2-11 the seat 23*b* is peripherally delimited by inner wall 23 and the support or tray 4 is received within the seat 23*b* such that the top rim 4*c* may rest above the end surface 23*a* of the inner wall 23. The upper tool 21 faces the lower tool 22 and is configured for holding a film portion 18*a* of film 18 just above the respective tray 4. As shown in FIGS. 2-11 the upper and lower tools 21, 22 cooperate to define a packaging chamber 24: in a first operating condition of the packaging assembly 8—shown e.g. in FIGS. 2 and 3—the upper and lower tools 21 and 22 are space apart and the packaging chamber 24 is open thereby allowing film 18 to move inside of the packaging chamber 24 and a film portion 18*a* of film 18 just above the respective tray 4. In a second operating condition of the packaging assembly 8 the packaging chamber 24 is closed, in certain cases hermetically closed, with respect to an atmosphere outside the apparatus 1, such that the film portion 18*a* may be heat sealed at least to the top rim 4*c* of the tray 4.

Note that by hermetically closed it is meant that the packaging chamber 24 cannot freely communicate with the atmosphere outside the same chamber as gas may be supplied or withdrawn from the chamber only via supply or discharge channels under the control of the apparatus 1.

In order to open and close the packaging chamber, the apparatus 1 has a main actuator 33 (see FIG. 1A) active on at least one of said upper and lower tool 21, 22 under the control of control device 100; in practice the main actuator 33 may include a piston (the piston may be replaced by any other kind of electric, pneumatic or hydraulic linear actuator) configured for lifting and lowering the one or both tools 22 along a direction transverse to said horizontal direction A1 between said first operating condition (FIG. 3), where the upper tool 21 is spaced apart from the lower tool 22 and said packaging chamber 24 is open to receive one or more of said film portions 18*a*, and said second operating condition (FIG. 4), where a closure surface 34 of the upper tool 21 tightly abuts against a closure surface 35 of the lower tool 22 (or against an abutting surface of an insert member 400) to hermetically close said packaging chamber 24 with respect to an atmosphere outside the apparatus; at said closure surfaces 34 and 35 a gasket or other element for facilitating a gas tight closure may be positioned.

The upper tool 21 comprises an inner heater 200 carried by the upper tool such as to face the seat 23*b* and having an heating surface 201 configured to heat at least a part of said film portion 18*a*, and a peripheral heater 202 carried by the upper tool 21 such as to face the same seat 23*b* and positioned radially outside with respect to the inner heater 201. The peripheral heater 202 basically surrounds the inner heater 200 and is aligned with surface 23*a* so that a heating surface 203 of the peripheral heater 201 is capable—when brought into contact with the film 18—to heat seal this latter to the tray 4: in particular, the upper tool 21 is configured to bring the heating surface 203 of the peripheral heater 202 in correspondence of rim 4*c* of tray 4 located in seat 23*b*, so that at least a peripheral region 18*b* of said film portion 18*a* overlapping rim 4*c* may be heat bonded to this latter.

Figure 2:
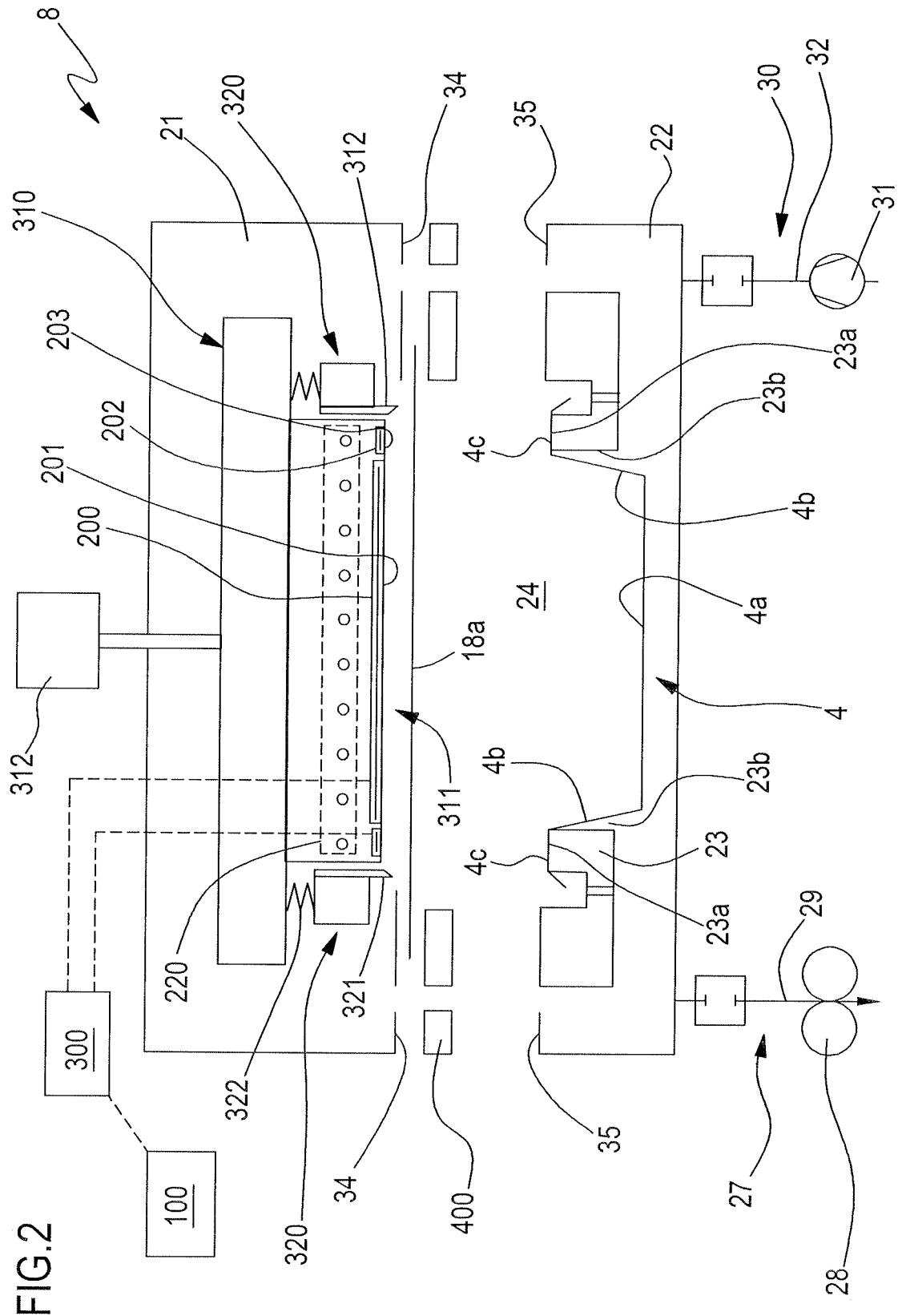
FIG. 2 is a schematic front elevation view relating to a first embodiment of a packaging assembly, which may be present in a packaging apparatus of the type shown FIG. 1A, according to aspects of the invention.
Figure 3:
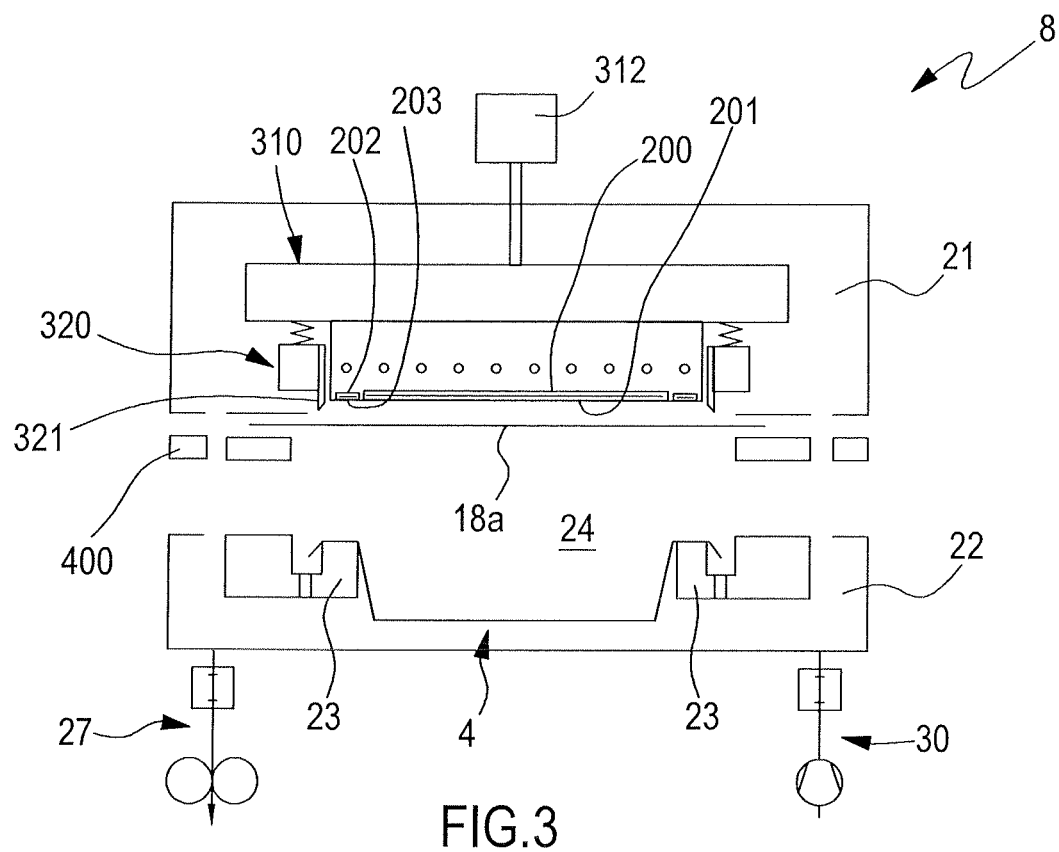
FIGS. 3-11 are schematic front elevation views of the first embodiment of the packaging assembly of FIG. 2 representing consecutive phases of a packaging process. The apparatus and process according to these figures may—for instance—be used for heat sealing a lid onto a tray with either a modified atmosphere in the tray or with regular atmosphere being left in the tray.
Figure 4:
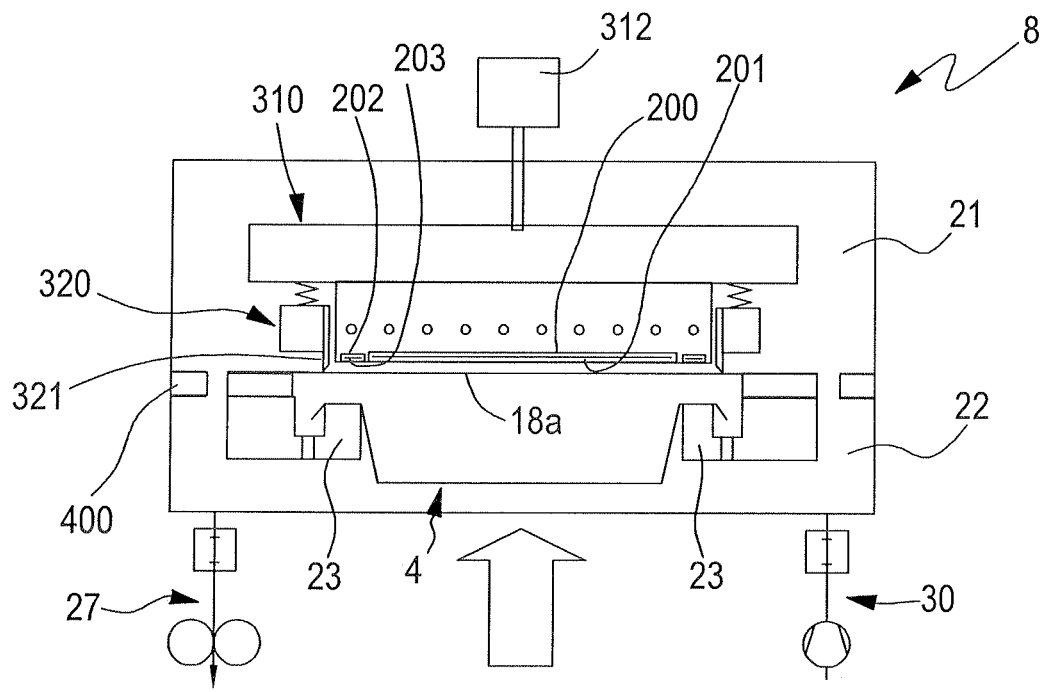
Figure 5:
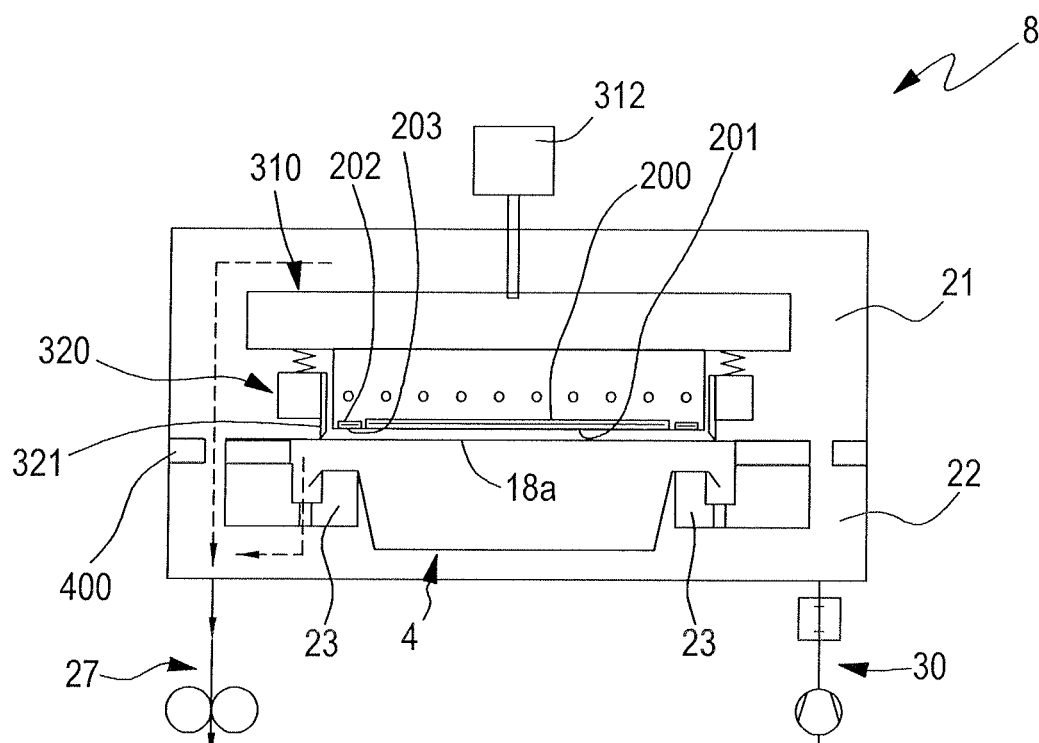
Figure 6:
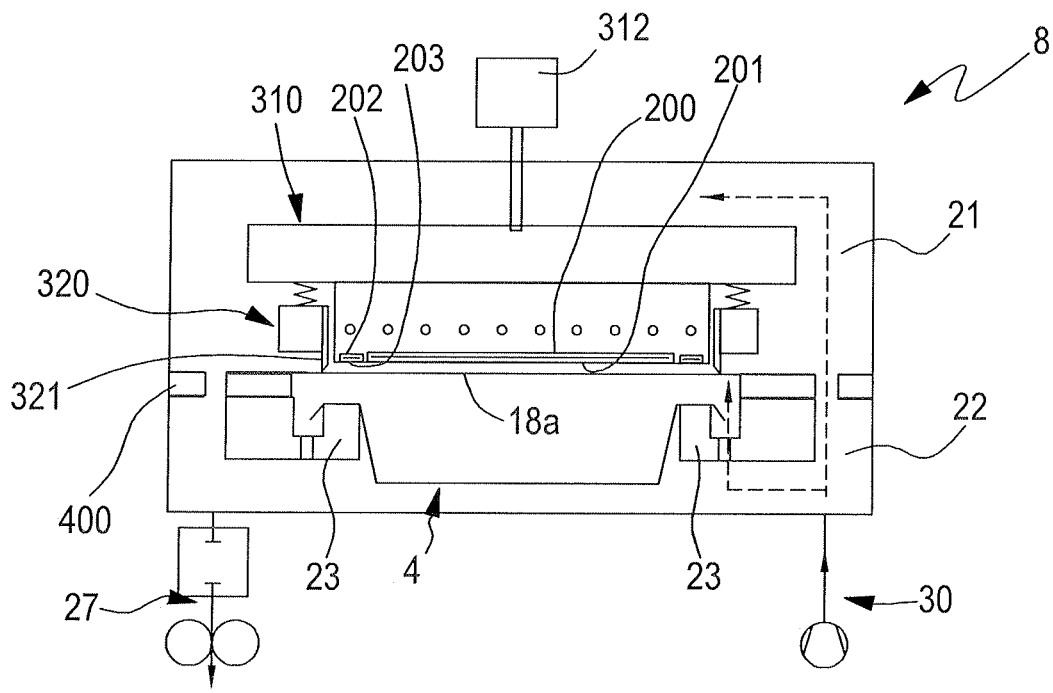
Figure 7:
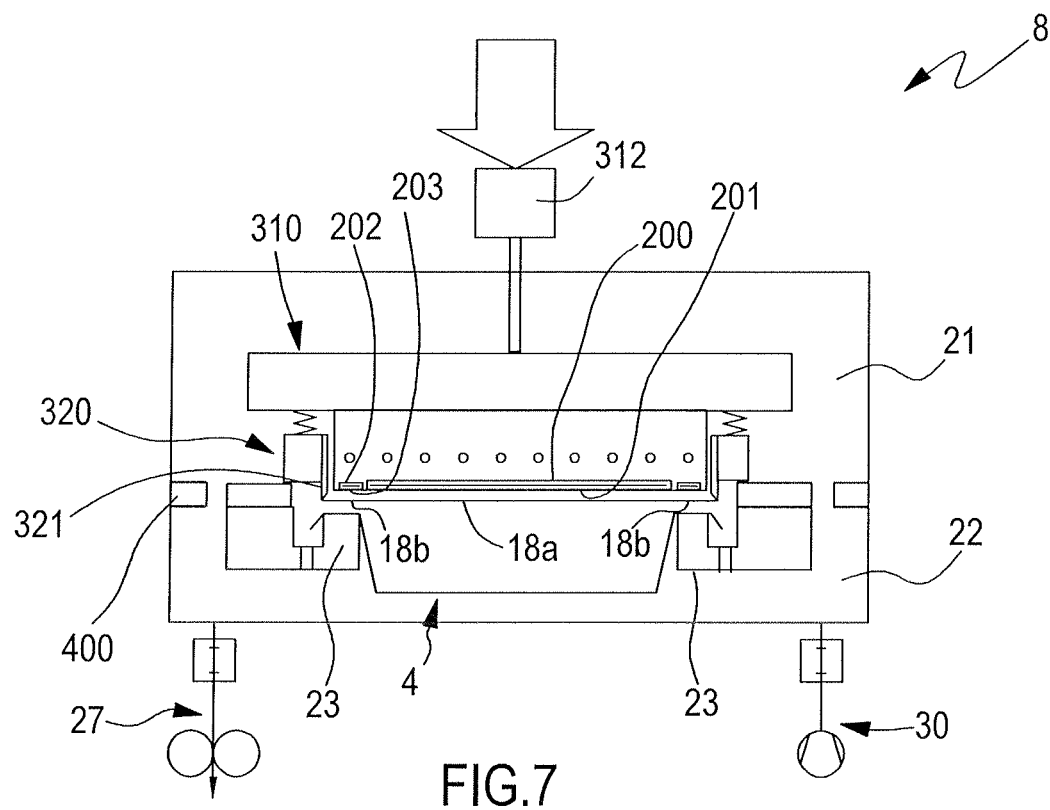

As it may be seen from FIG. 2, the heating surface 203 of said peripheral heater 202 has an annular shape. Note that by annular shape it is intended a shape of closed form which may be circular, elliptic, rectangular or any other closed shape. In the specific embodiment disclosed the closed shape of the heating surface 203 copies the shape of the top surface of the rim 4c of the tray 4 or copies the shape of the top surface 23a of inner wall 23.

As shown in FIG. 2, the heating surface 203 of the peripheral heater 202 and surrounds—and in particular completely encircles—the heating surface 201 of the inner heater 200, such that when the upper and lower tools are in said second operating position, the peripheral heater 202 is configured to heat a peripheral region or band 18b of said film portion 18a while the inner heater 200 is configured to heat at least a part of an inner zone of the same film portion 18a located radially inside the peripheral region 18b.

Going in further detail and again with reference to FIG. 2, both the heating surface of the peripheral heater and the heating surface of the inner heater may take a flat conformation in order to perfectly match the shape of the top rim 4c of the tray. Note that when the first and second tools 21 and 22 (upper and lower tools) are in the second operating position, an actuator, such as auxiliary actuator 312 brought by upper tool 21 and controlled by control device 100, may be operated to bring the heating surface against the mentioned peripheral band of the film portion 18a, with the top rim 4c being pressed between said peripheral band of film portion 18a and the top surface 23a.

In the embodiment shown in FIG. 2, when the upper and lower tools are in said second operating position, the heating surface 203 of the peripheral heater 202 is coplanar to the heating surface 201 of the inner heater 200, such that both surfaces contact at the same time the respective parts of the film portion 18a.

Alternatively, the heating surface 201 of the inner heater 200 may be slightly (e.g. from 1 to 20 mm) indented with respect to the heating surface 203 of the peripheral heater 202, such that when the heating surface of the peripheral heater contacts a top surface of the film portion, the heating surface of the inner heater is spaced apart by a prefixed distance from the top surface of the same film portion.

Referring now to FIGS. 32 and 33 which show heating heads usable as part of the upper tool 21 of the apparatus according to the first embodiment, it is shown that the upper tool 21 may include a heating head with a inner heater 200 and a peripheral heater 202 wherein the heating surface 201 of the inner heater 200 is located at a radial distance 'd' from the heating surface 203 of the peripheral heater 202 and extends in an area surrounded by the heating surface of the peripheral heater 202: in other words the heating surface of the inner heater 200 is not in contact with the heating surface of the peripheral heater 202. The two heating surfaces and the peripheral heater and inner heater are kept separate and thermally insulated the one from the other.

In FIG. 33 it is shown that the heating surface 201 of the inner heater 200 may be a heating surface of annular shape, while in FIG. 34 it is shown that the heating surface 201 of the inner heater may be a continuous heating surface delimited by a single closed contour line: in the example of FIG. 34 the heating surface 201 is rectangular, but of course it can be of any suitable shape (which typically depends from the shape of the tray) such as discoidal or polygonal or circular, or elliptical or polygonal with rounded corners, etc. In the case of FIG. 34, however, the continuous heating surface is designed to occupy substantially all or a majority (more than 50% preferably more than 70%) of the ideal planar area surrounded by the heating surface of the peripheral heater. Finally, in the example of FIG. 32 the heating surface 201 of the inner heater 200 is a heating surface including a plurality of parallel spaced apart bands 204 connected at ends thereof, e.g. by transverse bands or by transverse connecting portions 205, such as to define a meander shape.

In a further aspect, the peripheral heater 202 comprises a first electrically conductive element extending along the heating surface of the peripheral heater: the first electrically conductive element is shaped as the peripheral heater heating surface and conveys heat to the heating surface 203 by virtue of the increase of temperature caused in the first electrically conductive element caused by passage of electric current. Thus the first electric conductive element is an annular element, optionally an electrically conductive annular flat element. The first electric conductive element may be housed inside the peripheral heater body or may basically form the peripheral heater itself.

On its turn, the inner heater 200 comprises a second electrically conductive element extending along the heating surface of the inner heater: the second electrically conductive element is shaped as the inner heater heating surface and conveys heat to the heating surface 203 by virtue of the increase of temperature caused in the second electrically conductive element caused by passage of electric current. The second electric conductive element may be housed inside the inner heater body or may basically form the inner heater itself. The second conductive element may therefore be:
- an electrically conductive annular element, optionally an electrically conductive annular flat element,
- an electrically conductive continuous plate,
- an electrically conductive meander element, optionally an electrically conductive flat meander element.

Going in a further structural detail, the first and second electrically conductive elements may take various alternative designs.

In a first option (FIG. 32A), the first electrically conductive element comprises:
- a supporting substrate 206 carried by or integral with the upper tool 21,
- a metallic or carbon structure (e.g., in the form of a plurality of overlapping graphene layers or one of the above described forms) conductive band 207 fixed to the supporting substrate, and
- an optional protective layer 208 covering the metallic or carbon structure conductive band and defining the heating surface of the peripheral heater, In a second option (FIG. 32B), the first electrically conductive element comprises:
- a supporting substrate 206 carried by or integral with the upper tool,
- an insulating layer 209 in contact with the supporting substrate,
- a conductive layer 207 in the form of a metal-glass mixture defining a conductive band in contact with the insulating layer, and
- a protective layer 208 covering the conductive layer and defining the heating surface;

Note that the first electrically conductive element of the heating head shown in FIG. 33 may present the structure described above for the first electrically conductive element of the heating head shown in FIG. 32 and thus FIGS. 32A and 32B may also reflect the structure of the cross section taken along plane B-B of FIG. 33 in correspondence of the peripheral heater.

As to the second electrically conductive element, it may comprise in a first option (FIG. 33A):
- a supporting substrate 210 carried by or integral with the upper tool 21, a metallic or carbon structure (e.g., in the form of a plurality of overlapping graphene layers or in one of the forms described above) conductive structure 211 selected in group of: a band, a plate and a meander, said metallic or carbon structure being fixed to the supporting substrate, and an optional protective layer 212 covering the metallic or carbon conductive structure and defining the heating surface of the peripheral heater.

Alternatively, according to a second option (FIG. 33B), the second electrically conductive element, may comprise:

a supporting substrate 210 carried by or integral the upper tool, an insulating layer 213 in contact with the supporting substrate, a conductive structure 211 in the form of a metal glass mixture layer taking the shape of a band, a plate or a meander, said conductive structure 211 being in contact with the insulating layer, and a protective layer 212 covering the conductive layer and defining the heating surface.

Figure 34A:
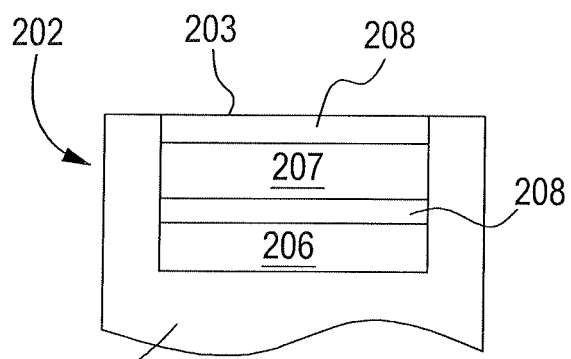
FIG. 34A represents a structure of a first conductive element, in interrupted cross section taken according to section plane D-D of FIG. 34.
Figure 34B:
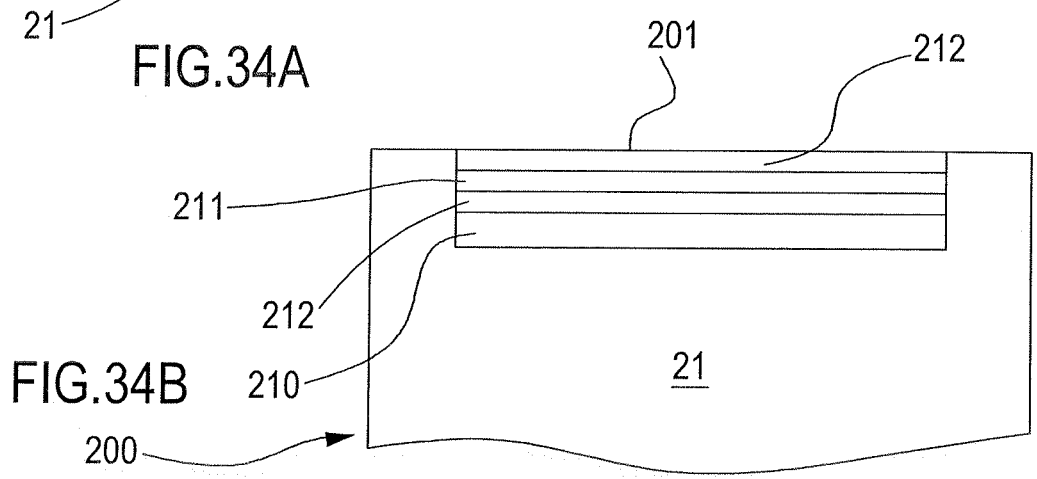
FIG. 34B represents a structure of a second conductive element, in interrupted cross section taken according to section plane E-E of FIG. 34.

According to an alternative, which is shown in FIGS. 34, 34A and 34B, the first electrically conductive element comprises an electrically conductive layer in the form of carbon structure 207, a structural supporting substrate 206 carrying the carbon structure and at least one protective layer 208 covering the carbon structure on a side opposite that of the structural substrate. The substrate may be fixed to the upper tool or to a heating head associated to the upper tool.

The carbon structure may optionally be sandwiched between two opposite protective layers 208, wherein the protective layer opposite the structural substrate defines the heating surface of said peripheral heater.

In particular, the carbon structure of the first electrically conductive element includes (or is exclusively formed of) one or more carbon allotropes in the group of:

a graphite structure, a single or multi-layer graphene structure, a fullerene structure, where the carbon atoms are bonded together in spherical, tubular, fiber-like or ellipsoidal formations: in particular the fullerene structure may take the form of carbon nanotubes or carbon nanofibers.

The carbon structure is of flat elongated (i.e. having a plane of main development) conformation (e.g. annular as shown in FIGS. 32-34). The carbon structure of the first electrically conductive element of the peripheral heater may have a cross section with thickness of at least 5 μm: for instance the cross section thickness may be between 5 and 300 μm, optionally between 10 and 200. The cross section width may be at least 2 mm, more optionally at least 5 mm. The average electric resistivity may be higher than 5 Ω·mm²/m, optionally comprised between 15 and 25 Ω·mm²/m.

The second electrically conductive element shown in FIGS. 34, 34B comprises a structural substrate 210 carrying a respective carbon structure 211 and at least one protective layer 212 covering the carbon structure on a side opposite that of the structural substrate; optionally the carbon structure of the second electrically conductive element is sandwiched between two opposite protective layers 212, wherein the protective layer opposite the structural substrate 210 defines the heating surface 201 of said inner heater; also the carbon structure of the second electrically conductive element includes (or is exclusively formed of) one or more carbon allotropes in the group of:

a graphite structure, a single or multi-layer graphene structure, a fullerene structure, where the carbon atoms are bonded together in spherical, tubular, fiber-like or ellipsoidal formations: in particular the fullerene structure may take the form of carbon nanotubes or carbon nanofibers.

Furthermore the carbon structure may be of flat elongated conformation; the carbon structure of the second electrically conductive element of the inner heater may have a cross section with thickness of at least 5 μm: for instance the cross section thickness may be between 5 and 300 μm, optionally between 10 and 200. The cross section width may be at least 3 mm, more optionally at least 5 mm. even more optionally of at least 10 mm, and an average electric resistivity higher than 2 Ω·mm²/m, more optionally higher than 5 Ω·mm²/m.

The apparatus 1 also includes a supply unit 300 configured to control energy supplied to said peripheral heater and to said inner heater; in the example shown the supply unit is an electric supply unit connected with controlled by a control device or control unite 100. In accordance with aspects of the invention, the control device 100 is configured to act on the supply unit and configured for commanding the supply unit 300 and control a supply of electric energy to the peripheral heater 202 independently from a supply of electric energy to the inner heater 200.

In further detail, the control device 100 is configured to command the supply unit to execute a heating cycle including the following steps:

increasing a temperature of the heating surface of the peripheral heater to a first temperature, keeping the heating surface of the peripheral heater 202 at least at the first temperature for a first discrete time interval, reducing the temperature of the heating surface of the peripheral heater 202 below said first temperature, increasing a temperature of the heating surface of the inner heater 200 to a second temperature different from the first temperature, keeping the heating surface of the inner heater 200 at least at the second temperature for a second discrete time interval, reducing the temperature of the heating surface of the inner heater below said second temperature.

In the first embodiment herein described energy is transferred to the peripheral heater 202 by applying a voltage to the first electrically conductive element, while energy is transferred to the inner heater by applying an electric voltage to the second electrically conductive element.

Thus, the control device 100 is configured to command the supply unit 300 to execute a heating cycle including the following steps:

applying an electric voltage to the first electrically conductive element to cause the increase in temperature of the heating surface of the peripheral heater to the first temperature, maintaining said electric voltage for keeping the heating surface of the peripheral heater at least at the first temperature for a first discrete time interval, reducing or nullifying the voltage applied to the electrically conductive element for reducing the temperature of the heating surface of the heater below said first temperature, applying an electric voltage to the second electrically conductive element to cause the increase of the temperature of the heating surface of the inner heater to the second temperature different from the first temperature, maintaining said electric voltage applied to the second electrically conductive element for keeping the heating surface of the inner heater at least at the second temperature for a second discrete time interval, reducing or nullifying the voltage applied to the second electrically conductive for reducing the temperature of the heating surface of the inner heater below said second temperature.

The control device 100 is configured to command the supply unit to consecutively repeat execution of said heating cycle a plurality of times. In practice each time a film portion 18a has to be fixed to the respective tray or trays (or support) a heating cycle takes place: during each of said consecutive heating cycles at least one of said film portions 18a being heat sealed to at least one respective support or tray.

In detail, said control device 100—during each heating cycle—is configured for controlling the supply unit 300 to supply energy to the peripheral heater 202 only during a discrete time period followed by a time period when no energy is supplied to the peripheral heater 202 for causing the increase and keeping of the heating surface of the peripheral heater 202 at least at the first temperature for the first discrete time interval, and for causing a subsequent reduction of the temperature of the heating surface of the peripheral heater 202 below said first temperature.

In a similar manner control device 100—during each heating cycle—is configured for controlling the supply unit to supply energy to the inner heater 200 only during a discrete time period followed by a time period when no energy is supplied to the inner heater for causing the increase and keeping of the heating surface of the inner heater at least at the second temperature for the second discrete time interval, and for causing a subsequent reduction of the temperature of the heating surface of the inner heater below said second temperature.

The heating cycle may be configured such that the second temperature is inferior with respect to the first temperature. For example: said first temperature may be comprised in the range between 150° C. and 300° C., while said second temperature is comprised in the range between 180° C. and 240° C., more optionally between 200° C. and 220° C.

Figure 12:
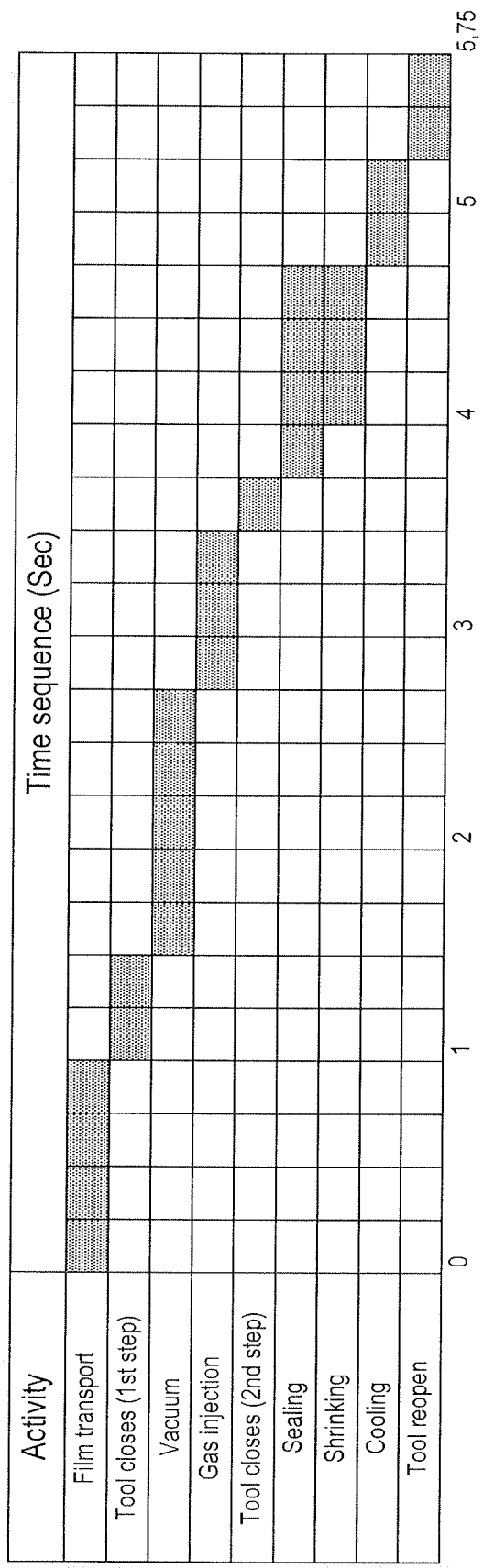
FIG. 12 is a diagram indicating, on a first axis, the steps of a packaging process followed by the apparatus of FIG. 1A when using the packaging assembly of FIGS. 2-11 and indicating, on a second axis, the time in seconds, wherein in the diagram area the time intervals for each packaging process step are represented with gray patterned areas.
Figure 13:
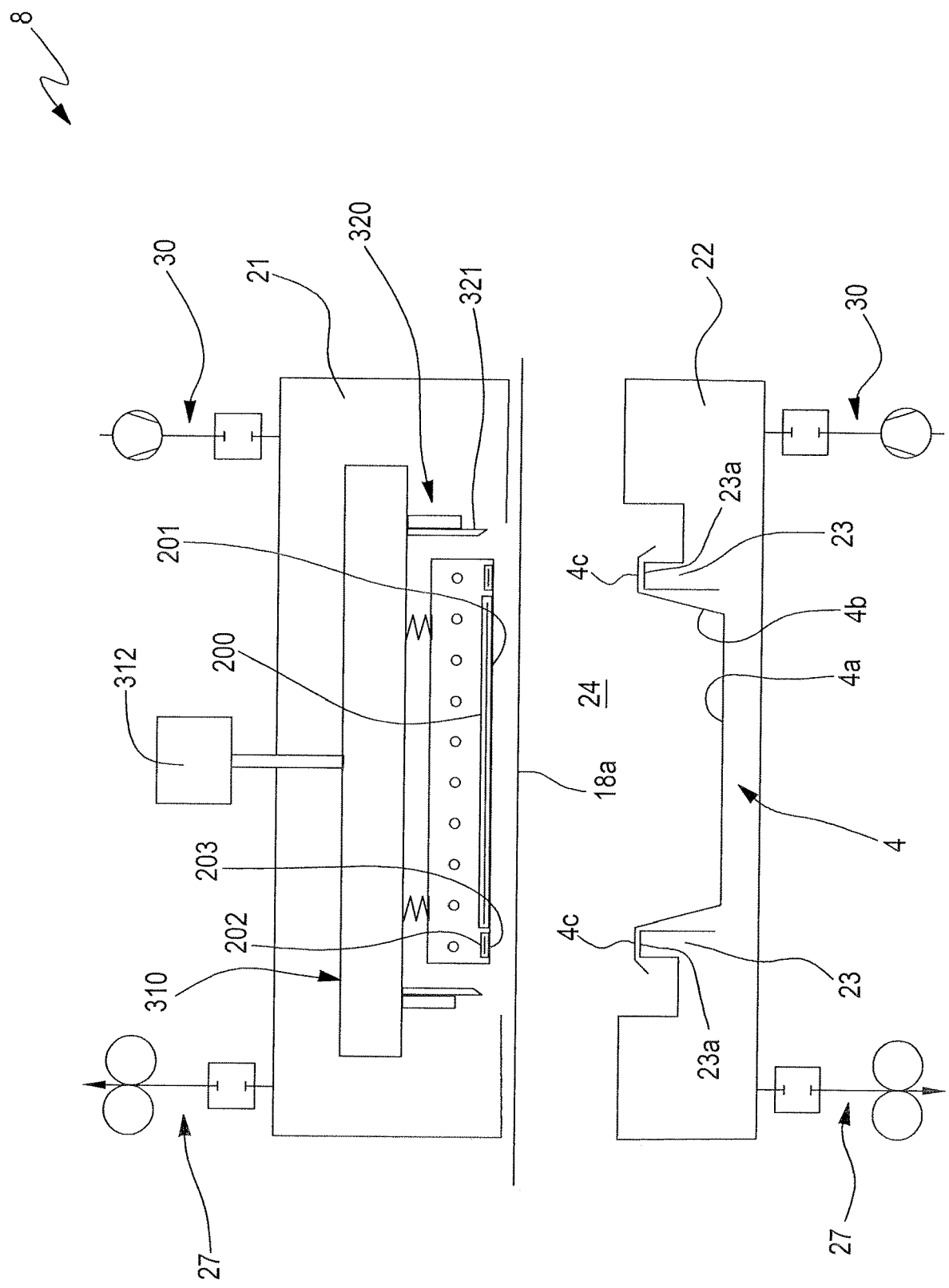
FIG. 13 is a schematic front elevation view relating to a second embodiment of a packaging assembly, which may be present in a packaging apparatus of the type shown FIG. 1A, according to aspects of the invention.
Figure 14:
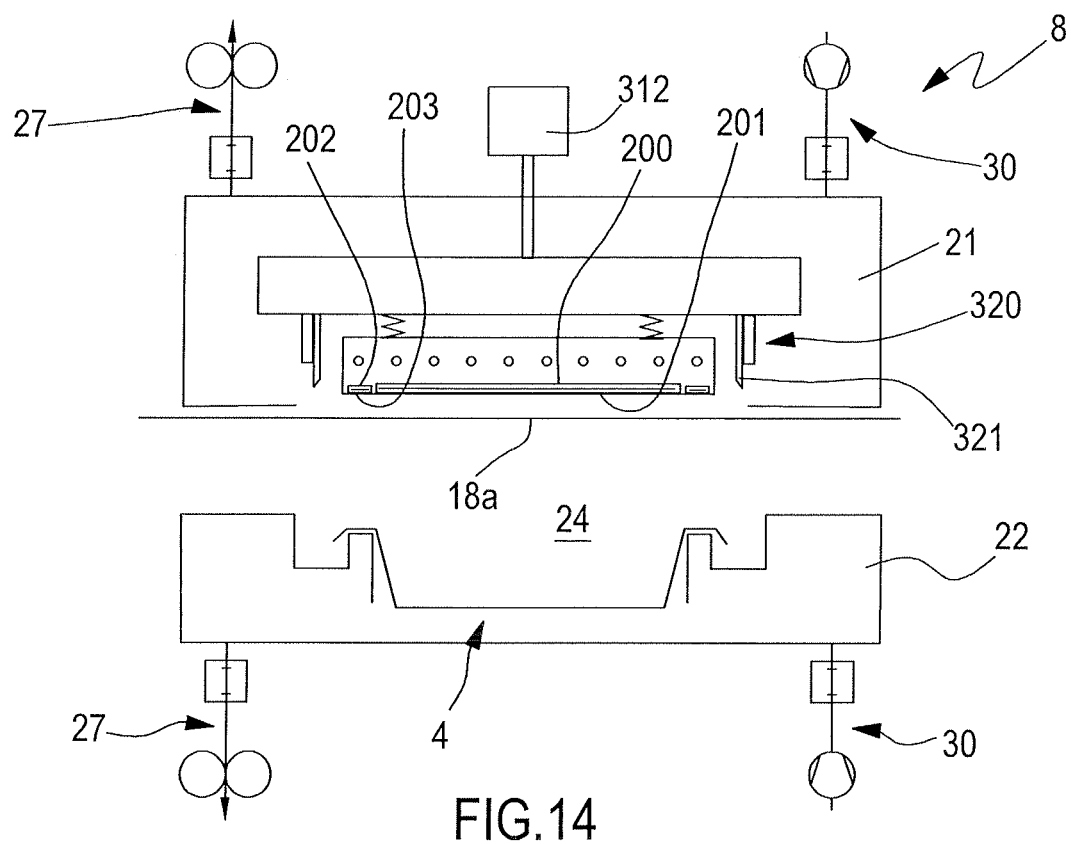
FIGS. 14-21 are schematic front elevation views of the second embodiment of the packaging assembly of FIG. 13 representing consecutive phases of a packaging process. The apparatus and process according to these figures may—for instance—be used for heat sealing a lid onto a tray with either a modified atmosphere in the tray or with regular atmosphere being left in the tray.
Figure 15:
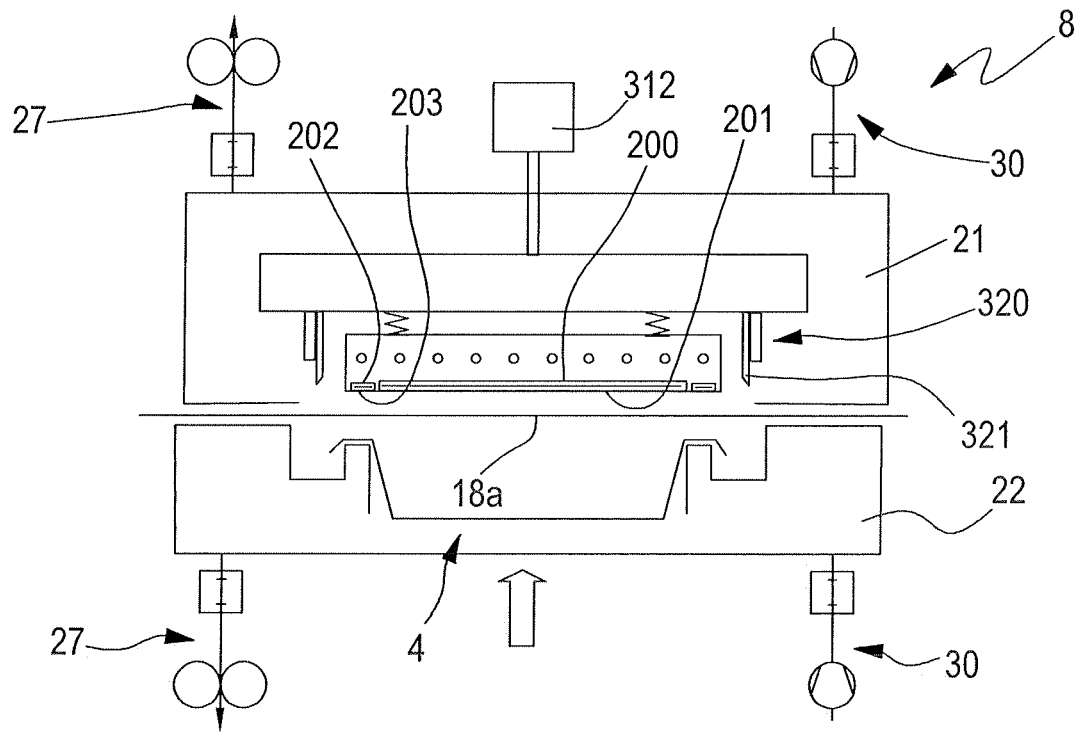

Furthermore, the first discrete time period has a duration comprised between 0.2 and 5 seconds, in particular between 0.5 and 1.5 seconds, and the second discrete time period has a duration comprised between 0.2 and 5 seconds, in particular between 0.5 and 1.5 seconds. FIG. 12, which relates to a case where a heat-shrinkable film is used, shows that the first temperature is kept for 1 second while the second temperature is kept of ¾ of a second.

In accordance with a further aspect, each heating cycle is configured such that the increasing of the temperature of the heating surface of the inner heater 200 to a second temperature starts after the increasing of the temperature of the peripheral heater 202 to the first temperature (in FIG. 12 it is shown that the heat shrinking, i.e. the heating of the inner heater to the second temperature, starts 0.25 seconds after the heating of the peripheral heater to the first temperature). In other words, the start of the second discrete time interval may be slightly delayed with respect to the start of said first time interval in order to avoid (when using heat-shrinkable film) to cause slippage of the peripheral film portion to be sealed to the rim 4c. As shown in FIG. 12, the whole duration of said first discrete time interval may be longer than the duration of said second discrete time interval.

The apparatus 1 may also include a cooling circuit 220 (FIG. 2) associated to the upper tool 21 and configured to cool said inner heater 200 and said peripheral heater 202; the cooling circuit is controlled by the control device 100 which is further configured to cause circulation of a cooling fluid (water or oil or other fluid) in said cooling circuit (in FIG. 2 the cooling circuit 220 is schematically shown above the heaters 200 and 202) and for regulating a cooling fluid temperature to a temperature significantly below both said first and second temperature and thus assist in obtaining a sharp reduction of the heating surfaces of the peripheral and inner heaters after said first and second time intervals.

As shown in FIG. 35, which schematically shows a possible structure of the supply unit 300 and control device 100 for control of electric energy fed to the heater or heaters; the supply unit is an electric supply unit and comprises:
  at least one impulse transformer 301,
  at least one electric circuitry 302 connecting the impulse transformer to the first electrically conductive element of the peripheral heater 202 and to the second electrically conductive element of the inner heater 200.

In particular, the electric circuitry may include two relays 303 and 304 (for example SSR type relays), each relay being electrically interposed between the impulse transformer and the respective one of said first and second electrically conductive elements and being controlled by the control device 100 in order to apply to the first and second electrically conductive elements the appropriate voltages and thus obtaining the heating cycle described above.

Alternatively, the supply unit 300 may include a dedicated transformer for each conductive element (alternative not shown), namely at least a first impulse transformer and a first electric circuitry connecting the first impulse transformer to the first electrically conductive element, and at least a second impulse transformer and a second electric circuitry (not shown) connecting the second impulse transformer to the second electric impedance.

In both cases the control device 100 is configured to act on the electric supply unit 300 to independently supply electric current at a predetermined voltage to the first and, respectively, second electrically conductive elements.

In a further aspect, again shown in FIG. 35, the apparatus, and particularly the packaging assembly 8, may include a first temperature sensor 305 configured for detecting a temperature of the heating surface of the peripheral heater 202 and emitting a corresponding first temperature signal correlated to the detected temperature, and an optional second temperature sensor (not shown) for detecting a temperature of the heating surface of the inner heater and emitting a corresponding second temperature signal correlated to the detected temperature. Note that the first and second temperature sensor may be contact temperature sensors or a contactless temperature sensors (e.g. IR sensors). Also note that presence of the first/second temperature sensor may not be necessary and temperature of the heating surfaces may be calculated based on the measured electric resistance of the first/second electrically conductive element.

If one or more of said temperature sensors are present, the control device 100 is connected to said first temperature sensor 305, and optionally to said second temperature sensor, and is configured for receiving the first temperature signal and controlling the supply unit to supply of energy to the peripheral heater 202 based on said first temperature signal and on a desired value for said first temperature, and optionally for receiving said second temperature signal and controlling the supply unit to supply of energy to the inner heater based on said second temperature signal and on a desired value for said second temperature. This allows an active control of the temperatures and thus an efficient delivery of the sealing operation and—where applicable—of the shrinking effect.

In an alternative the temperature or temperatures of the heating element(s) may be deducted from electric measures;

thus the presence of the first temperature sensor may not be necessary, and temperature of the heating surface may be calculated based on the measured electric resistance of the first electrically conductive element.

For instance a first electric sensor may be used, electrically connected or connectable to the carbon structure of the peripheral heater and configured for detecting an electric parameter of said carbon structure and emitting a corresponding electric parameter signal, the electric parameter comprising one of
  an electric impedance of a prefixed segment of said carbon structure,
  an electric current flowing through said prefixed segment of carbon structure when a prefixed electric voltage is applied at ends of said prefixed segment,
  an electric voltage detected at ends of the prefixed segment when a prefixed electric current is imposed to flow through said prefixed segment.

The control device would in this case be connected to said first electric sensor, and configured for receiving said electric parameter signal and controlling the supply unit to supply electric energy to the electrically conductive element of the peripheral heater, optionally by regulating voltage applied to the electrically conductive element and/or duration of application of said voltage, based on said electric parameter signal and on a desired value for a temperature of the heating surface of the heater.

Note the control device may also be configured for receiving said electric parameter signal and calculate a value of real temperature of the carbon structure of the peripheral heater based on:
  a value of said electric parameter and
  a calibration curve or calibration table stored in the control device and relating values of the electric parameter with corresponding values of the temperature of the carbon structure.

Additionally the control device may be configured to control the supply unit to supply electric energy to the electrically conductive element of the peripheral, optionally by regulating voltage applied to the electrically conductive element and/or duration of application of said voltage, based on said calculated value of the real temperature and on the desired value for the temperature of the heating surface of the heater (e.g. based on the difference or the ratio between said calculated value of the real temperature and on the desired value for the temperature of the heating surface of the heater).

Analogously, the presence of the second temperature sensor may not be necessary, and temperature of the heating surface may be calculated based on the measured electric resistance of the second electrically conductive element.

For instance a second electric sensor may be used, electrically connected or connectable to the carbon structure of the inner heater and configured for detecting an electric parameter of said carbon structure and emitting a corresponding electric parameter signal, the electric parameter comprising one of
  an electric impedance of a prefixed segment of said carbon structure,
  an electric current flowing through said prefixed segment of carbon structure when a prefixed electric voltage is applied at ends of said prefixed segment,
  an electric voltage detected at ends of the prefixed segment when a prefixed electric current is imposed to flow through said prefixed segment.

The control device would in this case be connected to said second electric sensor, and is configured for receiving said electric parameter signal and controlling the supply unit to supply electric energy to the electrically conductive element of the inner heater, optionally by regulating voltage applied to the electrically conductive element and/or duration of application of said voltage, based on said electric parameter signal and on a desired value for a temperature of the heating surface of the heater.

Note the control device may also be configured for receiving said electric parameter signal and calculate a value of real temperature of the carbon structure of the inner heater based on:
  a value of said electric parameter and
  a calibration curve or calibration table stored in the control device and relating values of the electric parameter with corresponding values of the temperature of the carbon structure.

Additionally, the control device may be configured to control the supply unit to supply electric energy to the electrically conductive element of the inner heater, optionally by regulating voltage applied to the electrically conductive element and/or duration of application of said voltage, based on said calculated value of the real temperature, on the desired value for the temperature of the heating surface of the heater (e.g. based on the difference or the ratio between said calculated value of the real temperature and on the desired value for the temperature of the heating surface of the heater).

In the first embodiment of FIG. 2, the upper tool 21 comprises a heating head 310 having a respective active surface 311. In this case the heating head 310 may be mounted for vertical motion relative to the upper tool 21, under the action of an auxiliary actuator 312 associated to the packaging assembly and controlled by control device 100. In this embodiment, the peripheral heater 202 and the inner heater 200 are both carried by said heating head and the heating head is configured to take a film sealing position, preferably in correspondence of said second operating condition of the upper 21 and lower tools 22: at said film sealing position at least the heating surface of the peripheral heater 202 is configured to press against a corresponding top surface of said film portion 18a which is pressed against rim 4c on its turn pressed against top surface 23a. This, together with the activation of the heating cycle which is synchronized with the movement of the upper tool and heating head, allows heat sealing of the film portion 18a to the underlying at least one support.

While the heating head is at said heat sealing position, the heating surface of said inner heater is configured to contact or be placed at a prefixed distance from the top surface of said film portion 18a, such as to properly heat the central zone of said film portion.

The control device 100 is configured for controlling the packaging assembly such that—during each said heating cycle
  the heating head keeps said film sealing position and thereby keeps the peripheral portion 202 of the film portion 18a against the top rim 4c, at least during said first discrete time interval, preferably until after expiration of said first discrete time interval. The control device 100 may also be further configured for controlling the packaging assembly such that—during each said heating cycle—the heating head keeps said film sealing position until after expiration of said first and second discrete time intervals.

Note that depending upon the needs, the heating surface of the inner heater 200 and the heating surface of the peripheral heater 202 may take different shape. As already mentioned, the heating surface of the inner heater 200 and the heating surface of the peripheral heater 202 may have both annular shape and form part of said active surface of the head, with the heating surface of the peripheral heater located at a radial distance from and surrounding the heating surface of the inner heater: in this case as shown in FIG. 35, in a position radially internal to the heating surface of the inner heater 200, the heating head may presents a central recess of fixed volume which—when the upper and lower tools are in said second operating condition—extends vertically away from the lower tool to define a space where at least a part of a product located on a support positioned in one of said seats is receivable.

Alternatively, the heating surface of the peripheral heater 202 and the heating surface of the inner heater 200 lay in a common plane with and forming part of said active surface of the heating head with the heating surface of the peripheral heater 202 located at a radial distance from and surrounding the heating surface of the inner heater 200 (see FIGS. 2 and 32). Alternatively, the heating head may be in at least two relatively movable bodies: a central body carrying the inner heater 200 and a peripheral body carrying the peripheral heater 202 and surrounding the central body, with the peripheral body and the central body being configured to be relatively movable to form the central recess 313. In this case, the volume of the recess is determined by the relative position of the peripheral body with respect to the central body, said central recess being positioned such that—when the upper and lower tools 21, 22 are in said second operating condition—it extends vertically away from the lower tool 22 to define a space where at least a part of a product located on a support is receivable.

It is also to be noted that the heating head may include means (e.g. means for generating a vacuum, or mechanical pincers, or other) configured to be operative in correspondence of said active surface for holding one or more of said film portions in contact with the active surface when the film portion has reached the proper position above the respective support or tray 4; alternatively or in addition, the apparatus may include retention means (such as pincers or other retaining means) configured to act on longitudinal opposite borders of said film to hold one or more of said film portions 18*a* in a position aligned with the heating head and with said one or more seats.

Finally, in the first embodiment, the upper tool 21 carries a film cutting unit 320, which is thus hosted inside chamber 24 of the packaging assembly 8, configured to be active on the continuous film 18 and configured for at least transversally cutting the continuous film: as shown in FIG. 2 the cutting unit 230 may be positioned peripherally outside the peripheral heater 202 and may be pushed towards the film portion 18*a* (e.g. under the action of pushing elements 322 including one or more of elastic springs or pneumatic actuators or hydraulic actuators) or positioned relative to the active surface of the heating head 311 such that when the upper tool 21 is lowered and the heating head moved towards the lower tool 22. A cutting tool 321 of the cutting unit 320 touches the film portion 18*a* top surface before the heating surfaces of the peripheral and inner heaters contact the same film portion 18*a* top surface. Note that insert 400 may be interposed between the upper and lower tools 21 and 22 to avoid that the cutting tool interferes with the tray rim 4*c* and to keep the film portion 18*a* in proper position during cutting.

The apparatus 1 control unit 100 which is also connected to the transport assembly 3, to the film driving assembly 5, and to the packaging assembly 8 is configured for synchronizing the conveyor 46 such that movement of a prefixed number of trays or supports 4 from a region outside the packaging chamber 24 to a region inside the packaging chamber 24 as well as the movement of the film 18 is caused to take place when the packaging chamber 24 is open while the packaging chamber 24 is closed only once said prefixed number of trays or supports 4 and the respective film portions 18*a* are in proper position relative to the upper tool 21.

The apparatus 1 may also comprise a vacuum arrangement 27 connected to the packaging chamber 24 and configured for removing gas from inside said packaging chamber; the vacuum arrangement comprises at least one vacuum pump 28 and at least one evacuation pipe 29 connecting the inside of said chamber 24 to the vacuum pump; the control unit 100 controls the vacuum pump 28 to withdraw gas from said packaging chamber 24 at least when the packaging assembly is in said second operating condition, i.e. with said packaging chamber hermetically closed.

The apparatus 1 may also or may alternatively include a controlled atmosphere arrangement 30 connected to the packaging chamber 24 and configured for injecting a gas stream into said packaging chamber; the controlled atmosphere arrangement comprises at least one injection device including an injection pump and/or one injection valve 31 acting on at least one injection pipe 32 connecting the inside of said chamber to the a source of gas (not shown) which may be located remotely from the apparatus 1; the control unit 100 may be configured to control opening and closing of the injection valve (or activation of the injection pump) 31 to inject said stream of gas at least when the packaging assembly 8 is in said second operating condition, i.e. with said packaging chamber 24 hermetically closed. The control unit 100 may also be configured to control the composition of the modified atmosphere generated inside the chamber 24. For instance the control unit 100 may regulate the composition of the gas stream injected into the packaging chamber. The gas mixtures injected into the packaging chamber to generate a modified atmosphere may vary depending upon the nature of product P. In general modified atmosphere mixtures include a volumetric quantity of one or more of $N_2$, $O_2$ and $CO_2$ which is different from the quantity of these same gases as present in the atmosphere at 20° C. and sea level (1 atmosphere pressure). If product P is a produce such as meat, poultry, fish, cheese, bakery or pasta the following gas mixtures may be used (quantities are expressed in volume percentages at 20° C., 1 atm of pressure):

| | |
|---|---|
| Red meats, Poultry skinless: | $O_2$ = 70%, $CO_2$ = 30% |
| Poultry with skin on, Cheese, Pasta, Bakery products: | $CO_2$ = 50%, $N_2$ = 50% |
| Fish | $CO_2$ = 70%, $N_2$ = 30% or |
| | $CO_2$ = 40%, $N_2$ = 30%, $O_2$ % = 30 |
| Processed meat | $CO_2$ = 30%, $N_2$ = 70% |

According to one aspect the control unit 100 may be configured to control said injection pump or said injection valve 31 to start injecting said stream of gas either after a prefixed delay from activation of said vacuum pump 28 or after a prefixed level of vacuum has been reached inside said packaging chamber 24. In a further aspect the control unit 100 may cause the start of the injecting of said stream of gas for creating a modified atmosphere while said vacuum pump 28 is still active so as to shorten the time for creating the modified atmosphere. Moreover as it is preferable to avoid having very strong vacuum in the packaging chamber 24 and at the same time it is desirable to ensure a proper atmosphere inside the chamber it is advantageous stopping the vacuum pump after opening the gas injection. In this way pressure inside the chamber never goes below a desired value. During the overlap the gas injected is mixed with residual air and continuing to pull vacuum the mix air-modified atmosphere continues to be removed so that the amount of initial air is decreased.

According to a further aspect, it is noted that the control unit 100 is configured to control said injection pump 31 such that gas flow is not injected at a too high speed which may damage the firm holding of the cut film by the upper tool. Control unit 100 may control gas injection at a gas pressure set below a limit to prevent film detachment from or film mis-positioning in correspondence of upper tool 21 (injection pressure is kept between 1.3 and 4.0 bar optionally or between 1.5 and 3.0 bars).

Although the apparatus 1 may have one or both the vacuum arrangement 27 and the controlled atmosphere arrangement 30, it is to be understood that the control unit 100 of the apparatus 1 may also be configured to tightly engage the film sheets 18 to the trays without activating the vacuum arrangement or the controlled atmosphere arrangement and thus leaving the normal environment atmosphere within the tray. This may be for instance the case for nonperishable products. In a simpler version the apparatus 1 may be designed without vacuum arrangement and without modified atmosphere arrangement.

After the above structural description of the first embodiment of apparatus 1 here below operation of the first embodiment is disclosed. The operation takes place under control of control device 100 and achieves a process of packaging a product in a tray. In this case the described process allows packaging under modified atmosphere. In any case the apparatus 1 is also capable of making a skin packaging of the product. Moreover, the apparatus 1 may be used for applying a lid to a tray and thus packaging in normal ambient atmosphere.

Figure 8:
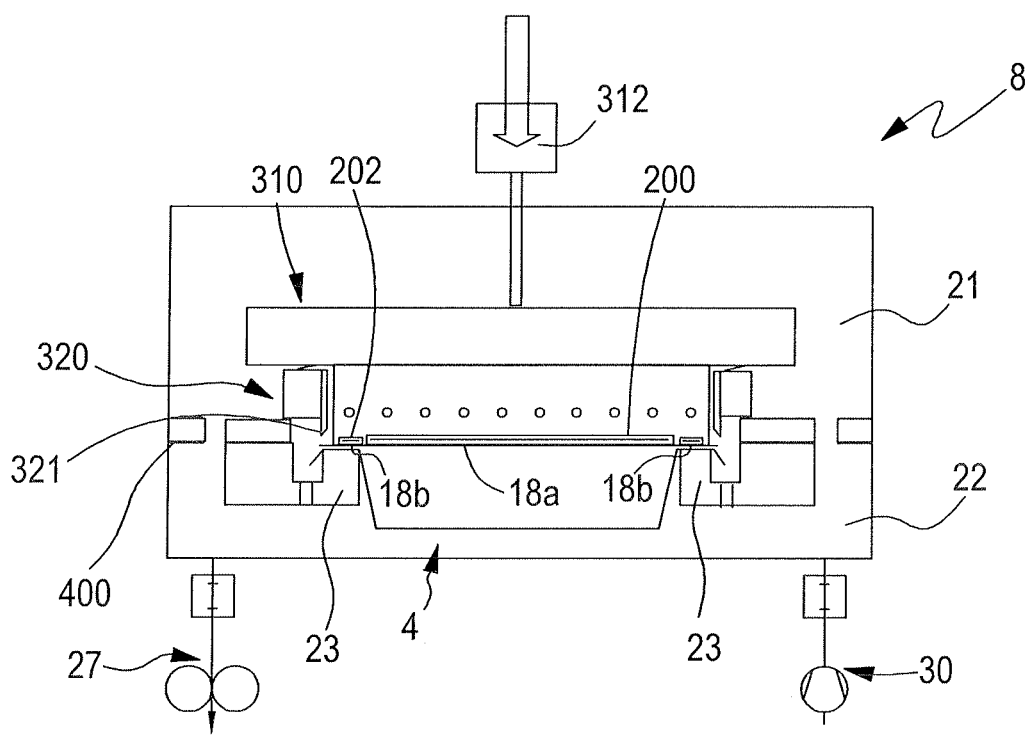
Figure 9:
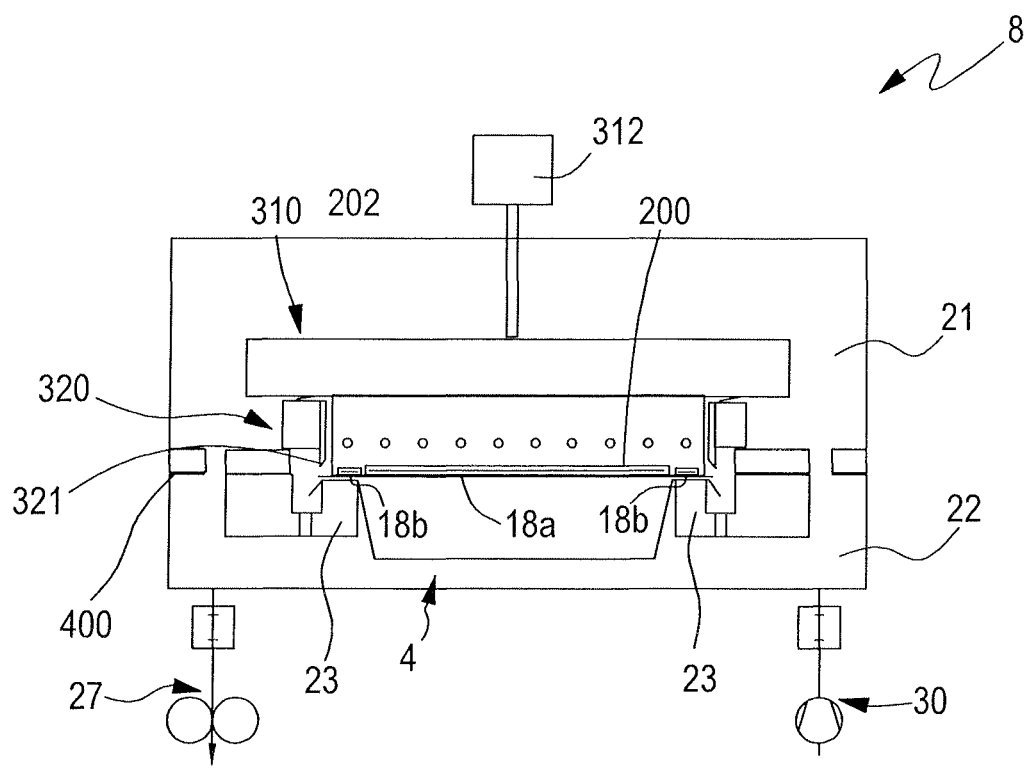
Figure 10:
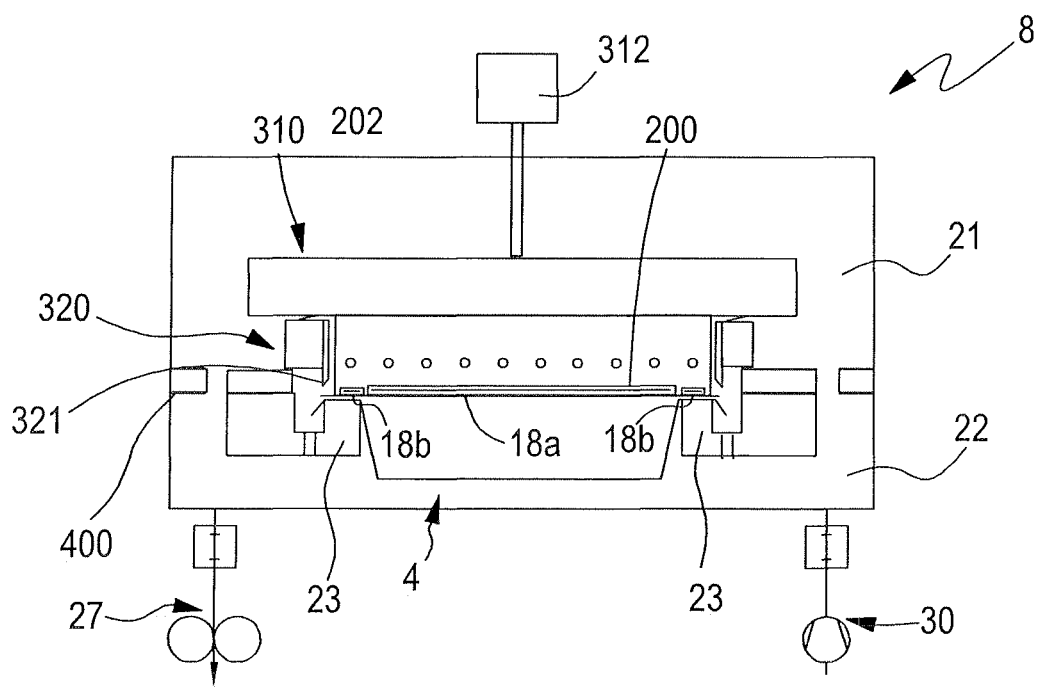
Figure 11:
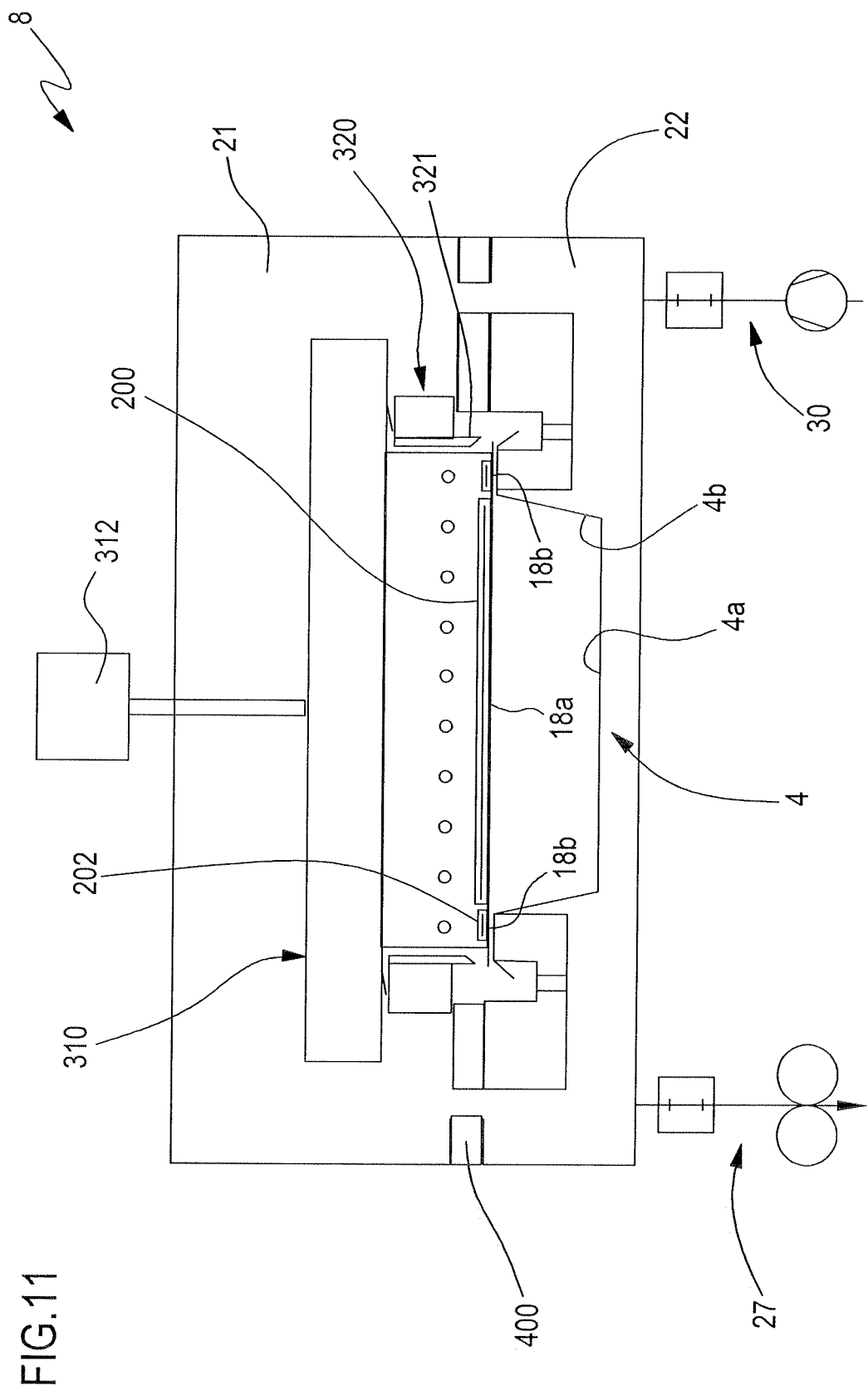

Once the chamber 24 has been closed, and after operation of the vacuum and/or controlled atmosphere arrangement (FIGS. 4 to 6), the control device 100 is configured to act on auxiliary actuator 312 to impose a further vertical movement to the cutting unit 320 (FIG. 7) of the heating head, which reaches the surface of the film after cut of film portion 18a from the remaining of film 18 (FIG. 8). At this point, the peripheral border 18b of film portion 18a is trapped between the peripheral heating element and the rim 4c of the tray positioned into seat 4. Thus, the control device 100 may start the heating cycle as described above bringing the heating surface of the peripheral heater 202 at the first temperature for a short time interval sufficient for heat sealing the peripheral border 18b to the rim 4c. In case a shrinkable film is being used the control device 100 also brings the temperature of the inner heater 200 to the second temperature for a short time interval sufficient to obtain a controlled heat shrinking of the film portion covering the tray mouth which thus takes a perfectly controlled flat shape. FIGS. 9 and 10 show schematically that first the peripheral heater is brought to the first temperature (peripheral heater shaded) and then (FIG. 10) also the inner heater is brought to the second temperature (heaters both shaded). Once the heating cycle is completed both heaters may be cooled (interrupting supply of energy to the heaters and optionally circulating cooling fluid in cooling circuit 220 (FIG. 10).

Then the control device 100 opens the packaging chamber 24 the tray with applied film to proceed downstream the packaging assembly. The cycle may then be repeated.

Second Embodiment of the Apparatus 1

Reference is made to FIGS. 1A and 13-22. The structure of the second embodiment is the same as that of the first embodiment a part from the following differences which concern the packaging assembly 8. Thus, the above description made for the first embodiment (with the same reference numerals) also applies for the second embodiment and is not repeated. Also the aspects described above (see first embodiment) in connection with FIGS. 32, 33, 34, 32A, 32B, 33A, 33B may be used in connection with this second embodiment.

As mentioned, the only differences between the first and second embodiment concern the packaging assembly which has a heating head 310 mounted to the upper tool 21 such that—when the upper and lower tools are in the second operating condition—the active surface 311 of the heating head and thus the heating surface of the peripheral heater 202 and the heating surface of the inner heater 200 touch the film before the cutting tool of the cutting device 320 may touch the film top surface. For instance, the cutting device may be fixed to the heating head in a position peripherally outside the peripheral heater 202 and leaving the cutting tool 321 retracted with respect to the heating surfaces 203 and 201 of the peripheral and inner heaters 200 and 202, which may be carried by an intermediate body 500 mounted to the heating head 310 for vertical motion under the action of pushing elements (which may be in the form of one or more elastic springs, pneumatic actuators or hydraulic actuators) configured for pushing the heaters towards the film portion 18a such that when the upper tool is lowered and the heating head moved towards the lower tool, the cutting tool 321 of the cutting unit touches the film portion top surface after the heating surfaces contact the same film portion top surface.

In this embodiment insert 400 may not be present.

Finally, the second embodiment may include a vacuum arrangement 27 associated to both the upper and the lower tools 20 and 21 and a controlled atmosphere arrangement 30 also associated to both the upper and the lower tools 21 and 22.

Operation of the second embodiment is as follows. The operation takes place under control of control device 100 and achieves a process of packaging a product in a tray. In this case the described process allows packaging under modified atmosphere. In any case the apparatus 1 is also capable of making a skin packaging of the product. Moreover, the apparatus 1 may be used for applying a lid to a tray and thus packaging in normal ambient atmosphere.

Figure 16:
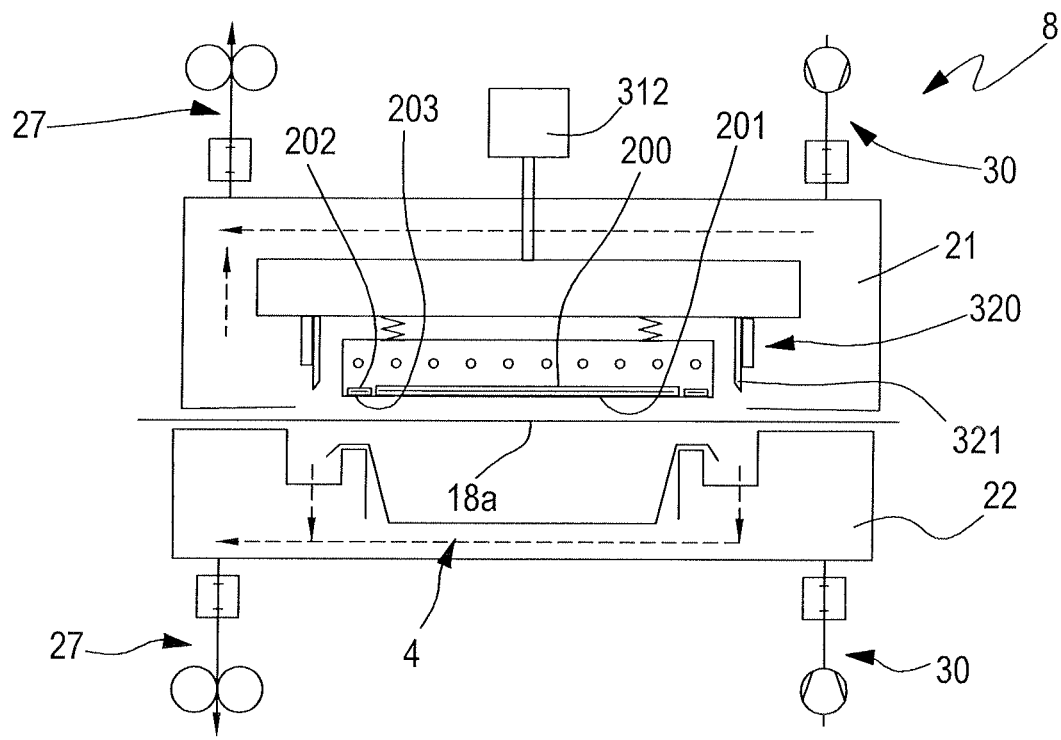
Figure 17:
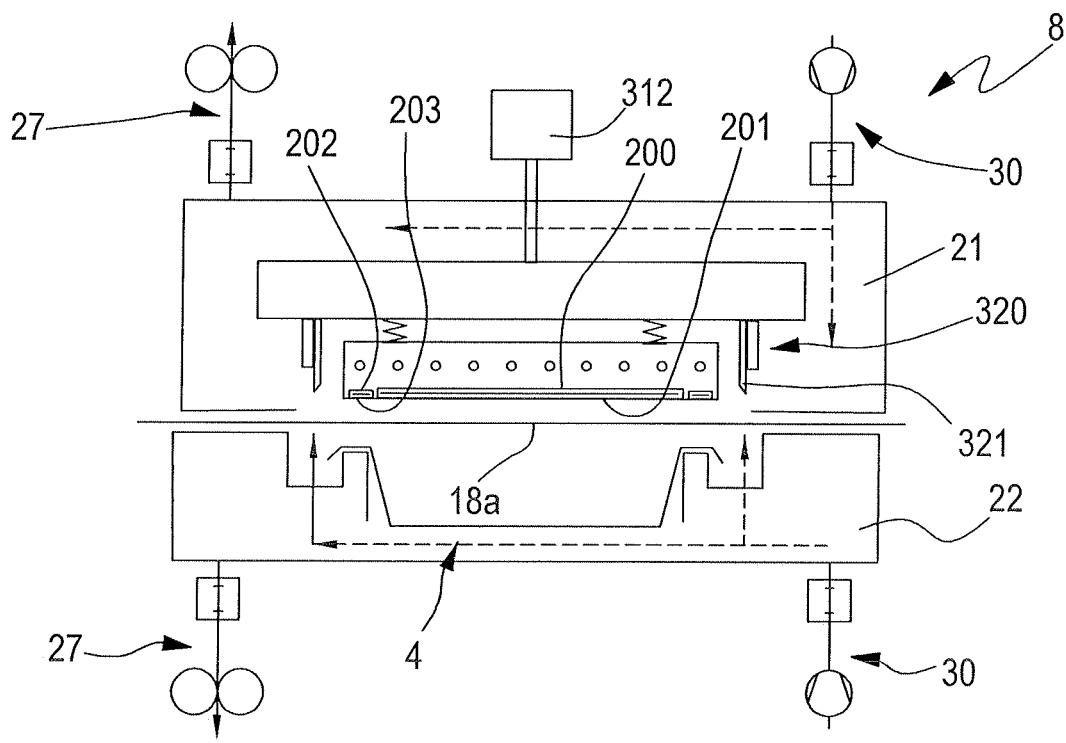
Figure 18:
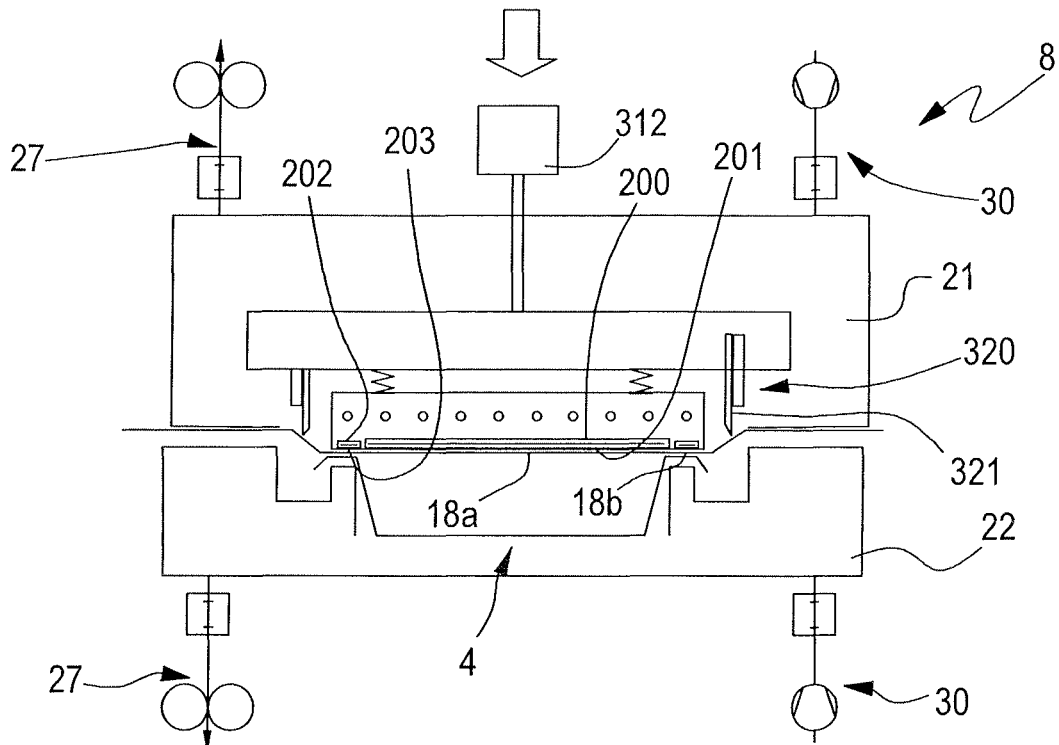

Once the chamber 24 has been closed (moving from the configuration of FIG. 14 to that of FIG. 15), and after operation of the vacuum and/or controlled atmosphere arrangements (FIG. 16 shows formation of vacuum and FIG. 17 creation of controlled atmosphere), the control device 100 is configured to act on auxiliary actuator 312 to impose a further vertical movement to the heating head 310 and thus bring the heating surfaces of inner and outer heater in contact with film 18 (FIG. 18). At this point, the peripheral region 18b of film portion 18a is trapped between the peripheral heating element 202 heating surface and the rim 4c of the tray positioned into seat 4. Then a further movement of the heating head e.g. operated by auxiliary actuator 312 brings the cutting unit 320 (FIG. 19) to bring the cutting tool 321 against film 18 and thus cut the film portion 18a.

Figure 19:
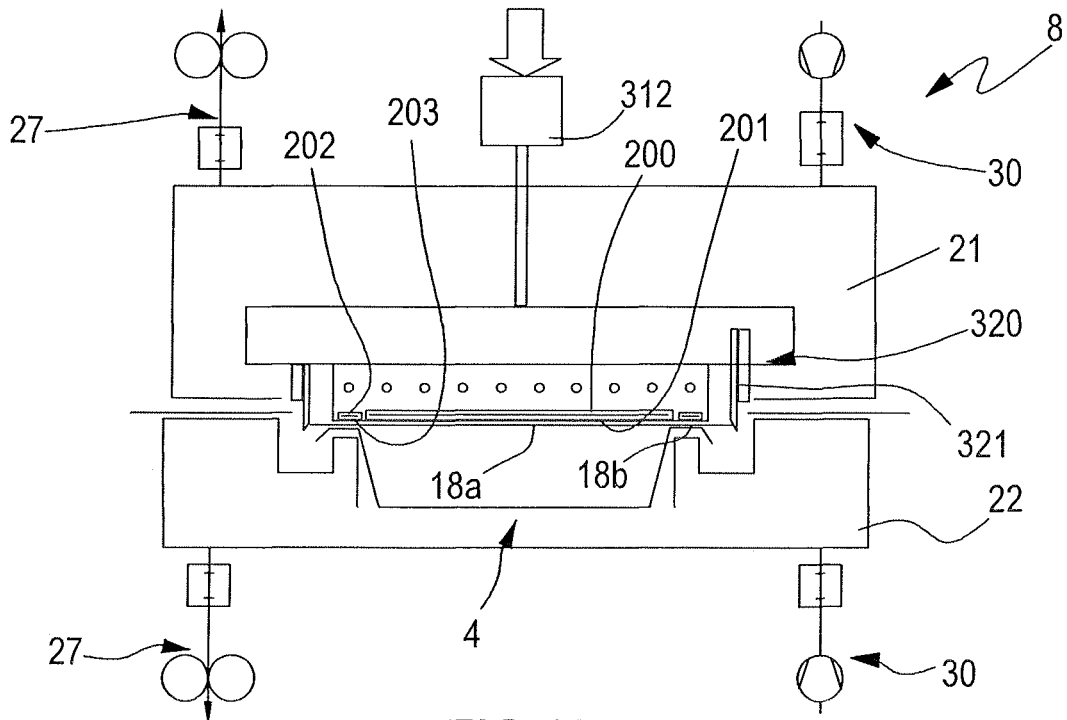
Figure 20:
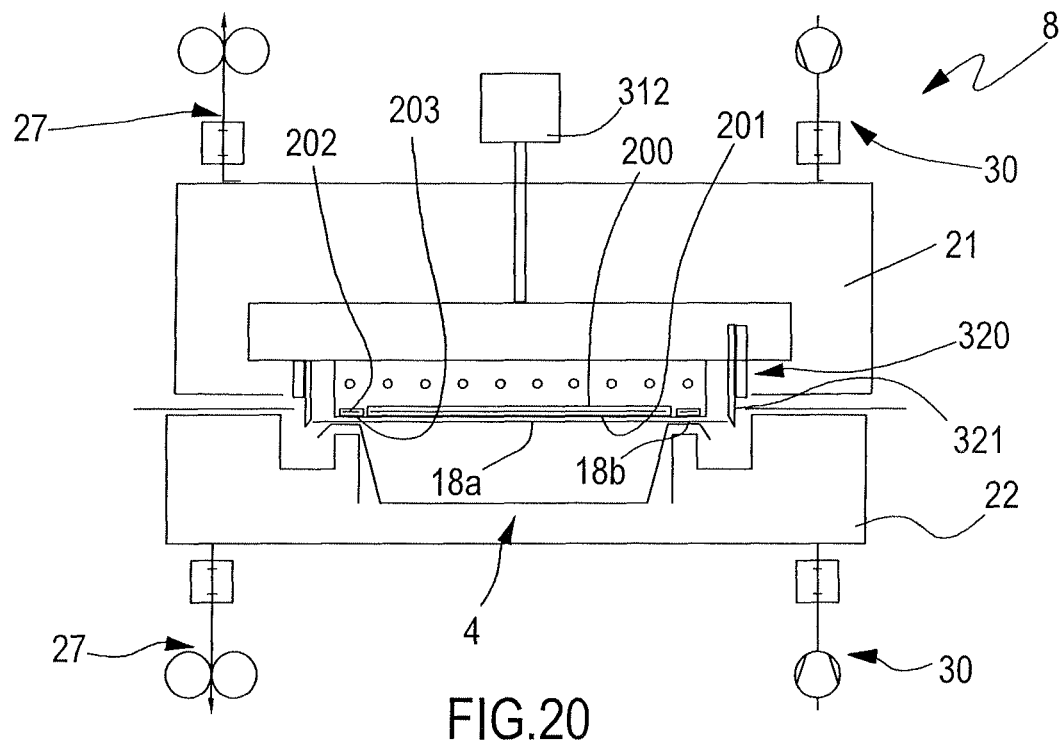
Figure 21:
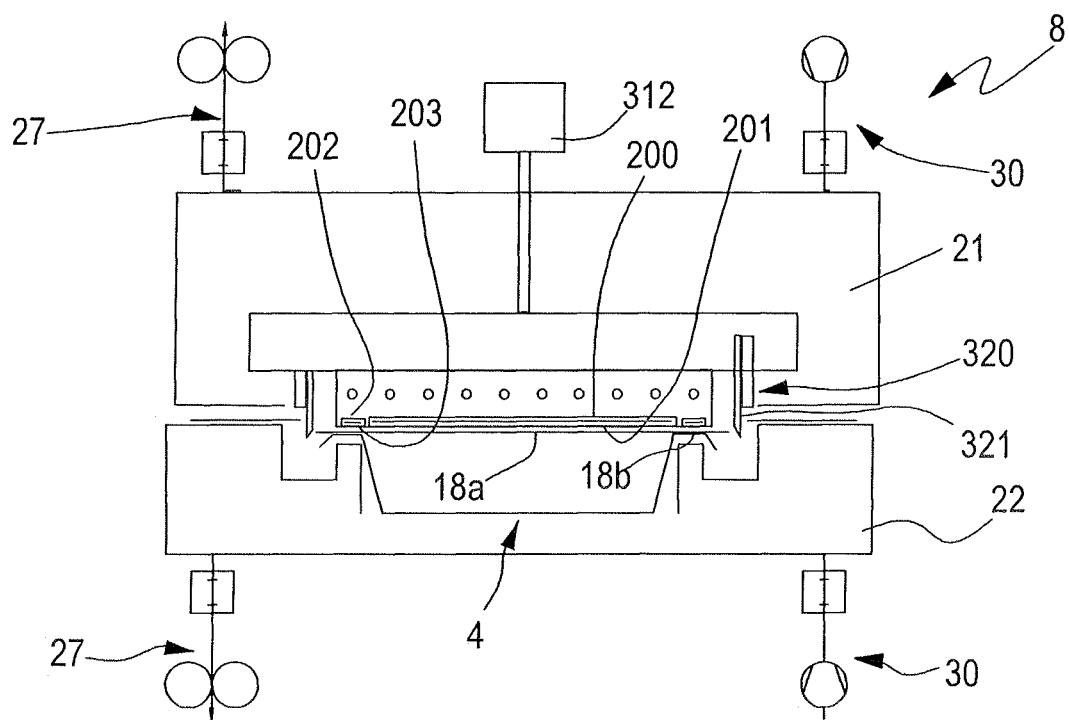
Figure 22:
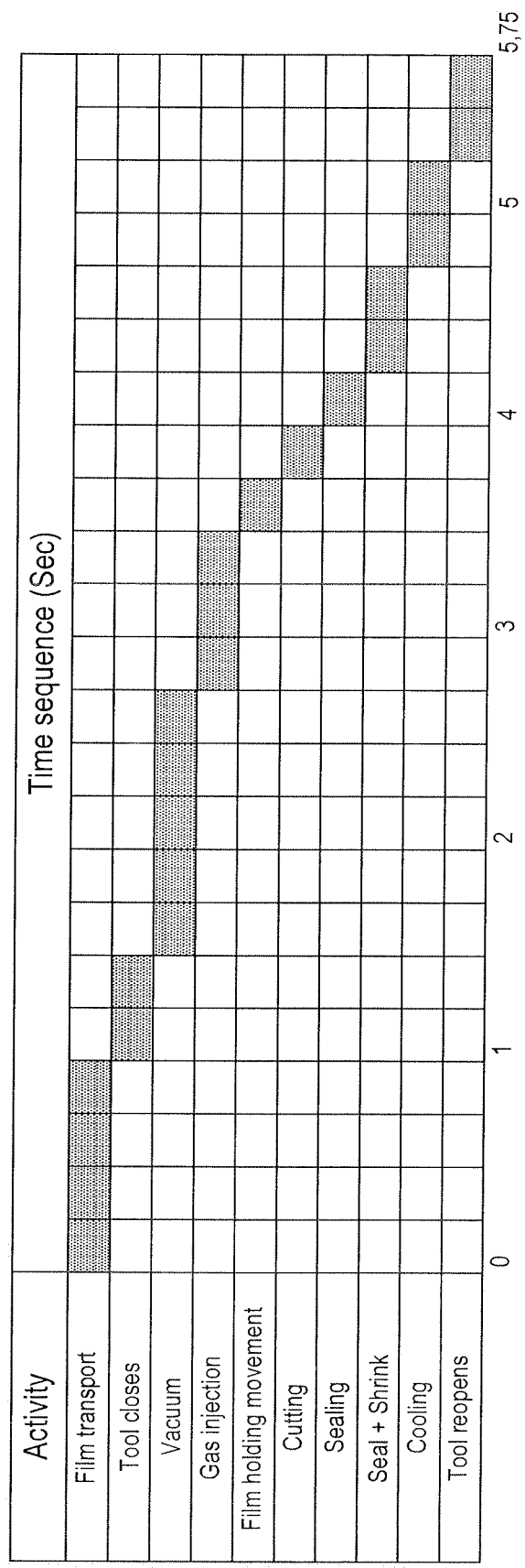
FIG. 22 is a diagram indicating, on a first axis, the steps of a packaging process followed by the apparatus of FIG. 1A when using the packaging assembly of FIGS. 13-21 and indicating, on a second axis, the time in seconds, wherein in the diagram area the time intervals for each packaging process step are represented with gray patterned areas.

Then, or substantially contemporaneously with the cutting (note however that the heating cycle may also start as soon as one of the heaters contacts the film), the control device 100 may start the heating cycle as described above bringing the heating surface of the peripheral heater 202 at the first temperature for a short time interval sufficient for heat sealing the peripheral border 18*b* to the rim 4*c*. In case a shrinkable film is being used the control device 100 also brings the temperature of the inner heater to the second temperature for a short time interval sufficient to obtain a controlled heat shrinking of the film portion covering the tray mouth which thus takes a perfectly controlled flat shape. FIGS. 19 and 20 show schematically that first the peripheral heater is brought to the first temperature (peripheral heater shaded in FIG. 19) and then (FIG. 20) also the inner heater 200 is brought to the second temperature (heaters both shaded). Once the heating cycle is completed both heaters may be cooled (interrupting supply of energy to the heaters and optionally circulating cooling fluid in cooling circuit 220 (FIG. 21). Then the control device 100 opens the packaging chamber 24 the tray with applied film to proceed downstream the packaging assembly. The cycle may then be repeated.

Third Embodiment of the Apparatus 1

Reference is made to FIGS. 1 and 23-31. The structure of the third embodiment is similar to that of the first embodiment a part from the following differences. Thus, for sake of conciseness only the aspects and components of this second embodiment differing from those of the first embodiment will be described: the above description made for the first embodiment with reference to components with the same reference numerals also applies for the third embodiment and is not repeated. Also the aspects described above (see first embodiment) in connection with FIGS. 32, 33, 34, 32A, 32B, 33A, 33B may be used in connection with this third embodiment.

The apparatus 1 is adapted for vacuum skin packaging of the product P, where a thin film of plastic material, such as film sheet 18 described below, is draped down on the product P and intimately adheres to a top rim 4*c* and to the inner surface of the support 4 as well as to the product surface thus leaving a minimum, if any, amount of air within the packaging. The apparatus 1 may however also be used in case a film sheet 18 is applied to a tray or support with modified atmosphere previously created in the tray. The apparatus 1 may also be used for packaging of products on flat supports.

The frame 2 defines a base body of the apparatus 1 and serves to carry and support various parts of the apparatus 1 as herein described. The transport assembly 3 for the trays 4 is analogous to that of the first embodiment.

The film driving assembly 5 includes a film roll 10 which supplies a continuous film 18. The film supplying assembly 5 may further comprise an arm 11 (represented in dashed lines in FIG. 1) fixed to the frame 2 and suitable for supporting the roll 10. Further, the film supplying assembly 5 may comprise film punching devices (not show as per se known) configured essentially to provide the correct profile to the film edges to match, when transversally cut by cutting unit 320, the shape of the tray 4 mouth with rounded corners. The punching devices may also help to keep an unrolled portion of film pulled from the film roll 10 aligned according to a prefixed direction. The film 18 driving assembly 5 also comprises pinch rollers 12 and/or other means for pulling the film from the roll 10 and properly position it at the cutting station, in correspondence of the film cutting unit 320 (for instance said means may comprise pincers acting on the side of the film and/or pincers acting on the front edge of the film and configured to pull the film). The film rolled on the film roll 10 may be made and have the structure disclosed in the above section dedicated to the film, depending upon the specific need.

The apparatus 1 of the third embodiment is designed for cutting a continuous film 18 into discrete film portions 18*a* at a location (a cutting station where cutting unit 320 operates) spaced from and positioned outside packaging assembly 8 and for then transporting the cut film portion into the packaging assembly 8, where the film portions 18*a* are bonded to the respective supports or trays 4. The apparatus 1 comprises a device for transferring the cut film sheet or sheets from the cutting station to a position above the tray inside the packaging assembly; however, how the cut film sheet is transported to the packaging assembly and above the respective tray or support is not relevant: non-limiting examples of suitable transfer devices are provided herein below.

Figure 23:
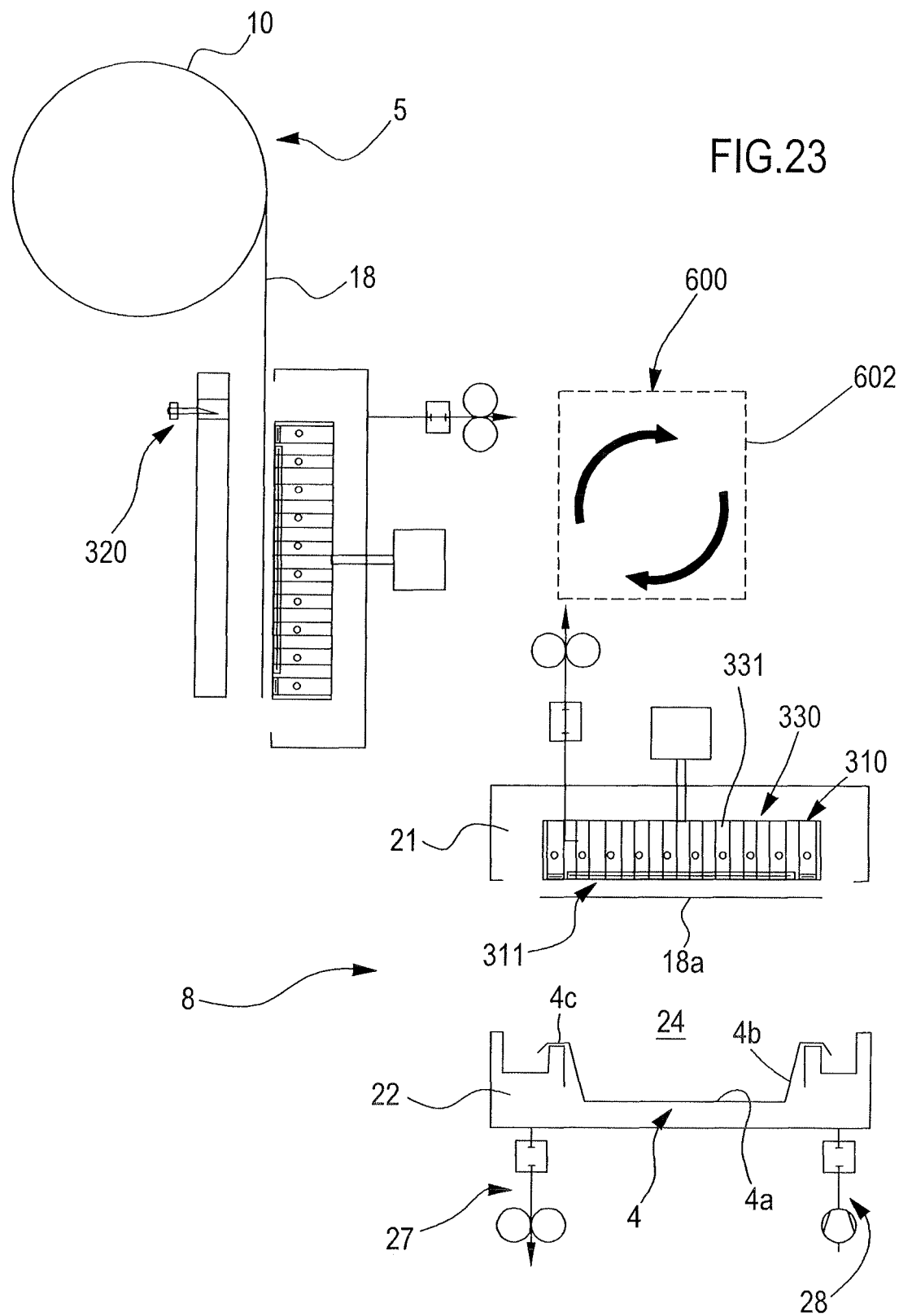
FIG. 23 is a schematic front elevation view relating to a third embodiment of a packaging assembly, which may be present in a packaging apparatus of the type shown FIG. 1A, according to aspects of the invention. In this figure the packaging assembly includes two upper tools which can be pivotally operated; alternatively it is possible using a packaging assembly having only one upper tool and a transfer device for moving the pre-cut film sheets into the packaging assembly as shown in FIG. 1.

The film cutting unit 320 may be located at the cutting station (see FIG. 1 and FIG. 23). The cutting unit 320 comprises a cutting tool 321 with a blade and a blade piston. This piston may be replaced by any other kind of electric, pneumatic or hydraulic linear actuator. The blade piston is preferably fixed to the frame 2 and is connected to the cutting tool 321 so as to push and pull it in a direction transverse to the unrolled portion of the film 18, as indicated by the double arrow A2 shown in FIG. 1. Note that the film 18 may be unrolled in a vertical direction with the cutting tool moving horizontally.

The packaging assembly 8, includes a lower tool 22 and an upper tool 21. The lower tool 22 comprises a prefixed number of seats 23 for receiving said one or more supports 4, while the upper tool 21 is configured for holding at least the cut film sheet(s). The upper tool and the lower tool are configured to be movable the one relative to the other between at least a first operating condition, where the lower tool and the upper tool are spaced apart and allow positioning of the one or more supports 4 at said seats 23, and a second operating condition, where the lower tool and the upper tool are approached the one against the other such as to define or contribute to define a packaging chamber 24. In one aspect, the packaging chamber 24 may be hermetically closed with respect to the outside atmosphere, meaning that the packaging chamber 24 may be brought to a condition where it cannot freely communicate with the atmosphere outside the same chamber and gas may only be supplied or withdrawn from the chamber via appropriate supply or discharge channels under the control of the apparatus 1.

As schematically shown in FIGS. 1 and 23, the cut film portions 18*a* may be moved into the packaging chamber 24 of the assembly 8 by means of a transfer device. The transfer device may be of any suitable kind.

For instance, in accordance with a $1^{st}$ possible alternative—the transfer device 600 may include a transfer mechanism 601 (FIG. 1) acting on the cut film sheet(s) may be used for transporting the cut film sheet from the cutting station where the cutting assembly cuts the film portions 18*a* into the packaging assembly 8 and then leaving the packaging assembly 8.

Alternatively, the transfer device may include a displacement mechanism 602 (FIG. 23) configured to move the upper tool 21 from the packaging assembly 8 to the position outside where the cutting unit effects the cutting of the film sheets; in this way the upper tool 21 is allowed to pick the cut film portion(s) 18*a* and return to the packaging assembly 8 in alignment with the lower tool 22, thereby bringing the cut film portion(s) 18*a* into the packaging chamber 24 and above the trays. Note that other ways could be envisaged for transfer of a pre-cut film sheet or sheets inside the packaging assembly 8, without departing from the scope of the invention: in practice any solution adapted to pick the film sheet and transfer it into the packaging assembly may be suitable.

Finally, as to the packaging assembly 8, the upper tool 21 does not need any cutting unit 320 and the heating head has a respective active surface configured for receiving the film portion 18*a* and particularly of said cut film sheet. Holding means 330 are associated to the head 310 and are configured for attracting the film portion or film sheet 18*a* towards the active surface 311. The holding means 330 may comprises a plurality of suction apertures 331 leading to the active surface, at least one vacuum source, e.g. comprising a vacuum pump controlled by the control device 100 and connected to the suction apertures 331, and at least one selector valve, also controlled by the control device 100, selectively connecting said suction apertures either to said vacuum source or to a vent line. The control unit 100 may be configured to activate the holding means by switching the selector valve to a position where the valve connects the suction apertures to the vacuum source thereby causing suction of gas through the apertures. Alternatively, two valves may be used which may selectively be opened and closed to determine a fluid connection between said apertures either to the vacuum source or to the vent line. Note that in addition or in alternative to vacuum source the holding means 330 may include one or more of the following:

- mechanical holders, such as pincers, clamps or the like,
- adhesive systems, for instance comprising adhesive portions associated to the active surface 311,
- heating systems, for instance comprising heatable portions—controlled by control device 100—associated to the holding means for causing heating of the active surface and thus of the film sheet 18 in order to increase stickiness of the film sheet to the active surface,
- electric systems, for instance the active surface may be charged with a polarity different from that typical of the plastic sheet 18.

Although the apparatus 1 may have one or both the vacuum arrangement 27 and the controlled atmosphere arrangement 30, it is to be understood that the control unit 100 of the apparatus 1 may also be configured to tightly engage the film portions 18*a* to the trays without activating the vacuum arrangement or the controlled atmosphere arrangement and thus leaving the normal environment atmosphere within the tray. This may be for instance the case for nonperishable products. Thus in a version, the apparatus 1 may be designed without vacuum arrangement and without modified atmosphere arrangement.

Operation of the third embodiment is as follows. The operation takes place under control of control device 100 and achieves a process of packaging a product in a tray. In this case the described process allows skin packaging under modified atmosphere. In any case the apparatus 1 is also capable of making a skin packaging of the product. Moreover, the apparatus 1 may be used for applying a lid to a tray and thus packaging in normal ambient atmosphere.

Figure 24:
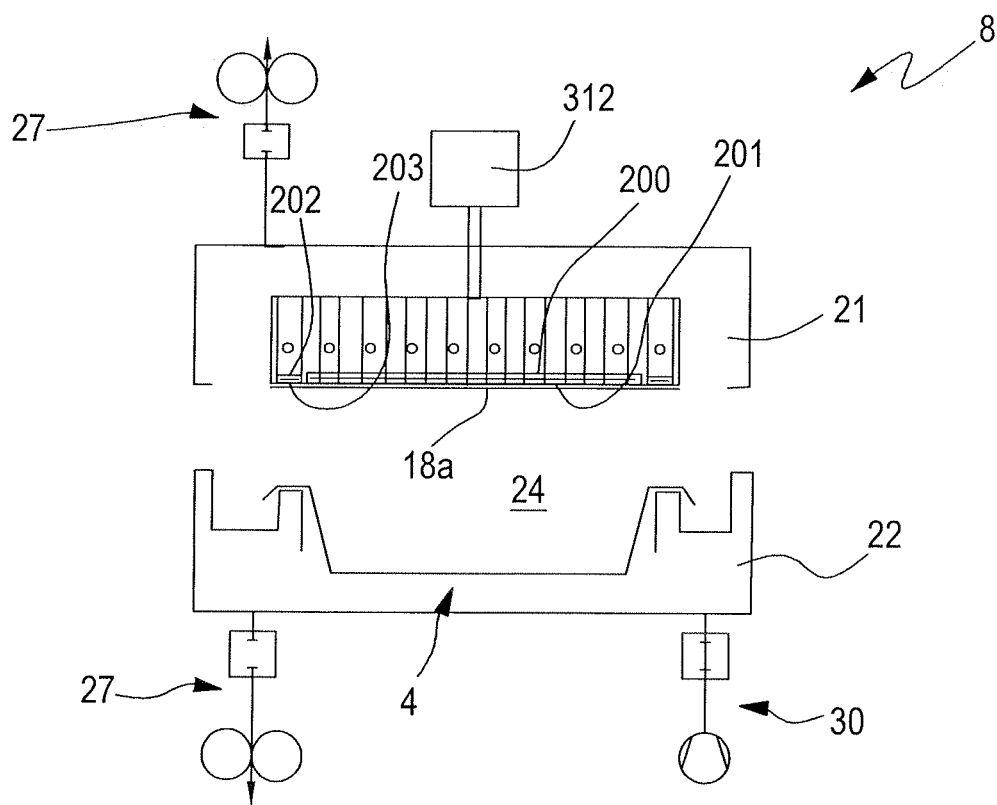
FIGS. 24-30 are schematic front elevation views of the third embodiment of the packaging assembly of FIG. 23 representing consecutive phases of a packaging process. The apparatus and process according to these figures may—for instance—be used for heat sealing a lid onto a tray with either a modified atmosphere in the tray or with regular atmosphere being left in the tray.
Figure 25:
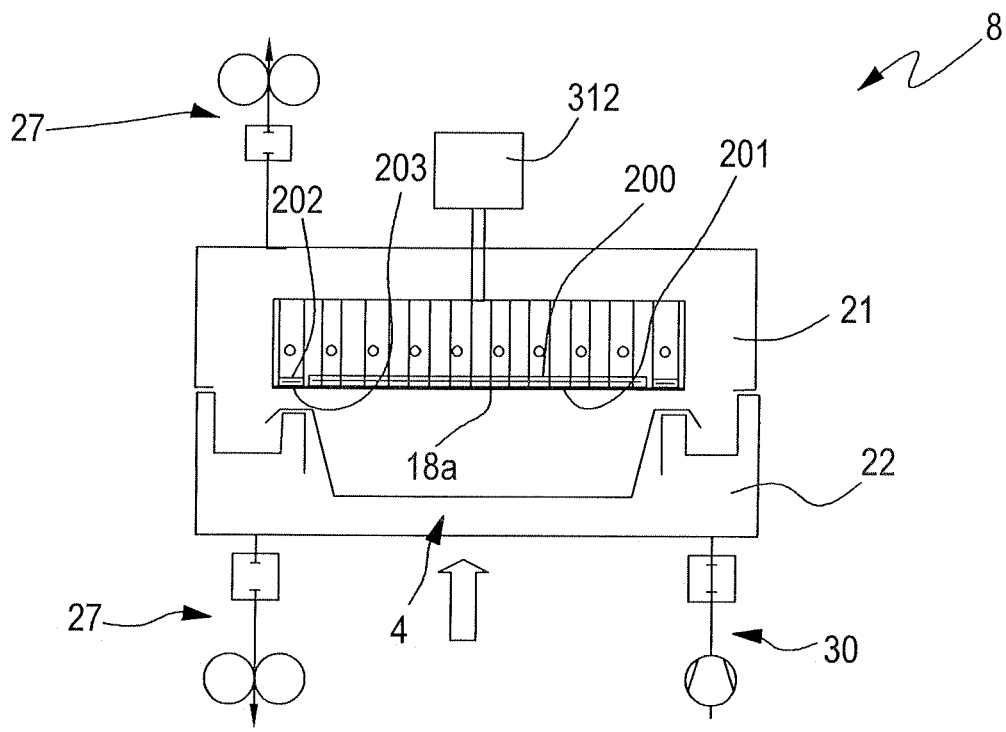

First at cutting station the cutting unit 320 cuts a film portion 18*a* in the form of a discrete film sheet from continuous film 18. Then either the upper tool 21 moves to the packaging station and picks up the cut film sheet or the cut film sheet is moved into the packaging assembly by transfer device 600. In this latter case the upper tool 21 picks the cut film portion and the transfer device leaves the packaging chamber 24 (FIG. 24). Then, the upper and lower tools are aligned (if necessary) and moved from the first to the second operating condition (see FIGS. 24 and 25), with the film portion 18*a* kept against the active surface of the heating head by the holding means 330 of the heating head 310 (and thus also against the heating surfaces of the inner and peripheral heaters): preferably the film 18*a* is maintained at a distance from the top surface of the rim 4*c*.

Figure 26:
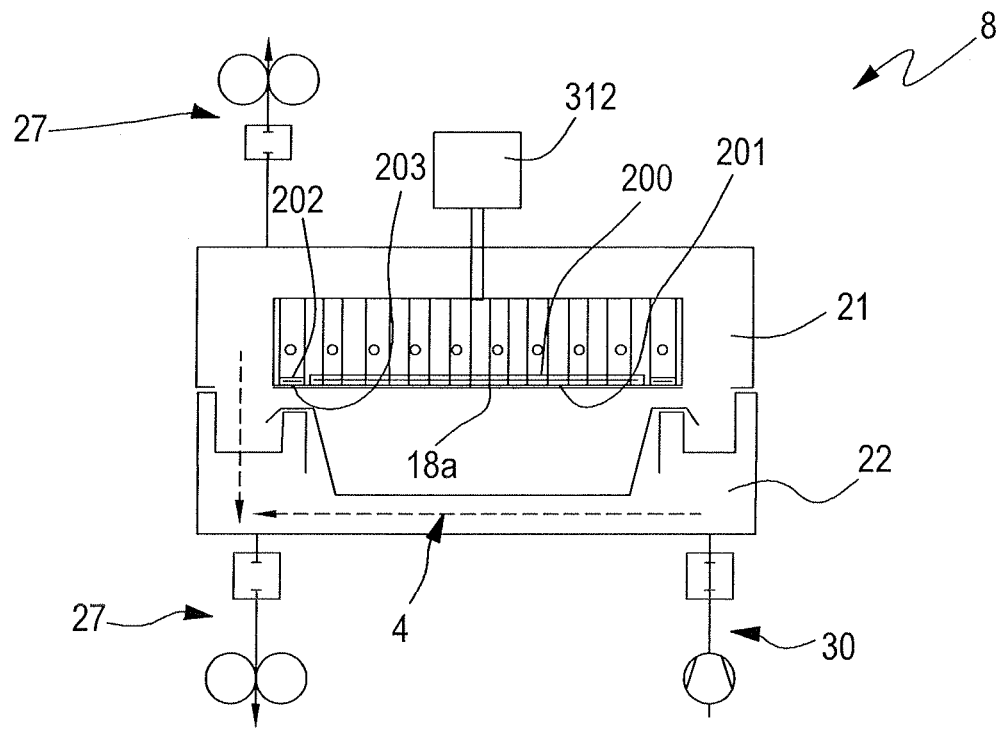
Figure 27:
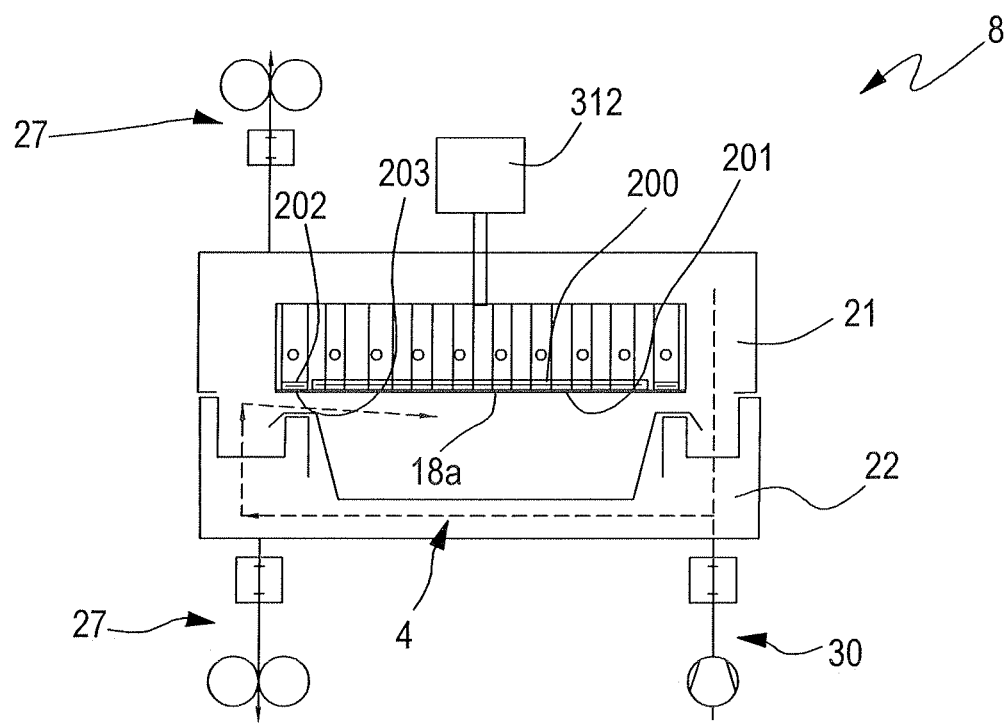
Figure 28:
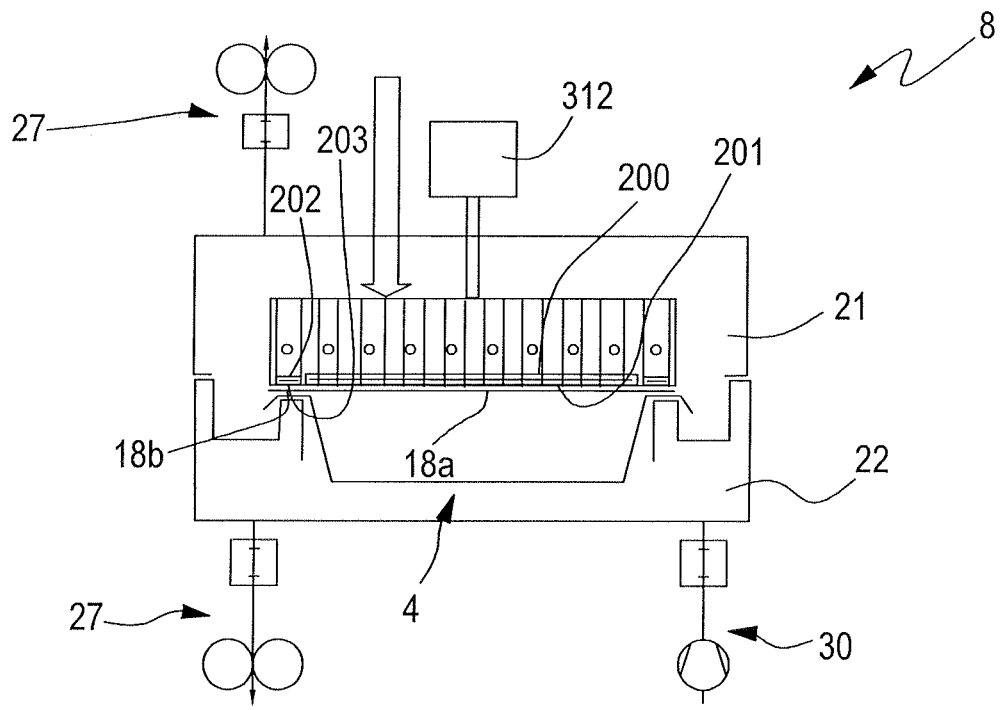
Figure 29:
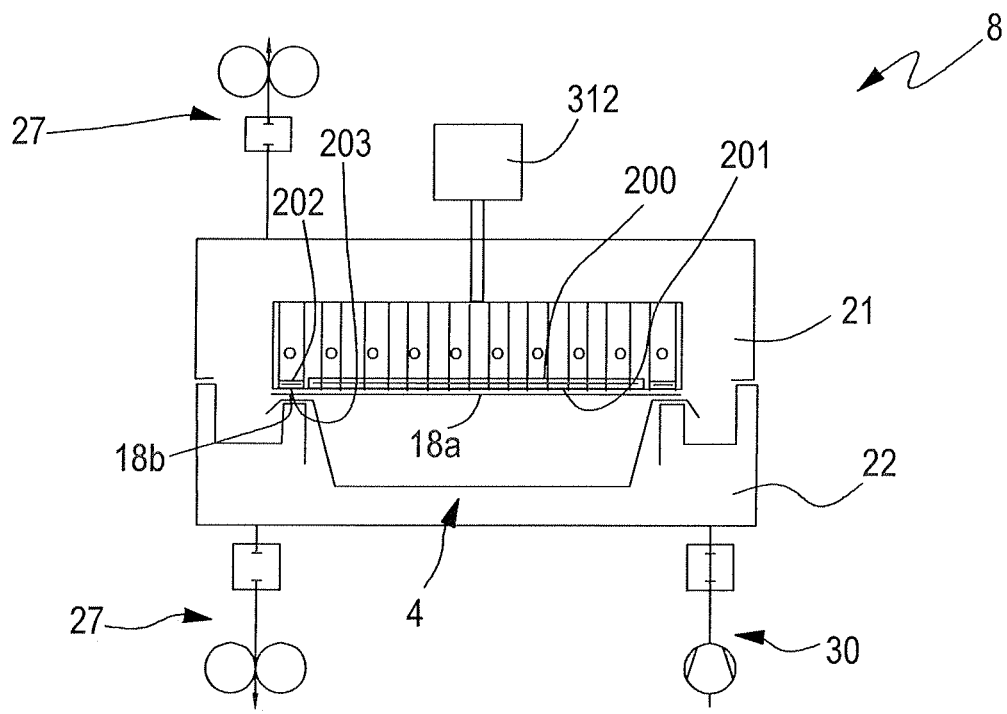
Figure 30:
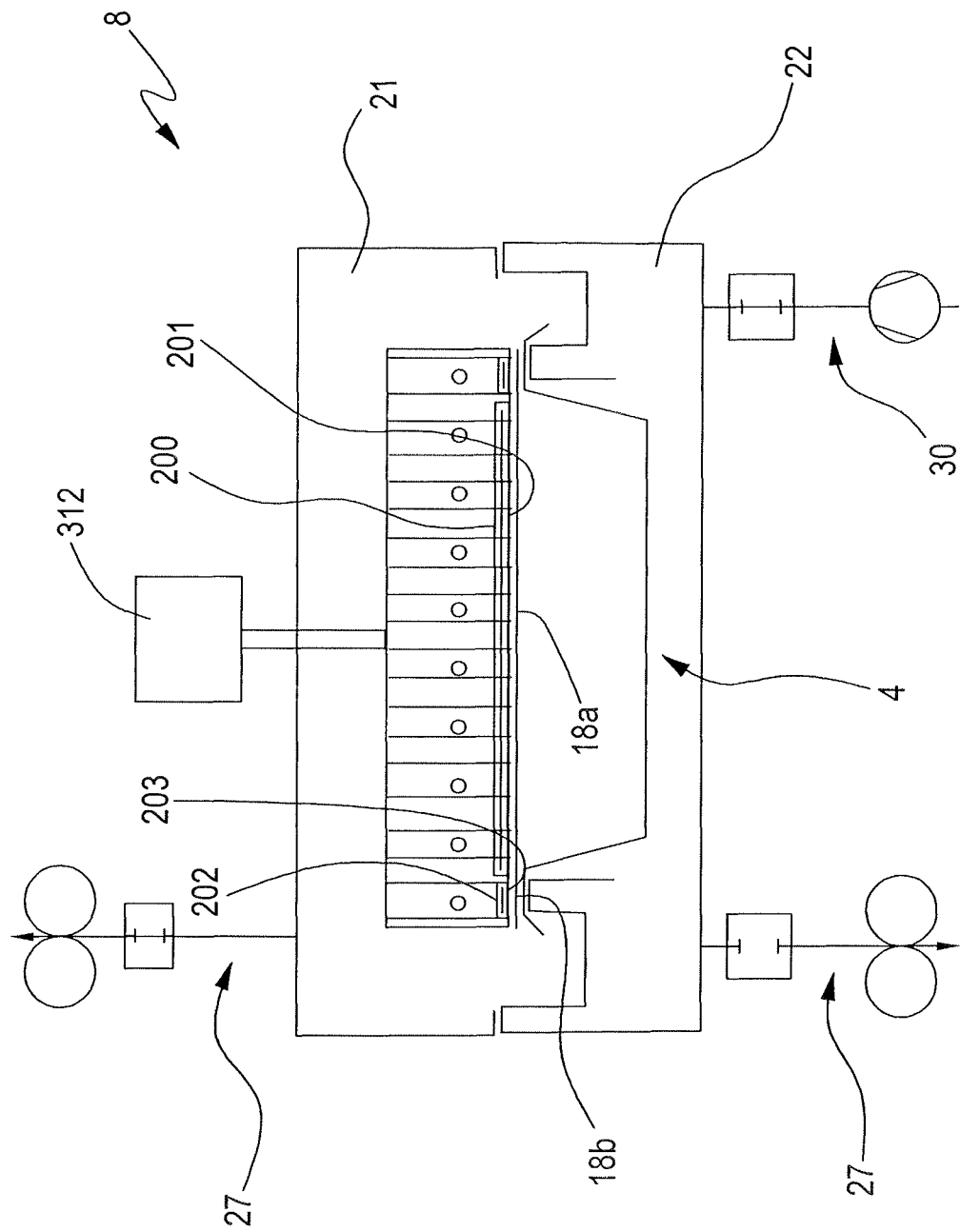
Figure 31:
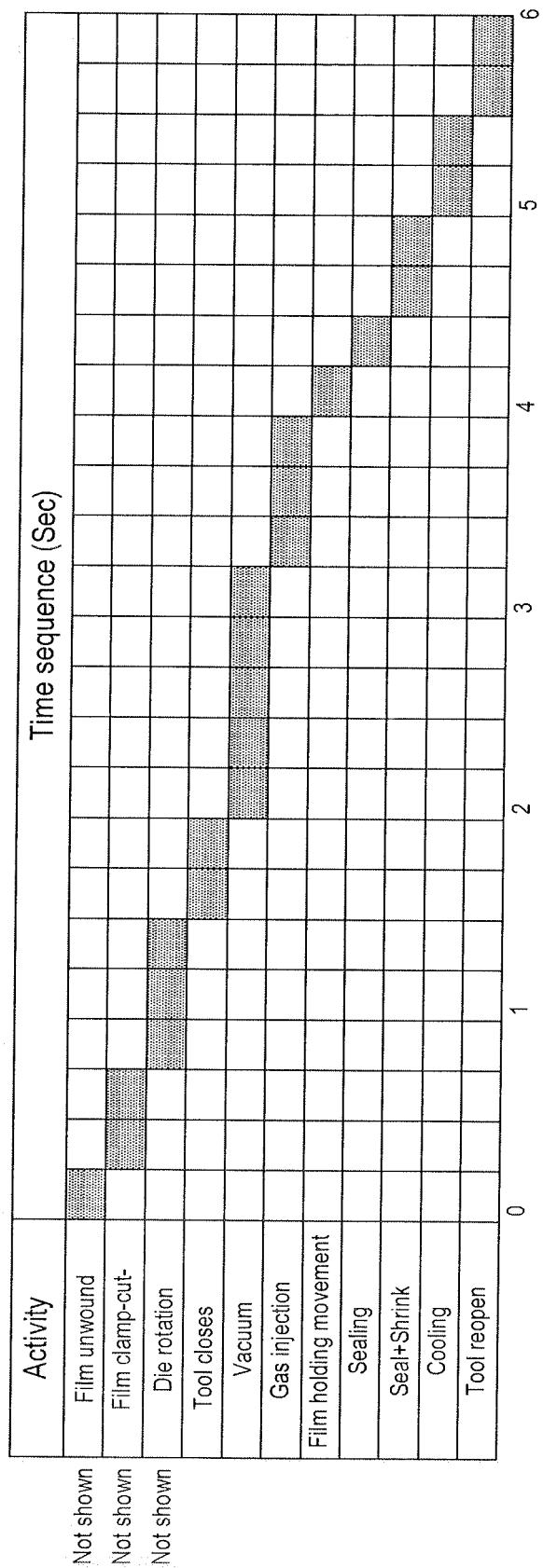
FIG. 31 is a diagram indicating, on a first axis, the steps of a packaging process followed by the apparatus of FIG. 1 when using the packaging assembly of FIGS. 23-30 and indicating, on a second axis, the time in seconds, wherein in the diagram area the time intervals for each packaging process step are represented with gray patterned areas.

Once the chamber 24 has been closed (configuration of FIG. 25), and after operation of the vacuum and/or controlled atmosphere arrangements (FIG. 26 shows formation of vacuum and FIG. 27 creation of controlled atmosphere), the control device 100 is configured to act on auxiliary actuator 312 to impose a further vertical movement to the heating head 310 and thus bring the heating surfaces of inner and outer heater carrying the cut film portion 18*a* towards the surface 23*a* such that with film portion 18*a* (and in detail a peripheral border 18*b* of film sheet 18*a*) is pressed against the top surface of rim 4*c* (FIG. 28). At this point, the peripheral region 18*b* of film portion 18*a* is trapped between the peripheral heating element 202 heating surface and the rim 4*c* of the tray positioned into seat 4. Then, the control device 100 may start the heating cycle as described above bringing the heating surface of the peripheral heater at the first temperature for a short time interval sufficient for heat sealing the peripheral region 18*b* to the rim 4*c*. In case a shrinkable film is being used the control device 100 also brings the temperature of the inner heater to the second temperature for a short time interval sufficient to obtain a controlled heat shrinking of the film portion covering the tray mouth which thus takes a perfectly controlled flat shape. FIGS. 29 and 20 show schematically that first the peripheral heater is brought to the first temperature (peripheral heater shaded in FIG. 29) and then (FIG. 30) also the inner heater is brought to the second temperature (heaters both shaded). Once the heating cycle is completed both heaters may be cooled (interrupting supply of energy to the heaters and optionally circulating cooling fluid in cooling circuit 220. Then the control device 100 opens the packaging chamber 24 the tray with applied film to proceed downstream the packaging assembly. The cycle may then be repeated.

Fourth Embodiment

A fourth embodiment shown with reference to FIGS. 36 and 37 relates to a packaging apparatus 1 comprising a packaging assembly 8 configured for receiving a product P to be packaged and at least one film 18 for packaging the product P, a heater 202 (in the example of FIG. 37, two opposed heaters 200, 202 carried by respective heating bars 260 and 262 are shown—of course a solution with a single heater is also possible) associated to the packaging assembly and having a heating surface configured to heat seal one or more parts of said film. In practice the heating surfaces of each heater 200, 202 are flat and straight bands acting each on a respective film 18 or film portion to heat seal the two film portions along a heat seal band. For instance the two film portions visible in FIGS. 36 and 37 may be part of a same tubular film 18 which—once crosswise seal bands are formed—create a film package around product P.

The heater 200, 202 comprises at least one electric conductive element; a supply unit 300 is connected to the electric conductive element of the heater and configured to supply electric energy to said heater by causing an electric current flow through said electric conductive element.

According to an aspect of the invention, the electrically conductive element comprises an electrically conductive carbon structure 211 of the type described above, namely comprising (or exclusively formed of) one or more carbon allotropes in the group of:
- a graphite structure,
- a single or multi-layer graphene structure,
- a fullerene structure, where the carbon atoms are bonded together in spherical, tubular, fiber-like or ellipsoidal formations: in particular the fullerene structure may take the form of carbon nanotubes or carbon nanofibers.

More in detail, the electrically conductive element comprises a structural substrate 210 carrying the carbon structure 211 and at least one protective layer 212 covering the carbon structure on a side opposite that of the structural substrate 210. In the embodiment shown, said carbon structure 211 is optionally sandwiched between two opposite protective layers, the protective layer opposite the structural substrate defining the heating surface of said heater.

The carbon structure may be of flat elongated conformation having a cross section with thickness of at least 5 μm and a width of at least 2 mm, optionally having a cross section with thickness of at least 10 μm and a width of at least 5 mm.

The carbon structure preferably presents an average electric resistivity higher than $5 \, \Omega \cdot mm^2/m$, optionally comprised between 15 and 25 $\Omega \cdot mm^2/m$.

Control device 100 acts on supply unit 300 connected to the conductive carbon structures 211. The control device 100 is configured for commanding the supply unit and control a supply of electric energy to the heater.

The control device 100 is in particular configured to command the supply unit 300 to execute a heating cycle including the following steps:
- applying an electric voltage to the electrically conductive element to cause the increase in temperature of the heating surface of the heater (or heaters) to a first temperature,
- maintaining said electric voltage for keeping the heating surface of the heater at least at the first temperature for a first discrete time interval,
- reducing or nullifying the voltage applied to the electrically conductive element for reducing the temperature of the heating surface of the heater below said first temperature.

The first discrete time period has a duration comprised between 0.2 and 5 seconds, in particular between 0.5 and 1.5 seconds, and the electric voltage is maintained applied to the electrically conductive element for a time period substantially equal to the first discrete time period.

The first temperature may be comprised in the range between 150° C. and 300° C., while said second temperature is comprised in the range between 180° C. and 240° C., more optionally between 200° C. and 220° C. Analogous to the previously described embodiments, the electric supply unit 300 comprises at least one impulse transformer configured to generate voltage pulses of a duration comprised 0.2 and 5 seconds (in particular between 0.5 and 1.5 seconds), at least one electric circuitry connecting the impulse transformer to the electrically conductive element: the control device 100 is configured to act on the supply unit 300 to supply electric current at a predetermined voltage and for a predetermined time period to said electrically conductive element such as to keep the heating surface of the heater at least at the first temperature for a first discrete time interval sufficient to form the heat-seal band and then supply of electric energy is interrupted (or substantially reduced) until the subsequent heat cycle for forming the next heat-seal band.

A first temperature sensor 305 may be provided configured for detecting a temperature of the heating surface of the heater and emitting a corresponding first temperature signal correlated to the detected temperature. The control device 100 is connected to said first temperature sensor, and is configured for receiving said first temperature signal and controlling the supply unit to supply of electric energy to the electrically conductive element, optionally by regulating voltage applied to the electrically conductive element and/or duration of application of said voltage, based on said first temperature signal and on a desired value for said first temperature. Note that the first temperature sensor may be a contact temperature sensor or a contactless temperature sensor (e.g. an IR sensor). Also note that presence of the first temperature sensor may not be necessary and temperature of the heating surface may be calculated based on the measured electric resistance of the first electrically conductive element as already discussed for the previous embodiments Operation of the fourth embodiment is as follows. The operation takes place under control of control device 100 and achieves a process of packaging a product within a film packaging.

First a tubular film is formed in a conventional manner (e.g. by extrusion or by longitudinally bonding two opposite longitudinal edges of a flat film). Then a product P is positioned inside the cavity formed by the tubular film. Then the assembly formed by film and product is moved to the packaging assembly 8 along direction of arrow A3 in FIG. 37. At regular intervals before and after product P a transverse seal band B—which is substantially transversal to direction of movement A3—is formed. Each transfer heat seal band B is formed by bringing the heaters 200, 202 one against the other or alternatively by bringing a single heater 200 against the surface of the film this latter being supported at the opposite side by a supporting bar or other supporting element. Once one or both the heaters contact the film and close one against the other two opposite film portions to be sealed, the heating cycle described above may be initiated. Once the seal is formed the heating cycle is interrupted, the tubular film is advanced by a prefixed length and a new seal is formed as described above at a distance from the previous seal thus closing and sealing a film package around a product P.

Control Device of Apparatus 1

The apparatus according to the invention has of at least one control unit.

The control unit 100 may comprise a digital processor (CPU) with memory (or memories), an analogical type circuit, or a combination of one or more digital processing units with one or more analogical processing circuits. In the present description and in the claims it is indicated that the control unit 100 is "configured" or "programmed" to execute certain steps: this may be achieved in practice by any means which allow configuring or programming the control unit. For instance, in case of a control unit 100 comprising one or more CPUs, one or more programs are stored in an appropriate memory: the program or programs containing instructions which, when executed by the control unit, cause the control unit 100 to execute the steps described and/or claimed in connection with the control unit. Alternatively, if the control unit 100 is of an analogical type, then the circuitry of the control unit is designed to include circuitry configured, in use, to process electric signals such as to execute the control unit steps herein disclosed.

In general terms the control unit 100 acts on and controls the transport assembly 3, the film cutting unit 320, the transfer device 46, the packaging assembly 8 and particularly the upper and/or lower tools 21, 22, the vacuum arrangement, the controlled atmosphere arrangement. In particular, the control unit 100 may be configured for controlling execution of the processes claimed in the attached claims, of the processes described in the summary section and of the operations described in the above detailed description.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The specific nature of the actuators described is exemplificative and alternative types of actuators may be used provided the type of motion imposed to the mobile parts on which said actuators are operating is the same.

Also note that although the described embodiments show a single packaging assembly, multiple packaging assemblies may be used in parallel in order to optimize productivity.

TECHNICAL EFFECTS AND ADVANTAGES

The above described and the claimed aspects of the invention achieve technical effects and advantages which are briefly summarized herein below.

The possibility to control in an independent manner the peripheral 202 and the inner heater 200, for instance under the control of control device 100 and supply unit 300, allows to have an accurate control of the heating surfaces temperature both in term of location where temperatures are increased and in term of duration of the temperature increase. This leads to the possibility to use any kind of film, namely also films of the heat-shrinkable type or films which may undergo thermal distortion, thus insuring the possibility to achieve packaging having a substantially perfect aesthetic appearance.

Furthermore, even when using highly shrinkable heat-shrinkable films, the process and apparatus according to the invention allow a an accurate control of the thermic profile in correspondence of the heating surfaces thus leading to a corresponding accurate control of the extent of shrink imposed onto the processed films, minimizing uncontrolled deformation in the film and transmission of forces to the tray which may cause tray distortion.

Additionally the control of the temperature of the heating surfaces of the peripheral 202 and inner heater 200 such that the surfaces are brought to the respective first and second temperatures for very short and defined time intervals allows to timely delay transmission of heat to the peripheral region 18b of a film portion 18a with respect to the transmission of heat to the central area of a film portion 18a. Thus, assuming to have to seal a film portion 18a to the top of a tray 4, it is possible to first star the heat sealing of the peripheral region 18b of the film portion 18a to the top rim 4c of the tray 4 and then initiate the heating of the central zone of the film portion (which may shrink or undergo thermal stresses) without transferring tangential forces (i.e. forces directed parallel to the top surface of the tray rim) which may compromise the heat bonding between film 18a and rim 4c, and transfer undesired stresses to the tray wall. Furthermore, it is possible according to aspects of the invention sharply reducing temperature of the heating surfaces in particular of the heating surface of the peripheral heater 202 while the same heating surface of the peripheral heater is still in contact with and exerts pressure on the film abutting against the tray rim, with the consequence that the bonding may effectively take place before bonding pressure is released thus obtaining a heat bonding without flaws and still keeping extremely short the overall time for completing the bonding cycle.

Moreover, the accurate control of the heating surfaces and the reduced time period during which said heating surfaces are kept at high temperatures, avoids dispersion of heat and undesired transmission of heat to other components. In particular the cutting device and the blades associated to the cutting device remain substantially cold thus avoiding problems of sticking, inefficient cutting and the like.

It should also be noted that the possibility to provide heat basically on demand, i.e. only when the execution of the bonding takes place, leads to significant saving of energy.

When the aspects of the invention are implemented using heaters provided with electrically conductive elements in graphene layers the above effects are furthermore enhanced as conductive elements in graphene layers have shown very little thermal inertia (and thus may be rapidly heated and cooled requiring less electric power and thus less energy from the supply unit), substantially no elongation or distortion even when brought to temperatures in the range of 200-250° C. (thus resulting in simple to execute structures and in reliable heaters). The absence of thermal elongation also leads to the perfect planarity of the graphene structures during the entire heating process with consequent perfect planarity of the heating surfaces and improved efficiency during heat bonding of the film.

The invention claimed is:

1. A packaging apparatus comprising:
   a packaging assembly configured to receive at least one support and to tightly fix a film to the support, the packaging assembly including:
      a lower tool defining a prefixed number of seats configured to receive said at least one support with a product to be packaged,
      an upper tool facing and cooperating with the lower tool, said upper tool and lower tool being relatively movable at least between a first operating condition, where the upper tool and lower tool are spaced apart from one another and allow positioning of at least one film portion of said film above one or more of said at least one support, and a second operating condition, where the upper tool and lower tool are approached to one another and allow heat sealing of said film portion to the at least one support located at said one or more seats,
      an inner heater carried by the upper tool and having a heating surface configured to heat at least a part of said film portion,
      a peripheral heater carried by the upper tool and positioned radially outside with respect to the inner heater, the peripheral heater having a heating surface configured to heat seal to the at least one support at least a peripheral region of said film portion;
   a supply unit configured to control energy supplied to said peripheral heater and to said inner heater; and
   a control device acting on the supply unit and configured to command the supply unit and control a supply of energy to the peripheral heater independently from a supply of energy to the inner heater, said control device being further configured to command the supply unit to execute a heating cycle including the following steps:
- increasing a temperature of the heating surface of the peripheral heater to a first temperature,
- keeping the heating surface of the peripheral heater at least at the first temperature for a first discrete time interval,
- reducing the temperature of the heating surface of the peripheral heater below said first temperature,
- increasing a temperature of the heating surface of the inner heater to a second temperature,
- keeping the heating surface of the inner heater at least at the second temperature for a second discrete time interval, wherein a start of the second discrete time interval is after a start of the first time interval, and
- reducing the temperature of the heating surface of the inner heater below said second temperature.

2. The apparatus of claim 1 wherein said control device is configured to:
- command the supply unit to consecutively repeat execution of said heating cycle a plurality of times, during each of said consecutive heating cycles at least one of said film portions being heat sealed to at least one respective support,
- control the supply unit such that, during each heating cycle, the supply unit supplies energy to the peripheral heater only during a discrete time period followed by a time period when no energy is supplied to the peripheral heater to cause the increase and keeping of the heating surface of the peripheral heater at least at the first temperature for the first discrete time interval, and to cause a subsequent reduction of the temperature of the heating surface of the peripheral heater below said first temperature,
- control the supply unit such that, during each heating cycle, the supply unit supplies energy to the inner heater only during a discrete time period followed by a time period when no energy is supplied to the inner heater to cause the increase and keeping of the heating surface of the inner heater at least at the second temperature for the second discrete time interval, and to cause a subsequent reduction of the temperature of the heating surface of the inner heater below said second temperature.

3. The apparatus of claim 1, wherein the first discrete time interval has a duration between 0.2 and 5 seconds, and wherein the second discrete time interval has a duration between 0.2 and 5 seconds.

4. The apparatus of claim 1, further wherein the control device is configured to command the supply unit to increase the temperature of at least one of:
- the heating surface of the peripheral heater from a respective baseline temperature to the first temperature with a temperature increase rate over time higher than 1° C./msec, or
- the heating surface of the inner heater from a respective baseline temperature to the second temperature with a temperature increase rate over time higher than 1° C./msec.

5. The apparatus of claim 1, wherein:
- the heating surface of said peripheral heater has an annular shape and surrounds the heating surface of the inner heater, and
- when the upper and lower tools are in said second operating position, the peripheral heater is configured to heat a peripheral band of said film portion while the inner heater is configured to heat at least a part of an inner zone of the same film portion located radially inside the peripheral band.

6. The apparatus of claim 1, wherein:
- both the heating surface of the peripheral heater and the heating surface of the inner heater are flat and
- at least when the upper and lower tools are in said second operating position, the heating surface of the inner heater is:
  - either coplanar to the heating surface of the peripheral heater or
  - indented with respect to the heating surface of the peripheral heater, such that when the heating surface of the peripheral heater contacts a top surface of the film portion, the heating surface of the inner heater is spaced apart by a prefixed distance from the top surface of the same film portion.

7. The apparatus of claim 1, wherein the heating surface of the inner heater is located at a radial distance from the heating surface of the peripheral heater and extends in an area surrounded by the heating surface of the peripheral heater, said heating surface of the inner heater comprising one selected from the group consisting of:
- a heating surface of annular shape,
- a continuous heating surface delimited by a single closed contour line,
- a heating surface including a plurality of parallel spaced apart bands connected at ends thereof by connecting portions.

8. The apparatus of claim 1, wherein:
- the peripheral heater comprises a first electrically conductive element extending along the heating surface of the peripheral heater, said first electrically conductive element being an electrically conductive annular element, and
- the inner heater comprises a second electrically conductive element extending along the heating surface of the inner heater, said second conductive element being one selected in the group consisting of:
  - an electrically conductive annular element,
  - an electrically conductive continuous plate,
  - an electrically conductive meander element.

9. The apparatus of claim 1, further comprising a cooling circuit associated to the upper tool and configured to cool said inner heater and said peripheral heater, said cooling circuit being controlled by the control device which is further configured to cause circulation of a cooling fluid in said cooling circuit and to regulate a cooling fluid temperature.

10. The apparatus of claim 8, wherein the supply unit is an electric supply unit and comprises:
- at least one impulse transformer,
- at least one electric circuitry connecting the impulse transformer to at least one of the first electrically conductive element or the second electrically conductive element.

11. The apparatus of claim 8, wherein the supply unit is an electric supply unit and comprises:
- at least a first impulse transformer and a first electric circuitry connecting the first impulse transformer to the first electrically conductive element, and
- at least a second impulse transformer and a second electric circuitry connecting the second impulse transformer to the second electrically conductive element,
- wherein said control device is configured to act on the electric supply unit to independently supply electric current at a predetermined voltage to said first and, respectively, second electrically conductive elements.

12. The apparatus of claim 1, further comprising:
a first temperature sensor configured to detect a temperature of the heating surface of the peripheral heater and to emit a corresponding first temperature signal correlated to the detected temperature,
wherein the control device is connected to said first temperature sensor, and is configured to:
receive said first temperature signal and control the supply unit to supply energy to the peripheral heater based on said first temperature signal and on a desired value for said first temperature,
or comprising:
a first temperature sensor configured to detect a temperature of the heating surface of the peripheral heater and to emit a corresponding first temperature signal correlated to the detected temperature,
a second temperature sensor to detect a temperature of the heating surface of the inner heater and to emit a corresponding second temperature signal correlated to the detected temperature,
wherein the control device is connected to said first temperature sensor, and to said second temperature sensor, and is configured to:
receive said first temperature signal and control the supply unit to supply of energy to the peripheral heater based on said first temperature signal and on a desired value for said first temperature,
receive said second temperature signal and control the supply unit to supply of energy to the inner heater based on said second temperature signal and on a desired value for said second temperature.

13. The apparatus of claim 8, further comprising:
at least one second electric sensor electrically connected or connectable to the second electrically conductive element and configured to detect an electric parameter of the second electrically conductive element and to emit a corresponding electric parameter signal, the second electrically conductive element comprising a prefixed segment, the electric parameter comprising one from the group consisting of:
an electric impedance of said prefixed segment of said second electrically conductive element,
an electric current flowing through said prefixed segment of the second electrically conductive element when a prefixed electric voltage is applied at ends of said prefixed segment,
an electric voltage detected at ends of the prefixed segment of the second electrically conductive element when a prefixed electric current is imposed to flow through said prefixed segment,
wherein the control device is connected to said second electric sensor, and is configured to:
receive said electric parameter signal and control the supply unit to supply electric energy to the second electrically conductive element.

14. The apparatus of claim 13, wherein the control device is configured to receive said electric parameter signal and calculate a value of real temperature of the second electrically conductive element based on:
a value of said electric parameter and
a calibration curve or calibration table stored in the control device and relating values of the electric parameter with corresponding values of the temperature of the second electrically conductive element.

15. The apparatus of claim 13, wherein the control device is configured to control the supply unit to supply electric energy to the second electrically conductive element.

16. The apparatus of claim 1, wherein:
the upper tool comprises a heating head having a respective active surface,
the peripheral heater and the inner heater are both carried by said heating head,
the heating head is configured to take a film sealing position, wherein at said film sealing position at least the heating surface of the peripheral heater is configured to press against a corresponding top surface of said film portion and allow heat sealing of the film portion to the underlying at least one support, the control device being configured to control the packaging assembly such that, during each said heating cycle, the heating head keeps said film sealing position at least during said first discrete time interval, preferably until after expiration of said first discrete time interval.

17. The apparatus of claim 16, wherein:
the heating head is configured to be operative in correspondence of said active surface to hold one or more of said film portions in contact with the active surface; or
the apparatus is configured to act on longitudinal opposite borders of said film to hold one or more of said film portions in a position aligned with the heating head and with said one or more seats.

18. The apparatus of claim 1, wherein each of said seats is configured to receive a respective support having a base wall, a sidewall upwardly emerging from the base wall and a top rim radially protruding out of said sidewall, said apparatus further comprising:
a support frame,
a film supplying assembly configured to supply a continuous film;
a film cutting unit active on the continuous film and configured at least to transversally cut the continuous film, wherein the film cutting unit is located outside the packaging assembly or inside the packaging assembly,
a film driving assembly, which, in case the cutting unit is located outside the packaging assembly, is configured to drive cut film sheets from the cutting unit to inside the packaging assembly and above one or more respective supports positioned at the respective seats or which, in case the cutting unit is located inside the packaging assembly, is configured to drive the continuous film from the film supply assembly to inside the packaging assembly and above one or more respective supports located in respective seats,
wherein the control device is connected to the packaging assembly and configured to command the packaging assembly to pass from the first to the second operating condition and vice-versa, said upper tool and lower tool cooperating to define a packaging chamber which, in correspondence of said second operating condition, is closed.

19. The apparatus of claim 18 further comprising at least one of:
a vacuum arrangement connected to the packaging chamber and configured to remove gas from said packaging chamber, said control unit being further configured to control the vacuum arrangement to withdraw gas from said packaging chamber at least when the packaging assembly is in said second operating condition with said packaging chamber hermetically closed; and a controlled atmosphere arrangement connected to the packaging chamber and configured to inject a gas stream into said packaging chamber, said control unit being further configured to control said controlled atmosphere arrangement to inject said stream of gas at least when the packaging assembly is in said second operating condition;

wherein the controlled atmosphere arrangement is configured to inject gas into the packaging chamber including a quantity of one or more of N2, O2 and CO2 which is different from the quantity of these same gases as present in the atmosphere at 20° C. and 1 atmosphere pressure.

20. The apparatus of claim 1, wherein the control device is configured to:
receive a desired value for said first temperature and a desired value for said second temperature, or
receive information identifying the type of film intended to be used
control the supply unit to supply energy to the peripheral heater based on said desired value for said first temperature,
control the supply unit to supply energy to the inner heater based on said desired value for said second temperature.

21. A method of using the apparatus of claim 1 for packaging a product in or on a support by heat sealing a heat-shrinkable film to said support, with the film being in contact with the support, and after the peripheral heater heating surface is brought to the first temperature.

22. A process of packaging a product arranged on a support, said support having a base wall, a side wall and a top rim emerging radially out of the side wall, said process using the apparatus of claim 1, the process comprising the following steps:
positioning one or more supports in correspondence of said one or more seats,
positioning at least one film portion or at least one film sheet above respective one or more supports located in said one or more seats,
keeping the upper and lower tools in said first operating condition a time sufficient for the supports and for the corresponding film portion or film sheet to properly position,
moving the upper and lower tools in said second operating condition with the said film portion or film sheet positioned above the respective support or supports,
heat sealing the film portion or the film sheet to the support, the step of heat sealing including the following sub-steps:
causing the heating surface of the peripheral heater to contact the film portion or film sheet top surface of the support or supports located in said seat or seats,
increasing the temperature of the heating surface of the peripheral heater to a first temperature,
keeping the heating surface of the peripheral heater at least at the first temperature for a first discrete time interval,
reducing the temperature of the heating surface of the peripheral heater below said first temperature,
causing the heating surface of the inner heater to contact or be placed at a prefixed distance from the top surface of said film portion,
increasing a temperature of the heating surface of the inner heater to a second temperature different from the first temperature, keeping the heating surface of the inner heater at least at the second temperature for a second discrete time interval, reducing the temperature of the heating surface of the inner heater below said second temperature,
positioning the upper and lower tools in said first operating condition,
moving the number of supports with the tightly fixed film away from the packaging assembly.

23. The process of claim 22, wherein heat sealing includes heating with the peripheral heater a peripheral band of said film portion or film sheet and heating with the inner heater an inner zone of the same film portion or film sheet located radially inside the peripheral band,
wherein the film is non-heat shrinkable and the first temperature is equal to the second temperature or wherein the film is heat shrinkable and the second temperature is inferior to the first temperature.

24. The process of claim 22, wherein the first discrete time interval has a duration comprised between 0.2 and 5 seconds, and wherein the second discrete time interval has a duration comprised between 0.2 and 5 seconds.

25. The process of claim 22, wherein during the heat sealing step the increasing of the temperature of the heating surface of the inner heater to a second temperature starts after the increasing of the temperature of the peripheral heater to the first temperature, the start of said second discrete time interval being delayed with respect to the start of said first time interval.

26. The process of claim 22, wherein the upper and lower tools cooperate to define a packaging chamber, the process further comprising the steps of withdrawing gas from the packaging chamber, until a pressure comprised between 100 and 300 mbar is reached inside said packaging chamber and then, while the film portion or film sheet is kept at a distance from a support mouth, injecting a modified atmosphere gas into the packaging chamber.

* * * * *